(12) United States Patent
Horie et al.

(10) Patent No.: US 7,778,145 B2
(45) Date of Patent: Aug. 17, 2010

(54) OPTICAL RECORDING MEDIUM AND OPTICAL RECORDING METHOD OF THE SAME

(75) Inventors: Michikazu Horie, Minato-ku (JP); Yutaka Kurose, Minato-ku (JP); Hideyuki Kubo, Minato-ku (JP); Kenjirou Kiyono, Minato-ku (JP)

(73) Assignee: Mitsubishi Kagaku Media Co., Ltd., Tokyo (JP)

( * ) Notice: Subject to any disclaimer, the term of this patent is extended or adjusted under 35 U.S.C. 154(b) by 1163 days.

(21) Appl. No.: 11/367,676

(22) Filed: Mar. 6, 2006

(65) Prior Publication Data
US 2006/0204706 A1    Sep. 14, 2006

Related U.S. Application Data

(63) Continuation of application No. PCT/JP2005/013145, filed on Jul. 15, 2005.

(30) Foreign Application Priority Data

Jul. 16, 2004    (JP)    ............ 2004-210817
Jun. 15, 2005    (JP)    ............ 2005-175803

(51) Int. Cl.
G11B 7/24    (2006.01)
(52) U.S. Cl. .................. 369/275.4; 369/277; 369/275.1
(58) Field of Classification Search ............... None
See application file for complete search history.

(56) References Cited

U.S. PATENT DOCUMENTS 4,336,545 A    6/1982    Howe et al.
4,871,649 A    10/1989   Imataki et al.
5,391,413 A    2/1995    Yanagisawa et al.
5,407,719 A    4/1995    Hamada et al.
5,448,541 A    9/1995    Aoki (Continued)

FOREIGN PATENT DOCUMENTS

CN    1383143 A    12/2002

(Continued)

OTHER PUBLICATIONS

U.S. Appl. No. 12/440,247, filed Mar. 6, 2009, Kubo, et al.

(Continued)

*Primary Examiner*—Joseph H Feild
*Assistant Examiner*—Tawfik Goma
(74) *Attorney, Agent, or Firm*—Oblon, Spivak, McClelland, Maier & Neustadt, L.L.P.

(57) ABSTRACT

By use of a substrate which can be stably formed and has a relatively small groove depth, a very high density optical recording medium having good recording/reading characteristics is provided. In an optical recording medium of a surface incidence type, in which a reflective layer, a recording layer containing a dye as a main component and a cover layer are sequentially formed on a substrate having guide grooves formed therein, a guide groove part on a far side from a plane of incidence of a recording/reading light beam on the cover layer is set as a recording groove part, and reflected light intensity in a recorded pit portion formed in the recording groove part is increased by a phase shift and is set higher than reflected light intensity in unrecorded.

44 Claims, 38 Drawing Sheets

U.S. PATENT DOCUMENTS

| | | | |
|---|---|---|---|
| 5,554,451 A * | 9/1996 | Taki et al. | 428/823.1 |
| 5,796,708 A * | 8/1998 | Ohkawa et al. | 369/283 |
| 6,018,510 A * | 1/2000 | Abe et al. | 369/275.1 |
| 6,156,482 A | 12/2000 | Hamada et al. | |
| 6,346,364 B1 | 2/2002 | Hamada et al. | |
| 6,580,678 B2 * | 6/2003 | Kondo et al. | 369/275.2 |
| 6,835,432 B2 | 12/2004 | Abe et al. | |
| 6,844,044 B2 | 1/2005 | Sabi | |
| 2002/0039346 A1 | 4/2002 | Abe et al. | |
| 2003/0103442 A1 | 6/2003 | Kakuta et al. | |
| 2003/0103443 A1 | 6/2003 | Ishida et al. | |
| 2003/0113665 A1 | 6/2003 | Berneth et al. | |
| 2003/0179694 A1 | 9/2003 | Ishida et al. | |
| 2004/0008610 A1* | 1/2004 | Sabi | 369/275.1 |
| 2004/0047282 A1 | 3/2004 | Fukuzawa | |
| 2004/0125739 A1 | 7/2004 | Usami et al. | |
| 2004/0191687 A1 | 9/2004 | Fukuzawa et al. | |
| 2005/0013235 A1 | 1/2005 | Yashiro et al. | |
| 2005/0063292 A1 | 3/2005 | Shibata | |
| 2005/0243699 A1 | 11/2005 | Noda et al. | |
| 2007/0122747 A1 | 5/2007 | Usami et al. | |

FOREIGN PATENT DOCUMENTS

| | | |
|---|---|---|
| CN | 1465052 A | 12/2003 |
| JP | 59-019253 | 1/1984 |
| JP | 61-029433 | 2/1986 |
| JP | 02-087339 | 3/1990 |
| JP | 02-121133 | 5/1990 |
| JP | 02-132656 | 5/1990 |
| JP | 02-168446 | 6/1990 |
| JP | 02-187939 | 7/1990 |
| JP | 03-022224 | 1/1991 |
| JP | 03-052142 | 3/1991 |
| JP | 03-054744 | 3/1991 |
| JP | 03-063943 | 3/1991 |
| JP | 04-109441 | 4/1992 |
| JP | 04-182944 | 6/1992 |
| JP | 04-182945 | 6/1992 |
| JP | 04-182946 | 6/1992 |
| JP | 04-182947 | 6/1992 |
| JP | 04-286684 | 10/1992 |
| JP | 04-315834 | 11/1992 |
| JP | 05-128589 | 5/1993 |
| JP | 05-174380 | 7/1993 |
| JP | 06-004901 | 1/1994 |
| JP | 08-138245 | 5/1996 |
| JP | 09-277703 | 10/1997 |
| JP | 10-036693 | 2/1998 |
| JP | 11-025523 | 1/1999 |
| JP | 11-066622 | 3/1999 |
| JP | 11-273147 | 10/1999 |
| JP | 11-334204 | 12/1999 |
| JP | 2000-043423 | 2/2000 |
| JP | 2000-207772 | 7/2000 |
| JP | 2000-311384 | 11/2000 |
| JP | 1 103 962 A2 | 5/2001 |
| JP | 2001-155383 | 6/2001 |
| JP | 2001-273672 | 10/2001 |
| JP | 2001-287466 | 10/2001 |
| JP | 2001-331936 | 11/2001 |
| JP | 2001-357571 | 12/2001 |
| JP | 2002-092941 | 3/2002 |
| JP | 2002-092962 | 3/2002 |
| JP | 2002-245678 | 8/2002 |
| JP | 2002-301870 | 10/2002 |
| JP | 2002-367219 | 12/2002 |
| JP | 2003-016689 | 1/2003 |
| JP | 2003-217173 | 7/2003 |
| JP | 2003-217177 | 7/2003 |
| JP | 2003-266954 | 9/2003 |
| JP | 2003-303442 | 10/2003 |
| JP | 2003-331465 | 11/2003 |
| JP | 2003-331473 | 11/2003 |
| JP | 2004-001375 | 1/2004 |
| JP | 2004-030864 | 1/2004 |
| JP | 2004-086932 | 3/2004 |
| JP | 2004-98541 | 4/2004 |
| JP | 2004-098542 | 4/2004 |
| JP | 2004-127472 | 4/2004 |
| JP | 2004-160742 | 6/2004 |
| JP | 2004-213745 | 7/2004 |
| JP | 2004-213753 | 7/2004 |
| JP | 2004-213774 | 7/2004 |
| JP | 2004-234824 | 8/2004 |
| JP | 2004-253096 | 9/2004 |
| JP | 2004-310843 | 11/2004 |
| JP | 2004-335076 | 11/2004 |
| JP | 2005-131813 | 5/2005 |
| JP | 2005-131816 | 5/2005 |
| WO | WO 82/02089 | 6/1982 |
| WO | WO 01/74600 A1 | 10/2001 |
| WO | WO 02/080164 A1 | 10/2002 |
| WO | WO 02/101735 A1 | 12/2002 |
| WO | WO 02/102598 A1 | 12/2002 |
| WO | WO 03/003361 A1 | 1/2003 |

OTHER PUBLICATIONS

U.S. Appl. No. 12/160,856, filed Jul. 14, 2008, Horie, et al.

A.H.M. Holstag, et al., "Recording Mechanism of Overcoated Metallized Dye Layers on Polycarbonate Substrates", JJAP Series 6, Proceedings of International Symposium on Optical Memory, vol. 4, 1991, p. 99-108.

Erwin R. Meinders and Benno Tieke, "Recent Developments in Thermal Modelling of High-Speed Dye Recording", Japan Society of Applied Physics, Japanese Journal of Applied Physics, vol. 42, pp. 834-840, Part 1, No. 2B, Feb. 2003.

Isao Ichimura, et al., "On-groove phase-change optical recording for a capacity of 25 GB", Proceedings of SPIE vol. 4342 (2002), pp. 168-177.

Yuichi Sabi, et al., "Development of Organic Recording Media for Blue High Numerical Aperture Optical Disc System", Japan Society of Applied Physics, Japanese Journal of Applied Physics, vol. 42, pp. 1056-1058, Part 1, No. 2B, Feb. 2003.

Heitaro Nakajima and Hiroshi Ogawa, "Compact disc dokuhon", $3^{rd}$ revised version, Ohmsha, 1996, p. 168, ISBN: 4-274-03472-0.

Shoei Kobayashi, et al., "Wobble-Address Format of the Blu-ray Disc", Japan Society of Applied Physics, Japanese Journal of Applied Physics, vol. 42, pp. 915-918, Part 1, No. 2B, Feb. 2003.

Michel M. Decre and Piet H.G.M. Vromans, "Cover Layer Technology for the High-Numerical-Aperture Digital Video Recording System", Japanese Journal of Applied Physics, vol. 39, pp. 775-778, Part 1, No. 2B, Feb. 2000.

Bert Stek, et al., "Advanced Signal Processing for the Blu-ray Disc System", Japan Society of Applied Physics, Japanese Journal of Applied Physics, vol. 42, pp. 912-914, Part 1, No. 2B, Feb. 2003.

Nikkei Electronics, Nikkei BP Inc., "Optical disc kaitaishinsho", Chapter 3, 2003.

Maruzen Publishing Company, "Spectroellipsometry", Chapter 5, 2003.

Alphonsus V. Pocius, "Secchakuzai to secchaku gijutsu nyumon" ("Adhension and Adhesives Technology"), Nikkan Kogyo Shimbunsha, 1999.

* cited by examiner

Prior Art

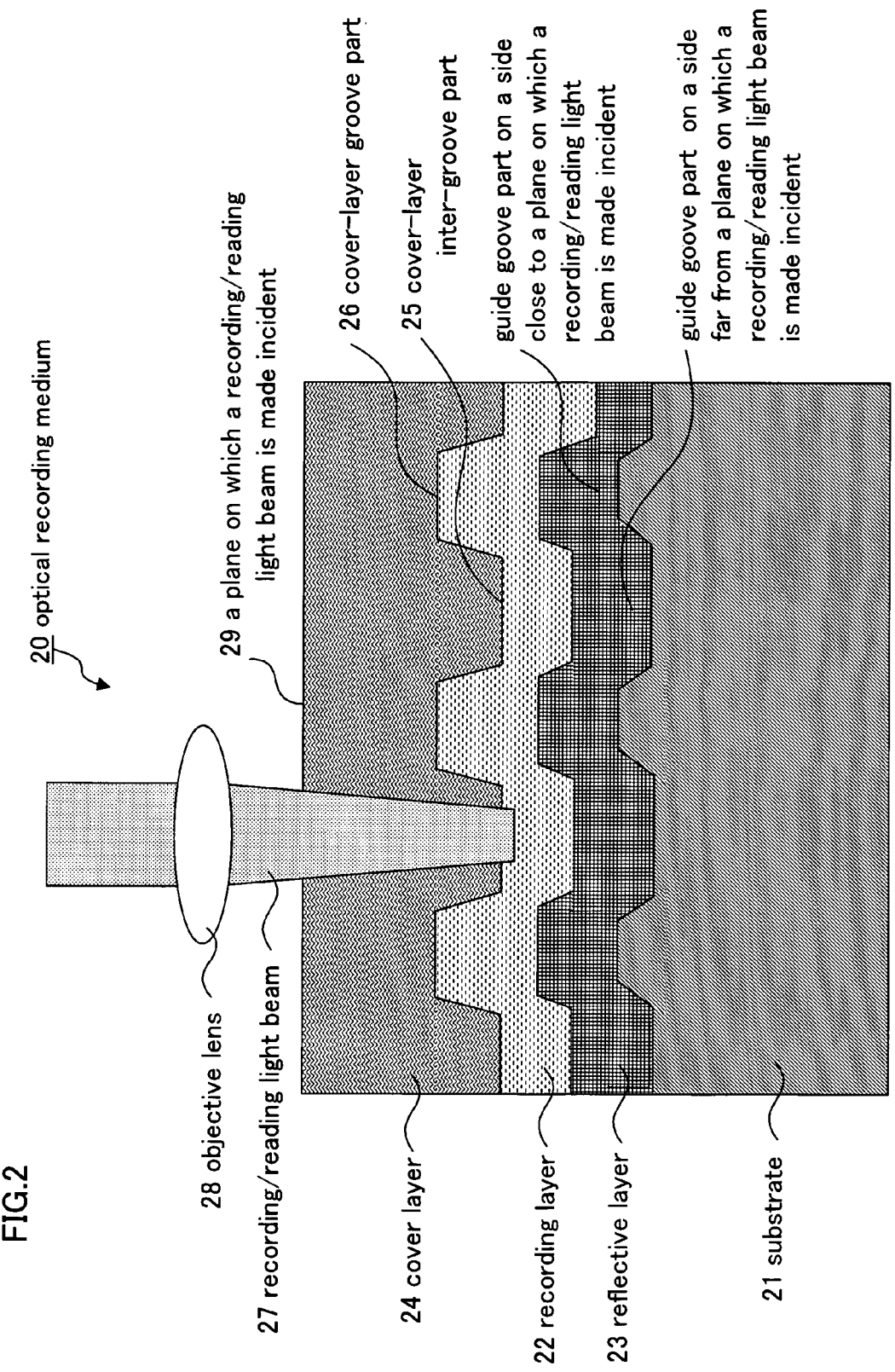

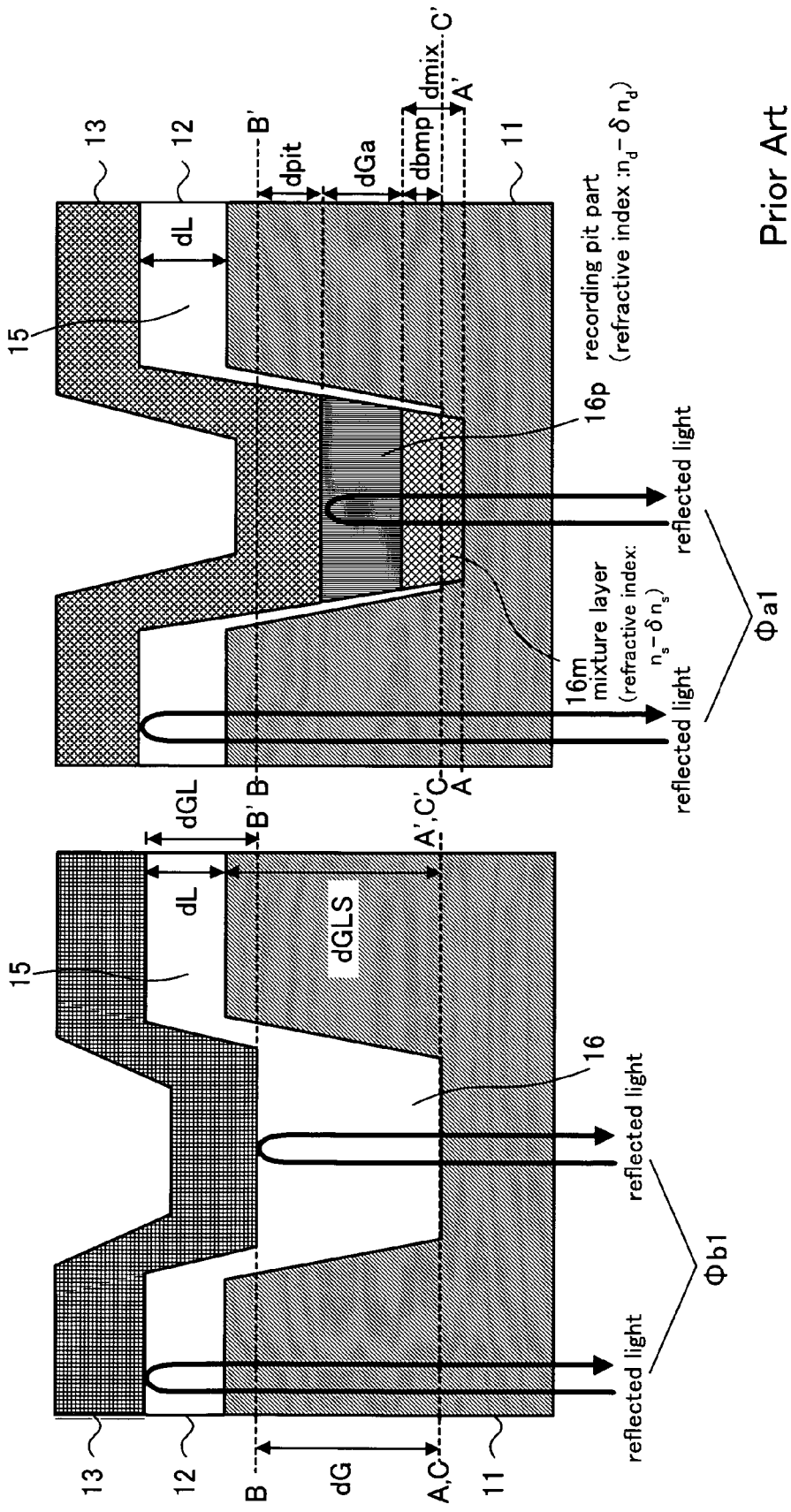

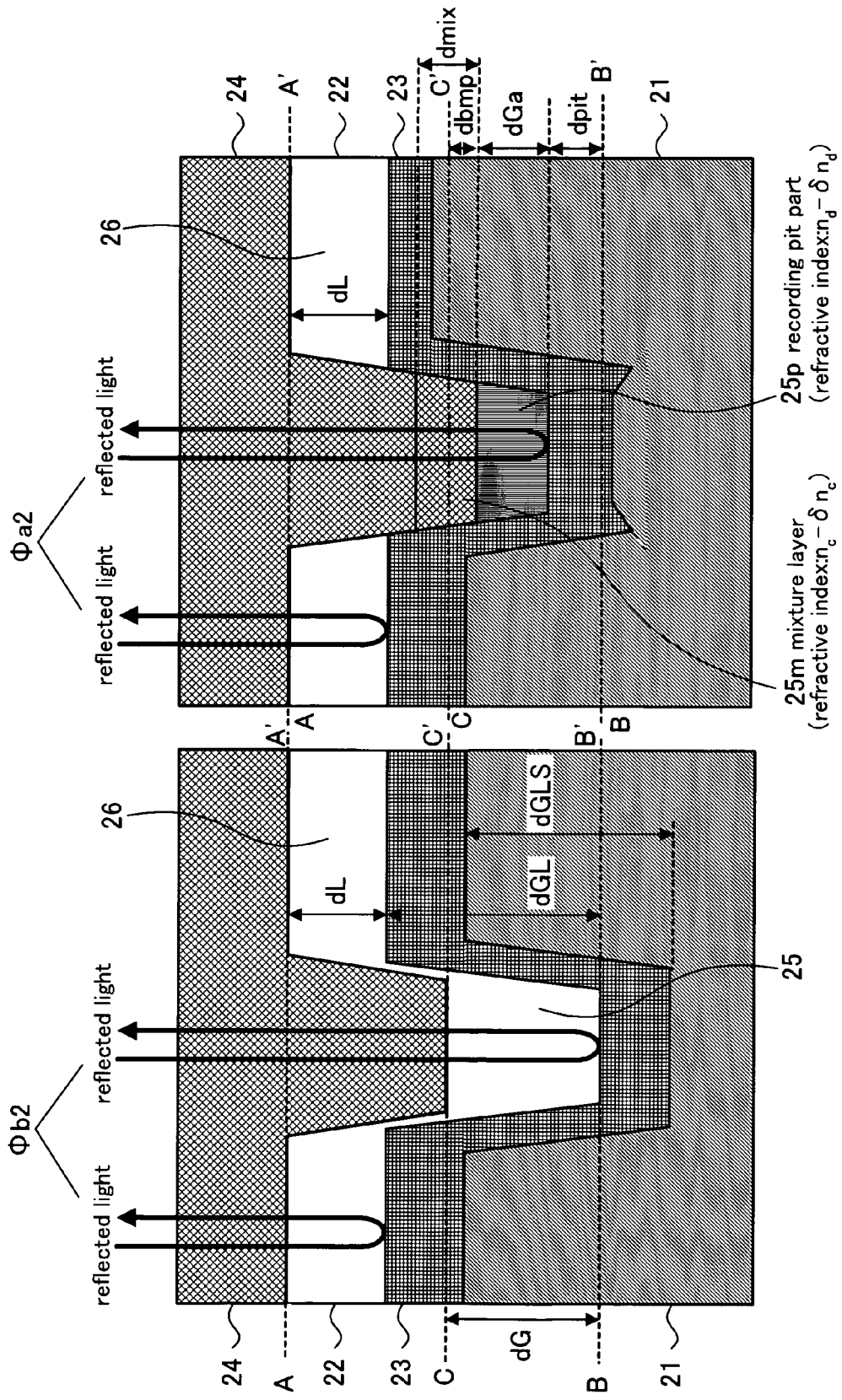
FIG.4A / FIG.4B

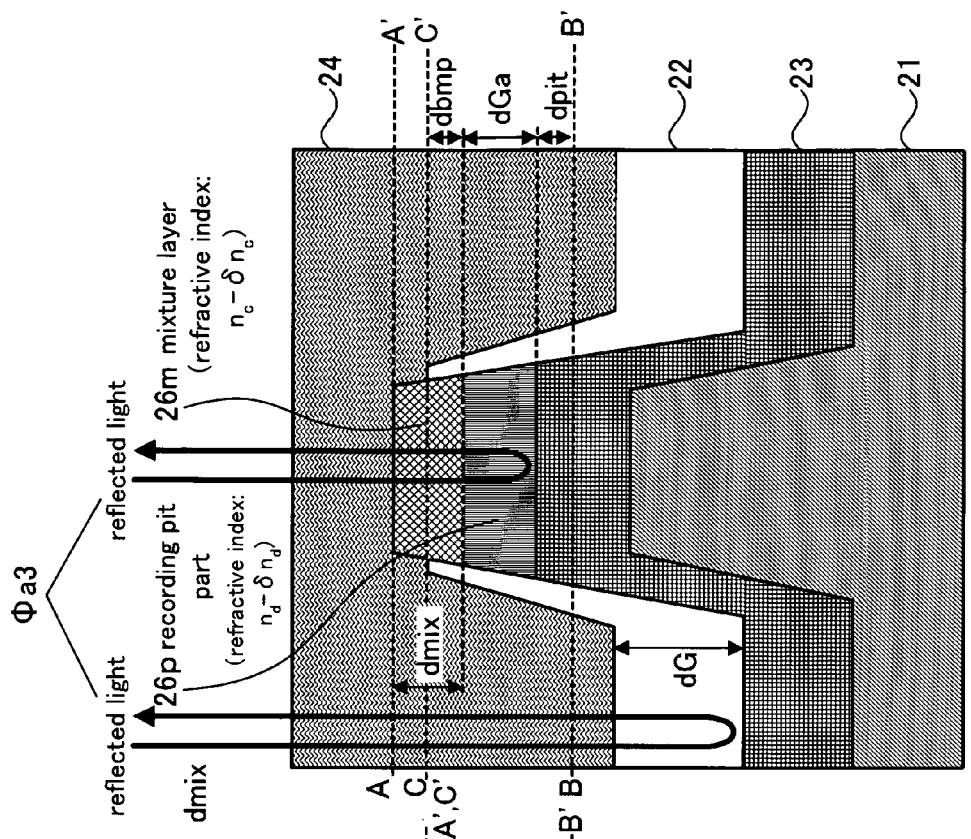
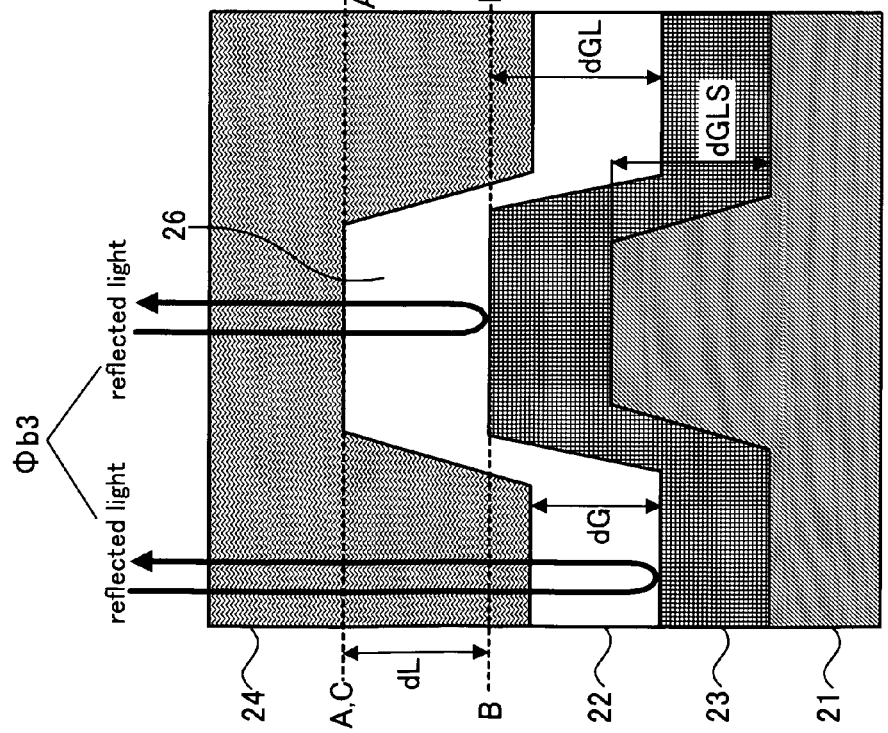

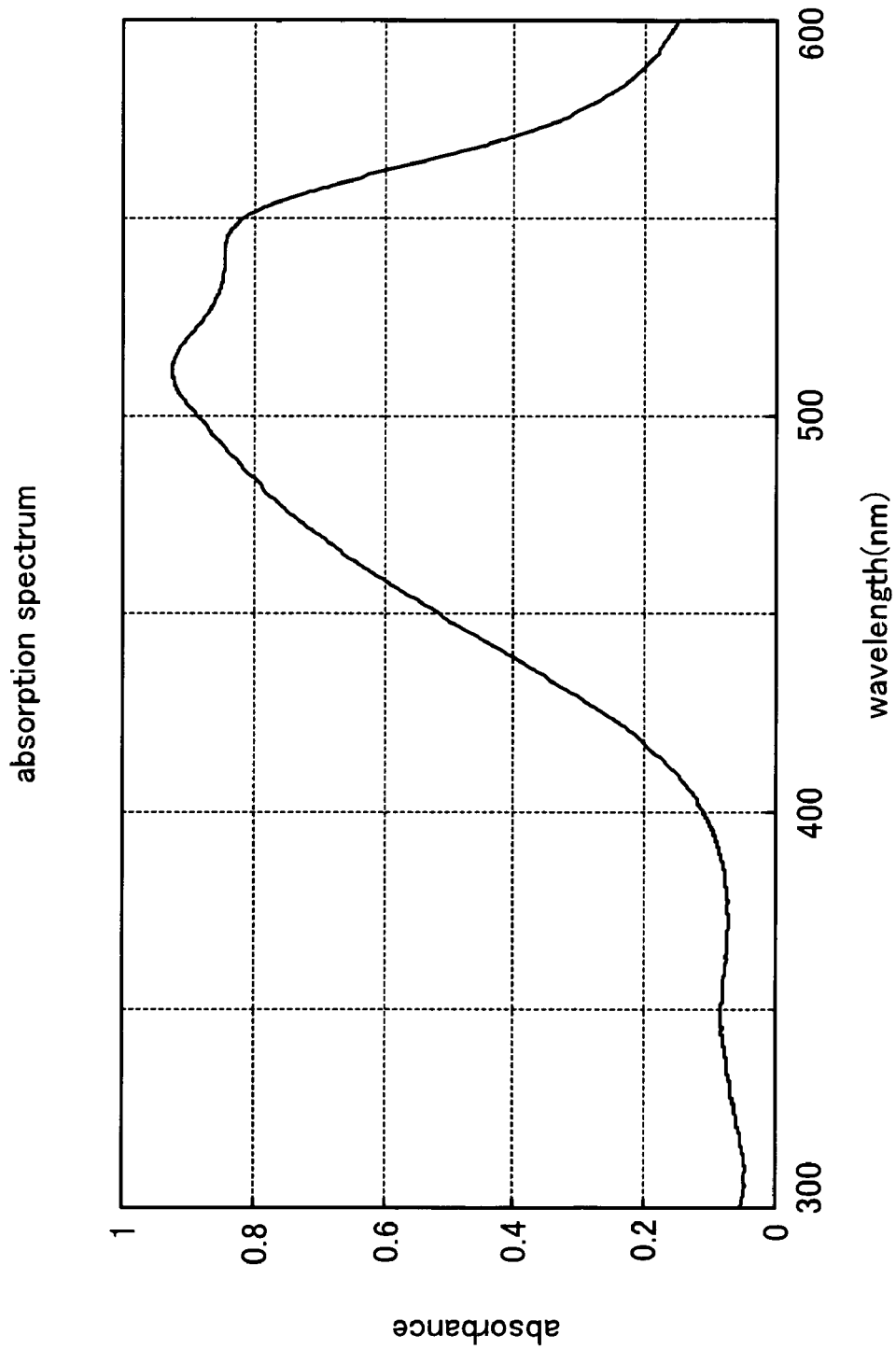

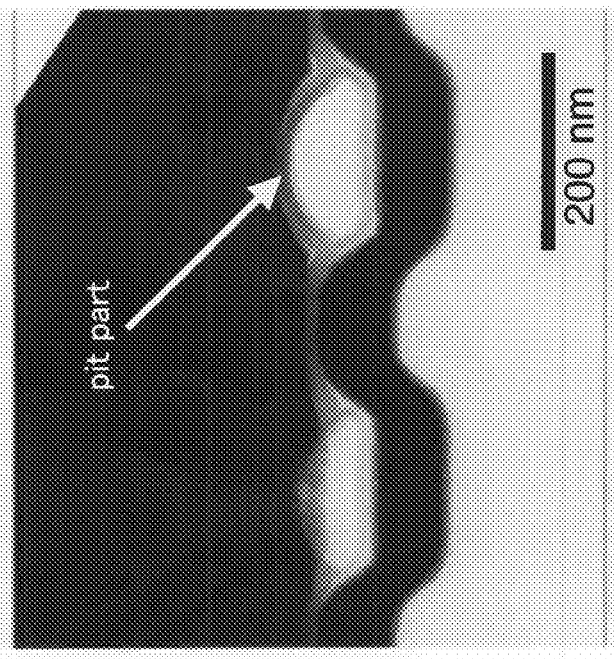
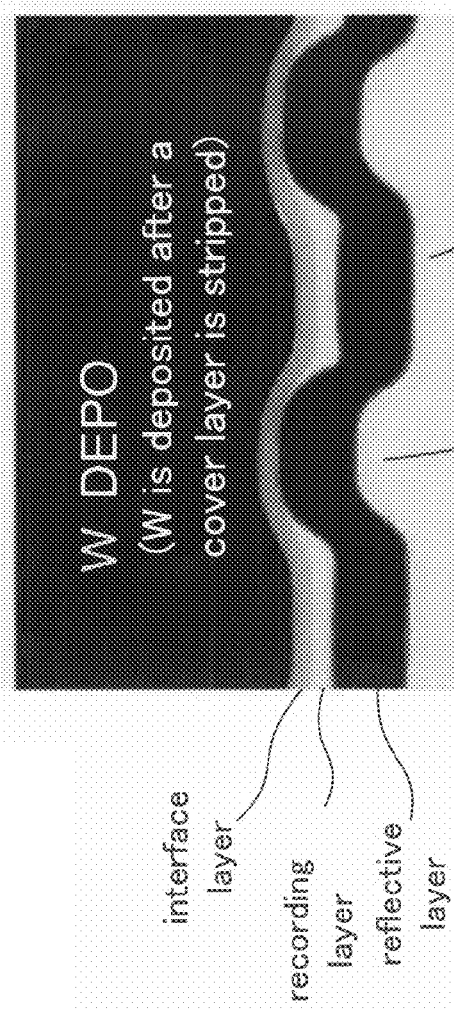

FIG. 34A  ROM region signal readed waveform

FIG. 34B  recordable region recorded signal 0.6 weight %, cover-layer groove part 1.2 weight %, cover-layer groove part 0.6 weight %, cover-layer inter-groove part 1.2 weight %, cover-layer inter-groove part 0.6 weight %, cover-layer inter-groove part 0.6 weight %, cover-layer groove part 1.2 weight %, cover-layer inter-groove part 1.2 weight %, cover-layer groove part

OPTICAL RECORDING MEDIUM AND OPTICAL RECORDING METHOD OF THE SAME

TECHNICAL FIELD

The present invention relates to an optical recording medium and the like, and more particularly relates to an optical recording medium having a recording layer containing a dye.

BACKGROUND ART

In recent years, development of a blue laser which can realize huge recording density has progressed rapidly. Moreover, development of a write-once-read-many optical recording medium for the blue laser has been underway. Above all, there has been a strong demand on development of a write-once-read-many medium of a dye coating type which can be efficiently produced at relatively low cost. In a conventional dye coating type write-once-read-many optical recording medium, a recording pit is formed by applying a laser beam to a recording layer of an organic compound mainly made of dye, generally resulting in optical changes (in a refractive index or an absorption rate) attributable to decomposition or alteration of the organic compound. A recording pit portion is normally associated with not only the optical changes but also deformation due to a change in the volume of the recording layer, formation of a mixture portion of a substrate and a dye due to heat generation, substrate deformation (mainly bulging caused by substrate expansion), and the like (see patent documents 1, 2, 3, and 4).

Optical behavior of the organic compound used in the recording layer with respect to a laser wavelength used for recording and reading as well as thermal behavior such as decomposition, sublimation and accompanying heat generation are important factors in the formation of a good recording pit. Therefore, as to the organic compound used in the recording layer, it is required to select a material having appropriate optical properties and decomposition behavior.

The conventional write-once-read-many medium, especially a CD-R and a DVD-R are originally intended to maintain read-compatibility with a read-only recording medium (a ROM medium) which has concave pits formed in advance on a substrate covered with a reflective film such as Al, Ag and Au. Moreover, those media are intended to realize reflectivity of approximately 60% or more as well as high modulation over approximately 60%. First, in order to obtain high reflectivity in an unrecorded state, optical properties of the recording layer are specified. Normally, in the unrecorded state, a refractive index n is required to be about 2 or more and an extinction coefficient is required to be about 0.01 to 0.3 (see patent documents 5 and 6).

With the recording layer mainly made of dye, it is difficult to achieve high modulation of 60% or more only by use of changes in the optical properties caused by recording. Specifically, changes in the refractive index n and an extinction coefficient k are limited in the dye that is an organic substance. Thus, changes in the reflectivity in a planar state are limited.

Accordingly, there has been utilized a method of apparently increasing the change in reflectivity (reduction in reflectivity) in the recorded pit portion by use of an interference effect of reflected light due to a phase difference in the reflected light between the recorded pit portion and an unrecorded part. Specifically, there has been used the same principle as a phase difference pit such as the ROM medium. In the case of an organic recording layer having a smaller change in refractive index than an inorganic one, it has been reported that it is rather advantageous to mainly use the change in reflectivity due to the phase difference (see patent document 7). Moreover, there have been conducted studies comprehensively considering the recording principles described above (see nonpatent document 1).

The portion recorded as described above (sometimes called a recording mark part) will be hereinafter called a recording pit, a recorded pit portion or a recording pit portion regardless of its physical shape.

FIG. 1 is a view showing a write-once-read-many medium (optical recording medium 10) with a conventional configuration, which has a recording layer mainly made of dye. As shown in FIG. 1, the optical recording medium 10 is formed by sequentially forming at least a recording layer 12, a reflective layer 13 and a protective coating layer 14 in this order on a substrate 11 having grooves formed thereon. By use of an objective lens 18, a recording/reading light beam 17 is made incident through the substrate 11 on the recording layer 12. As a thickness of the substrate 11, 1.2 mm (CD) or 0.6 mm (DVD) is usually adopted. Moreover, a recording pit is formed in a portion of a substrate groove part 16, which is normally called a groove, on a near side when viewed from a plane 19 on which the recording/reading light beam 17 is made incident. The recording pit is not formed in a substrate inter-groove (land) part 15 on a far side.

In the publicly known documents described above, a change in phase difference is increased by making a change in refractive index as much as possible between before and after recording of the recording layer 12 containing dye. Meanwhile, it has been also reported that a change in a shape of a recorded pit portion, in other words, effects such as a local change in groove geometry in the recorded pit portion formed in the groove (a groove depth is equivalently changed by bulging or collapse of the substrate 11) and a change in a film thickness (an equivalent change in the film thickness by expansion or contraction of the recording layer 12) contribute to the change in phase difference.

In the recording principles as described above, reflectivity at the time of unrecording is enhanced, and the organic compound is decomposed by laser irradiation to cause a significant change in refractive index (thereby obtaining high modulation). Thus, normally, a recording/reading light wavelength is selected to be positioned at an edge on a long wavelength side of a large absorption band. This is because, at the edge on the long wavelength side of the large absorption band, there is obtained a wavelength region which has an appropriate extinction coefficient and a large refractive index.

However, there has not been found a material having optical properties equivalent to conventional ones with respect to a blue laser wavelength. Particularly, in the vicinity of 405 nm that is the center of an oscillation wavelength of a blue semiconductor laser, which has been currently put to practical use, any organic compound having the same optical constant as that required for the recording layer of the conventional write-once-read-many optical recording medium is hardly obtained. Such an organic compound is still under investigation. Furthermore, in the conventional write-once-read-many optical recording medium having the dye recording layer, there exists a main absorption band of the dye in the vicinity of the recording/reading light wavelength. Thus, dependence of its optical constant on wavelength is significant (the optical constant significantly varies depending on the wavelength). Consequently, there is a problem that, in response to individual differences of lasers or fluctuations of the recording/reading light wavelength due to a change in an environmental temperature and the like, recording sensitivity, modulation, recording characteristics such as jitter and an error rate, reflectivity, and the like are significantly changed.

For example, there has been reported an idea of recording using a dye recording layer having absorption in the vicinity of 405 nm. However, the dye used therein is required to have the same optical characteristics and functions as those of the conventional one. Therefore, such an idea depends absolutely on search for and discovery of a high-performance dye (see patent documents 8 and 9). Next, it has been reported that, in the write-once-read-many optical recording medium 10 using the conventional recording layer 12 mainly made of dye, as shown in FIG. 1, it is required to appropriately control the groove geometry and a distribution of thicknesses of the substrate groove part 16 and the substrate inter-groove (land) part 15 in the recording layer 12 (see patent documents 10, 11, and 12).

Specifically, from the viewpoint of securing high reflectivity as described above, only a dye having a relatively small extinction coefficient (about from 0.01 to 0.3) with respect to the recording/reading light wavelength can be used. Thus, it is impossible to reduce the thickness of the recording layer 12 in order to obtain light absorption required for recording in the recording layer 12 and to increase a change in phase difference between before and after recording. As a result, as the thickness of the recording layer 12, a thickness of about $\lambda/(2n_s)$ ($n_s$ is a refractive index of the substrate 11) is usually used. Moreover, it is required to use the substrate 11 having deep grooves in order to reduce crosstalk by burying the dye used for the recording layer 12 in the grooves. The recording layer 12 containing the dye is usually formed by use of a spin-coating method (a coating method). Thus, it is rather advantageous to use the thicker the recording layer 12 in the groove part by burying the dye in the deep grooves. Meanwhile, by using the coating method, there occurs a difference in the thickness of the recording layer between the substrate groove part 16 and the substrate inter-groove (land) part 15. However, occurrence of the difference in the thickness of the recording layer is effective in stably obtaining a tracking servo signal even by use of the deep grooves.

Specifically; concerning the groove geometry defined on the surface of the substrate 11 shown in FIG. 1 and groove geometry defined on an interface between the recording layer 12 and the reflective layer 13, both of signal characteristics and tracking signal characteristics in the recorded pit portion cannot be maintained well unless both of the groove geometries described above are maintained to have appropriate values. Usually, it is required to set a depth of the groove around $\lambda/(2n_s)$ ($\lambda$ is a wavelength of the recording/reading light beam 17 and $n_s$ is a refractive index of the substrate 11). The depth is set about 200 nm for a CD-R and about 150 nm for a DVD-R. It has become very difficult to form the substrate 11 having such deep grooves, which is a factor in lowering quality of the optical recording medium 10.

Particularly, in an optical recording medium using a blue laser beam, when $\lambda$=405 nm, deep grooves of about 100 nm are required. Meanwhile, a track pitch is often set to from 0.2 µm to 0.4 µm in order to realize high density. However, it is even more difficult to form such deep grooves at the narrow track pitch. In reality, mass production is almost impossible by use of conventional polycarbonate resin. Specifically, as to the medium using the blue laser beam, mass production thereof is likely to become difficult with a conventional configuration.

Furthermore, many examples in the patent documents described above are the example of FIG. 1 showing the conventional disk configuration. Meanwhile, in order to realize high-density recording using a blue laser, a configuration, so-called surface incidence, has attracted attention. There has been reported a configuration using an inorganic material recording layer such as a phase change recording layer (see nonpatent document 3). In the configuration called the surface incidence, contrary to the conventional case, at least a reflective film, a recording layer and a cover layer are sequentially formed in this order on a substrate having grooves formed therein. A focused laser beam for recording/reading is made incident through the cover layer to be applied on the recording layer. Usually, for a so-called Blu-Ray disk, a thickness of the cover layer is set to about 100 µm (nonpatent document 9). The reason why recording/reading light is made incident from such a thin cover layer side is because, as an objective lens for focusing the light, one having a numerical aperture (NA) higher than that of the conventional case (normally from 0.7 to 0.9, and 0.85 for the Blu-Ray disk) is used. In the case where an objective lens having a high NA (numerical aperture) is used, it is required to set the cover layer as thin as about 100 µm in order to reduce an influence of aberration due to the thickness of the cover layer. There have been reported a number of examples related to such blue wavelength recording and surface incidence layer configuration (see nonpatent document 4 and patent documents 13 to 24). Moreover, there have also been many reports concerning the related technologies (see nonpatent documents 5 to 8 and patent documents 25 to 36).

Nonpatent document 1: "Proceedings of International Symposium on Optical Memory", (U.S.A.), Vol. 4, 1991, p. 99-108

Nonpatent document 2: "Japanese Journal of Applied Physics", (Japan), Vol. 42, 2003, p. 834-840

Nonpatent document 3: "Proceedings of SPIE", (U.S.A.), Vol. 4342, 2002, p. 168-177

Nonpatent document 4: "Japanese Journal of Applied Physics", (Japan), Vol. 42, 2003, p. 1056-1058

Nonpatent document 5: "Compact disc dokuhon", written by Heitaro Nakajima and Hiroshi Ogawa, 3$^{rd}$ revised version, Ohmsha, 1996, p. 168

Nonpatent document 6: "Japanese Journal of Applied Physics", (Japan), Vol. 42, 2003, p. 914-918

Nonpatent document 7: "Japanese Journal of Applied Physics", (Japan), Vol. 39, 2000, p. 775-778

Nonpatent document 8: "Japanese Journal of Applied Physics", (Japan), Vol. 42, 2003, p. 912-914

Nonpatent document 9: "Optical disc kaitaishinsho", Edited by Nikkei Electronics, Nikkei BP Inc., 2003, Chapter 3

Nonpatent document 10: "Spectroellipsometry", Maruzen Publishing Company, 2003, Chapter 5

Nonpatent document 11: Secchakuzai to secchaku gijutsu nyumon", written by Alphonsus V. Pocius, translated by Hiroshi Mizumachi and Hirokuni Ono, Nikkan Kogyo Shimbunsha, 1999

Patent document 1: JP-A-2-168446

Patent document 2: JP-A-2-187939

Patent document 3: JP-A-3-52142

Patent document 4: JP-A-3-63943

Patent document 5: JP-A-2-87339

Patent document 6: JP-A-2-132656

Patent document 7: JP-A-57-501980

Patent document 8: WO 01/74600 pamphlet

Patent document 9: JP-A-2002-301870

Patent document 10: JP-A-3-54744

Patent document 11: JP-A-3-22224

Patent document 12: JP-A-4-182944

Patent document 13: JP-A-2003-331465

Patent document 14: JP-A-2001-273672

Patent document 15: JP-A-2004-1375

Patent document 16: JP-A-59-19253

Patent document 17: JP-A-8-138245

Patent document 18: JP-A-2004-30864

Patent document 19: JP-A-2001-273672

Patent document 20: JP-A-2002-245678

Patent document 21: JP-A-2001-155383

Patent document 22: JP-A-2003-303442

Patent document 23: JP-A-2002-367219

Patent document 24: JP-A-2003-16689

Patent document 25: JP-A-5-128589

Patent document 26: JP-A-5-174380

Patent document 27: JP-A-6-4901

Patent document 28: JP-A-2000-43423

Patent document 29: JP-A-2001-287466

Patent document 30: JP-A-2003-266954

Patent document 31: JP-A-9-277703

Patent document 32: JP-A-10-36693

Patent document 33: JP-A-2000-207772

Patent document 34: JP-A-2001-155383

Patent document 35: JP-A-11-273147

Patent document 36: JP-A-11-25523

Patent document 37: JP-A-2003-217173

Patent document 38: JP-A-2004-86932

Patent document 39: JP-A-2004-98542

Patent document 40: JP-A-2004-160742

Patent document 41: JP-A-2003-217177

Patent document 42: JP-A-2001-331936

Patent document 43: WO 03/003361 pamphlet

Patent document 44: JP-T-2005-504649

DISCLOSURE OF THE INVENTION

Problems to be Solved by the Invention

Incidentally, in a phase-change medium of a surface incidence type, of which development has been advanced, a recording mark is formed in a cover-layer groove part when viewed from incident light side. This is the same as conventional recording in a substrate groove part on a substrate when viewed from the incident light side. It is implied that the medium can be realized by use of approximately the same multilayer structure as that of a CD-RW or a DVD-RW. Actually, good characteristics are obtained. On the other hand, it is not easy to perform recording in a recording layer containing a dye as a main component, particularly, in the cover-layer groove part if the medium is made as a coating type. This is because, normally, the dye is naturally accumulated in a groove part of the substrate by use of spin-coating on the substrate. Even if the dye is applied to have an appropriate thickness in a substrate inter-groove (land) part, normally, a considerable amount of the dye is accumulated also in the substrate groove part. Accordingly, a recording pit (recording mark) formed in the cover-layer groove part tends to protrude to the cover-layer inter-groove part. Thus, a track pitch at which crosstalk is increased cannot be narrowed. Consequently, density growth is limited.

However, in most of the publicly-known documents described above, attention is focused on that, as in the conventional case, reflected light intensity is lowered by recording in the cover-layer groove part on a near side when viewed from the incident light side. Alternatively, attention is merely focused on lowering of reflectivity caused in a planar state in which a phase change of reflected light due to a step in the groove part is not considered. Alternatively, it is assumed that reflectivity change in the planar state where the phase shift is not used as much as possible is utilized. Under such preconditions, it is impossible to solve a problem of crosstalk in recording of the cover-layer groove part and to conform to a recording layer formation process by solution coating. It cannot be said that good recording characteristics in the cover-layer inter-groove part are realized by effectively utilizing the phase shift. Particularly, in mark length modulation recording, there has been no example of providing a practical recording power margin for the all mark lengths from the shortest mark length to the longest mark length and realizing good jitter characteristics.

As described above, it is the current situation that there has not yet been known a blue laser-compatible surface incidence write-once-read-many medium which has high performance equal to the conventional CD-R and DVD-R and has a recording layer mainly containing a low-cost dye.

The present invention has been made to solve the problems described above.

Specifically, it is an object of the present invention to provide a very high density optical recording medium having good recording/reading characteristics by use of a substrate which can be stably formed and has a relatively shallow groove.

Moreover, it is another object of the present invention to provide an optical recording method for an optical recording medium, by which excellent recording/reading characteristics are obtained.

Means for Solving the Problems

The inventors of the present invention have reached the present invention after keen examination on a coating type medium which can have a higher storage capacity, has a recording layer mainly made of a dye and is excellent in mass productivity in an optical recording medium having surface incidence configuration.

Specifically, according to the present invention, provided is an optical recording medium comprising a substrate having a guide groove formed therein, a layer having at least a light reflection function on the substrate, a recording layer containing, as a main component, a dye having a light absorption function with respect to a recording/reading light wavelength in an unrecorded state and a cover layer which makes the recording/reading light incident on the recording layer in this order. In the medium, when a guide groove part on a far side from a plane of incidence of the recording/reading light beam which is obtained by focusing the recording/reading light on the cover layer, is set as a recording groove part, and the reflected light intensity in a recorded pit portion formed in the recording groove part is set higher than the reflected light intensity in the unrecorded recording groove part.

According to the optical recording medium to which the present invention is applied, very high density information is recorded, and good recording/reading characteristics can be obtained based on the recorded information.

Here, in the optical recording medium to which the present invention is applied, the reflected light intensity in the recorded pit portion formed in the recording groove part is increased by a phase shift of the reflected light in the recorded pit portion.

Moreover, in the optical recording medium to which the present invention is applied, an interface of the layer having the light reflection function on the recording layer side is set as a reflection reference plane, a phase difference $\Phi b$ caused by a difference between a both-way optical path length to the reflection reference plane in the recording groove part and a both-way optical path length to the reflection reference plane in a recording inter-groove part of a guide groove in which the recorded pit portion is not formed is $0<|\Phi b|<\pi$, a phase difference $\Phi a$ in the case where the recorded pit portion exists in the recording groove part is $0<|\Phi a|<\pi$, and $|\Phi b|>|\Phi a|$ is established.

Furthermore, in the optical recording medium to which the present invention is applied, a relationship among a step $d_{GL}$ between the recording groove part and the inter-recording-groove part, which is specified by the reflection reference plane, a refractive index $n_d$ of the unrecorded recording layer at a recording/reading light wavelength $\lambda$, a refractive index $n_c$ of the cover layer at the recording/reading light wavelength $\lambda$, a recording layer thickness $d_G$ in the unrecorded recording groove part, and a recording layer thickness $d_L$ in the unrecorded inter-recording-groove part is $(\lambda/8) \leq |(n_d-n_c)\cdot(d_G-d_L)+n_c\cdot d_{GL}| \leq (15/64)\cdot\lambda$.

Next, if the present invention is grasped as a method category, provided is an optical recording method for an optical recording medium, by which recording and reading are performed by receiving recording/reading light from a cover-layer side, the optical recording medium having a structure in which at least a layer having a light reflection function, a recording layer containing, as a main component, a dye having a light absorption function with respect to the recording/reading light wavelength in an unrecorded state, and a cover layer are sequentially formed on a substrate having a guide groove formed therein. In the method, when a guide groove part on a far side from a plane of incidence of the recording/reading light beam which is obtained by focusing the recording/reading light on the cover layer is, set as a recording groove part, the reflected light intensity of a recorded pit portion formed in the recording groove part is set higher than the reflected light intensity in the unrecorded recording groove part.

Effect of the Invention

According to the present invention, a very high-density optical recording medium having good recording/reading characteristics can be obtained.

BRIEF DESCRIPTION OF THE DRAWINGS

FIG. 2 is a view showing a write-once-read-many medium (optical recording medium) with a surface incidence configuration including a recording layer mainly made of a dye, to which an embodiment of the present invention is applied.

FIG. 3 are views for explaining reflected light of a recording/reading light beam made incident from a substrate side in a substrate incidence configuration shown in FIG. 1, which is the conventional configuration.

FIG. 4 are views for explaining a multilayer structure of a surface incidence type medium and a phase difference in the case of recording in a cover-layer inter-groove part.

FIG. 5 are views for explaining the multilayer structure of the surface incidence type medium and a phase difference in the case of recording in a cover-layer on-groove part.

FIG. 12 shows an absorption spectrum in a state where only an metal-azo dye (dye A) used as a material of the recording layer is coated.

FIG. 13 are transmission electron micrographs of a cross section of disk 2 used in example 1.

BEST MODE FOR CARRYING OUT THE INVENTION

Hereinafter, best modes for carrying out the present invention (hereinafter referred to as embodiments) will be described. Note that the present invention is not limited to the following embodiments but various modifications can be made without departing from the scope of the invention.

Figure 1:
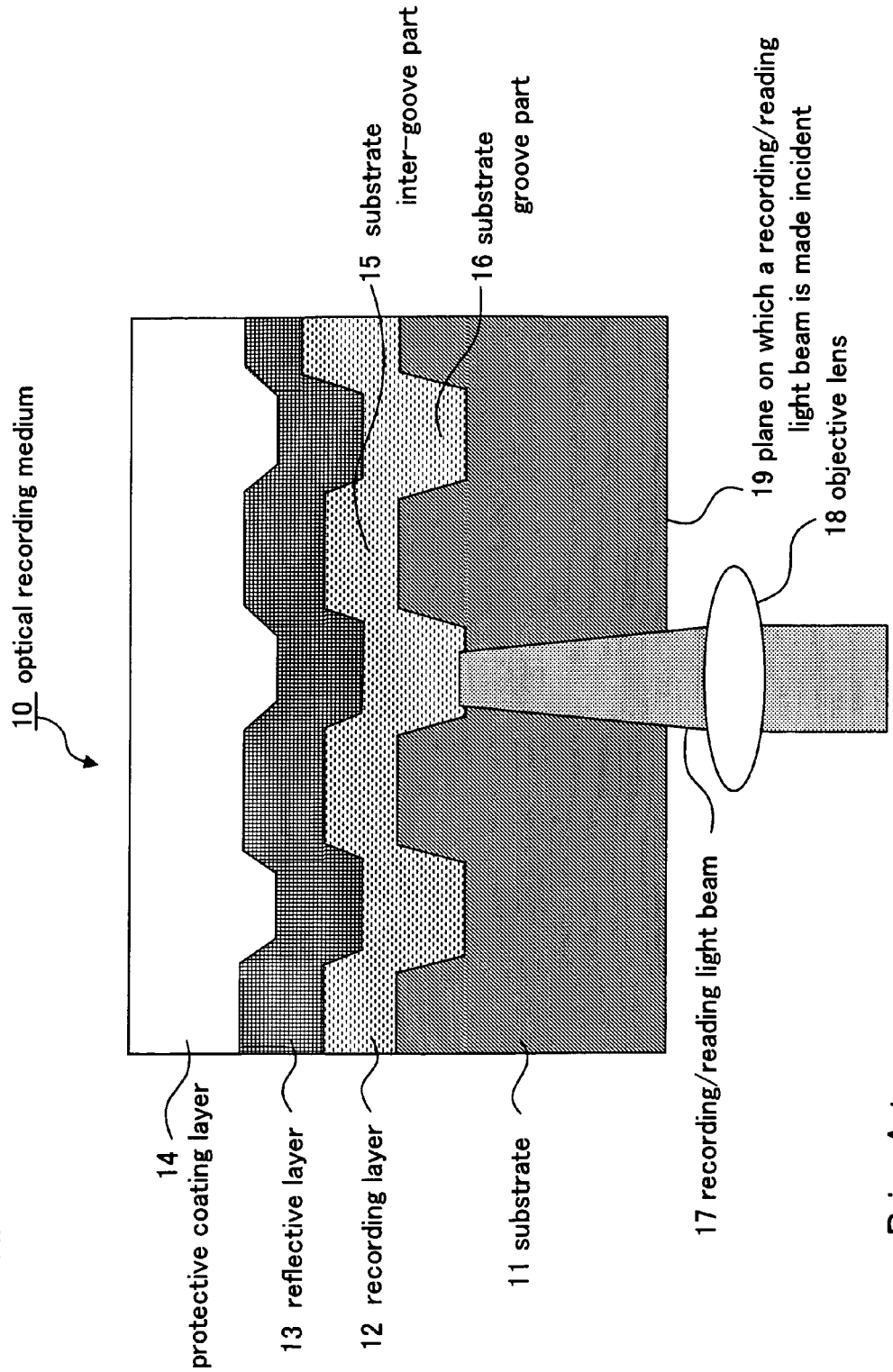
FIG. 1 is a view showing a write-once-read-many medium (optical recording medium) with a conventional configuration, which has a recording layer mainly made of a dye.

FIG. 2 is a view showing a write-once-read-many-medium (optical recording medium 20) having a surface incidence configuration including a recording layer mainly made of a dye, to which this embodiment is applied. In this embodiment, the medium has a structure in which at least a layer having a reflection function (a reflective layer 23), a recording layer 22 having a light absorption function and a cover layer 24 are sequentially formed on a substrate 21 having grooves formed therein. Specifically, as described later in FIG. 2, the recording layer 22 is mainly made of a dye having an absorption function for recording/reading light in an unrecorded (pre-recorded) state. Accordingly, recording and reading are performed by making the recording/reading light beam 27 incident, which is focused through an objective lens 28 from the cover layer 24 side. Specifically, the "surface incidence configuration" (also called a reverse stack) is adopted. In the following description, the layer with the reflection function will be simply called the "reflective layer 23" and the recording layer which is mainly made of the dye with the light absorption function will be simply called the "recording layer 22". As described above, the conventional configuration described with reference to FIG. 1 is called a "substrate incidence configuration". In the surface incidence configuration described with reference to FIG. 2 to be described later, when the recording/reading light beam 27 is made incident on the cover layer 24 side, an objective lens having a high NA (numerical aperture) of about from 0.6 to 0.9 is normally used for high-density recording. For the recording/reading light wavelength λ, a red to blue-violet wavelength (about from 350 nm to 600 nm) is often used. Furthermore, for high-density recording, it is preferable to use a wavelength range of from 350 nm to 450 nm. However, the present invention is not necessarily limited thereto.

In this embodiment, in FIG. 2, a guide groove part on a far side when viewed from a plane of incidence of the recording/reading light beam 27 on the cover layer 24 (a plane 29 on which the recording/reading light beam is made incident) (a guide groove part on a far side from the plane on which the recording/reading light beam is made incident) is set as a recording groove part. Accordingly, recording is performed so as to set a reflected light intensity of a recorded pit portion formed in the recording groove part to be higher than a reflected light intensity in the unrecorded recording groove part. As a main mechanism, the reflected light intensity is increased by a phase shift of the reflected light in the recorded pit portion. Specifically, a shift in a back and forth optical path length of the reflected light in the recording groove part between before and after recording is utilized.

Here, in the optical recording medium 20 of the surface incidence type, a guide groove part (corresponding to a groove part of the substrate 21) which is far from the plane of incidence of the recording/reading light beam 27 on the cover layer 24 (the plane 29 on which the recording/reading light beam is made incident) is called a cover-layer inter-groove part (in-groove) 25, and a guide groove part (corresponding to an inter-groove part of the substrate 21) which is close to the plane 29 on which the recording/reading light beam 27 is made incident is called a cover-layer groove part (on-groove) 26 (the terms "on-groove" and "in-groove" are from non-patent document 3).

To be more specific, the present invention can be realized by taking following measures.

(1) A groove having a depth at which a phase difference Φ between the reflected light from a cover-layer inter-groove part and reflected light from a cover-layer groove part in an unrecorded state is set to approximately π/2 to π is formed. A recording layer thickness in the cover-layer inter-groove part is set to be smaller than the groove depth. Meanwhile, a recording layer 22 is provided which is mainly made of a very thin dye having a thickness of approximately 0 in the cover-layer groove part. The cover-layer inter-groove part is irradiated by a recording/reading light beam from the cover-layer side to cause alteration in the recording layer. Thus, a recording pit is formed by an increase in the reflected light intensity mainly caused by a phase shift. In the surface incidence configuration, performance of a coating type dye medium is significantly improved compared with conventional on-groove H to L recording. Moreover, it is possible to perform recording at a high track pitch density (for example, from 0.2 μm to 0.4 μm) with small crosstalk. Moreover, it becomes easy to form a groove for such a high track pitch.

(2) As the recording layer 22, used is a main component dye which has a relatively low refractive index (for example, the refractive index of from 1.3 to 1.9) and a relatively high extinction coefficient (for example, the extinction coefficient of from 0.3 to 1) in the unrecorded state. A recorded pit portion is formed, in which a refractive index is lowered by recording on a side of incidence of recording/reading light on a reflective surface. Thus, a phase shift occurs, in which an optical path length of the recording/reading light transmitted through the recorded pit portion is shortened compared with that before recording. Specifically, a change that a recording groove part depth is optically reduced occurs, and the reflected light intensity is increased.

The refractive index may be lower than that in a recording medium using the conventional dye recording layer. The degree of freedom in a relationship between a main absorption band and a recording/reading light wavelength is increased. Particularly, a range of options to select a dye suitable for recording with a recording/reading light wavelength of around 400 nm is extended.

(3) Cavity formation in the recording layer 22 or in an interface portion thereof may be utilized to lower the refractive index in the recorded pit portion. Moreover, it is preferable to additionally use deformation of the recording layer 22 bulging toward the cover layer 24. At least on the recording layer 22 side of the cover layer 24, a soft deformation facilitating layer is formed, which is made of, for example, a pressure-sensitive agent having a glass transition temperature at room temperature or lower. Thus the deformation is facilitated. Consequently, directions of phase shift such as to increase the reflected light intensity by recording are aligned (distortion in a recording signal waveform is eliminated). Moreover, an amount of the phase shift (recording signal amplitude) can be increased even by a relatively small change in the refractive index. Furthermore, it is possible to additionally use an increase in the reflected light intensity, which is caused by reduction in an extinction coefficient of the recording layer and a reflectivity change caused in a planar state.

According to the above, it is possible to realize an optical recording medium comprising a substrate having guide grooves formed therein, a layer having at least a light reflection function on the substrate, a recording layer containing, as a main component, a dye having a light absorption function with respect to a recording/reading light wavelength in an unrecorded state and a cover layer which makes the recording/reading light incident on the recording layer, in this order. In the medium, when a guide groove part on a far side from a plane of incidence of the recording/reading light beam, which is obtained by focusing the recording/reading light, on the cover layer is set as a recording groove part, and the reflected light intensity in a recorded pit portion formed in the recording groove part is set higher than the reflected light intensity in the unrecorded recording groove part. The medium can obtain a recording signal of L to H polarity with high modulation and without distortion from the recorded pit portion.

(4) In addition to the above conditions, as the recording layer, a dye having a weight reduction start temperature of 300° C. or less and an extinction coefficient $k_d$ of 0.3 or more, which is an imaginary part of the complex refractive index in the unrecorded state, is used. Thus, jitter characteristics in high-speed recording at 10 m/s or more can be improved.

In the following description, optical characteristics in an unrecorded state (before recording) of the recording layer in the recording/reading light wavelength λ are expressed by a complex refractive index $n_d^* = n_d - i \cdot k_d$. Here, a real part $n_d$ is called a refractive index, and an imaginary part $k_d$ is called an extinction coefficient (also called an extinction coefficient). The recorded pit portion, in other words, after recording, $n_d$ is changed to $n_d' = n_d - \delta n_d$, and $k_d$ is changed to $k_d' = k_d - \delta k_d$.

Furthermore, description will be given of distinction between two terms reflectivity and reflected light intensity to be used below. The reflectivity means a proportion of reflected energy light intensity relative to incident energy light intensity in light reflection occurring between two kinds of substances having different optical characteristics in a planar state. Even if the recording layer is in a planar state, the reflectivity is changed when the optical characteristics are changed. Meanwhile, the reflected light intensity means intensity of light returning to a detector when a focused recording/reading light beam and an objective lens are used to read a surface of a recording medium.

In a ROM medium, a pit part and an unrecorded part (a pit peripheral part) are covered with a same reflective layer. Thus, the pit part and the unrecorded part have the same reflectivity of the reflective film. Meanwhile, a phase difference between the reflected light in the pit part and the reflected light in the unrecorded part brings about an interference effect which causes the reflected light intensity to look changed in the recorded pit portion (normally, to look as lowered). Such an interference effect occurs when the phase difference causes the reflected light in the recorded pit portion and the peripheral part to interfere with each other if the recording pit is locally formed and the recorded pit portion and the unrecorded part therearound are included within the diameter of the recording/reading light beam. Meanwhile, in a recordable medium in which some kind of an optical change occurs in a recorded pit portion, even if the medium is in a planar state without concave and convex, a change in a refractive index of a recording film itself causes a change in reflectivity. This is called a "reflectivity change caused in the planar state" in this embodiment. In other words, the change in reflectivity means a reflectivity change caused in the entire plane of the recording film depending on whether a refractive index is before recording or a refractive index after recording. Moreover, the change in reflectivity is a change in the reflected light intensity, which is caused regardless of interference of reflected light between the recording pit and the peripheral part thereof. Meanwhile, in the case where the optical change in the recording layer occurs in a local pit part, if a phase of the reflected light in the recorded pit portion is different from a phase of the reflected light in the peripheral part thereof, two-dimensional interference of reflected light occurs to cause the reflected light intensity to look locally changed in the recording pit peripheral part.

As described above, in this embodiment, the change in the reflected light intensity without considering the two-dimensional interference of the reflected light having difference phases is set to be a "reflected light intensity change caused in the planar state" or a "reflected light intensity change in the planar state". On the other hand, the change in the reflected light intensity in consideration of the two-dimensional interference of the reflected light having different phases in the recording pit and the peripheral part thereof is set to be a "(local) reflected light intensity change caused by the phase difference" or a "reflected light intensity change due to the phase difference". Accordingly, the both described above are differentiated from each other.

In general, if it is tried to obtain a sufficient reflected light intensity change, that is, amplitude of a recording signal (or optical contrast) by use of the "reflected light intensity change due to the phase difference", a change in the refractive index of the recording layer 22 itself has to be very large. For example, in a CD-R or a DVD-R, it is required that a real part of a refractive index before recording of a dye recording layer is from 2.5 to 3.0 and about from 1 to 1.5 after recording. Moreover, in terms of obtaining high reflectivity for ROM compatibility in the unrecorded state, it has been considered to be preferable that an imaginary part $k_d$ of a complex refractive index before recording of the dye recording layer be smaller than about 0.1. Moreover, it is required that the thickness of the recording layer 22 be as thick as from 50 nm to 100 nm. If the recording layer 22 does not have such a thickness, a large part of light passes through the recording layer 22. Accordingly, light absorption required for a sufficient reflected light intensity change and pit formation can never occur. As described above, in the thick dye recording layer, a local phase shift due to deformation in the pit part is merely supplementarily used. On the other hand, in the ROM medium described above, it is considered that there is no local change in refractive index in the recorded pit portion and only the "reflected light intensity change due to the phase difference" is detected. In order to obtain good recording quality, if the reflected light intensity change in the recorded pit portion occurs when the above-described two types of reflected light intensity changes are mixed, it is desirable that the two types of changes reinforce each other. The reinforcement of the two types of reflected light intensity changes means that directions of the respective reflected light intensity changes, in other words, increasing and decreasing of the reflected light intensity coincide with each other.

Such lowering of the refractive index of the recording layer leads to lowering of reflectivity and, consequently, lowering of reflected light intensity in the "reflected light intensity change in the planar state". In the conventional CD-R and DVD-R, as described above, the change in the refractive index can be 1 or more. Thus, lowering of reflectivity due to the "reflected light intensity change in the planar state" occupies a substantial portion of the amplitude of the recording signal. Therefore, basically, the reflectivity is lowered by recording. Moreover, it can be said that various studies have been done so as to allow the direction of the "reflected light intensity change due to the phase difference" in the recorded pit portion, which is supplementarily utilized, to contribute to lowering of the reflectivity. On the other hand, lowering of the extinction coefficient due to decomposition of the dye of the recording layer rather lowers signal amplitude along with an increase in the reflectivity. Thus, it is required to reduce a change in the extinction coefficient. Furthermore, in order to increase the reflectivity before recording as high as that of the ROM medium, it is desirable to reduce the extinction coefficient of the recording layer before recording. Thus, it is intended that the extinction coefficient is reduced to 0.3 and further to 0.2 or less.

Next, a reflection reference plane is first defined. As the reflection reference plane, a recording layer side interface (surface) of the reflective layer, which is to be a main reflective surface, is used. The main reflective surface means a reflection interface having the highest rate of contributing to reading reflected light. In FIG. 2 showing the optical recording medium 20 to which this embodiment is applied, the main reflective surface is on the interface between the recording layer 22 and the reflective layer 23. This is because the recording layer 22 to be targeted in the optical recording medium 20 to which this embodiment is applied is relatively thin and has a low extinction coefficient. Thus, a large portion of light energy merely passes through the recording layer 22 and can reach a boundary with the reflective surface. Note that there is also another interface which can cause reflection, and reflected light intensity of reading light is determined by total contribution of the reflected light intensity and the phase from the respective interfaces. In the optical recording medium 20 to which this embodiment is applied, contribution of reflection on the main reflective surface constitutes a major portion. Thus, it is only necessary to consider only intensity and phase of light reflected on the main reflective surface. Consequently, the main reflective surface is set to be the reflection reference plane.

In this embodiment, first, in FIG. 2, a pit (mark) is formed in the cover-layer inter-groove part 25. This is in order to primarily utilize the recording layer 22 which is easily manufactured and is formed by use of a spin-coating method. On the contrary, by utilizing a coating method, the thickness of the recording layer in the cover-layer inter-groove part (substrate groove part) 25 is naturally set to be larger than the thickness thereof in the cover-layer groove part (substrate inter-groove (land) part) 26. However, the thickness thereof is not as large as to obtain a sufficient reflected light intensity change by the "reflected light intensity change in the planar state". Principally, by the "reflected light intensity change in consideration of interference", even if the recording layer thickness is relatively thin and a change in refractive index of the recording layer itself is small, a large reflected light intensity change (high modulation) can be realized in the pit part formed in the cover-layer inter-groove part 25.

In this embodiment, a change in the phase of the reflected light in the recorded pit portion causes such a shift as to allow a step between the cover-layer inter-groove part 25 and the cover layer groove part 26 in FIG. 2, which are formed of the reflection reference plane, to look optically shallower after recording than before recording. In this event, in order to stabilize tracking servo, first, a phase shift so as to increase the reflected light intensity after recording compared with the reflected light intensity before recording is generated in the recording pit without causing inversion of a push-pull signal.

The multilayer structure of the optical recording medium 20 with the surface incidence configuration shown in FIG. 2, to which this embodiment is applied, will be described while comparing the medium 20 with the optical recording medium 10 with the substrate incidence configuration in FIG. 1, which has been described as the conventional configuration. Here, in order to differentiate the multilayer structure of the optical recording medium 10 shown in FIG. 1 from that of the optical recording medium 20 shown in FIG. 2 by focusing on the phase of light reflected on the reflection reference plane, studies will be conducted with reference to FIGS. 3, 4, and 5 corresponding to respective cases where recording is performed in the substrate groove part 16 in FIG. 1 and where recording is performed in the cover-layer inter-groove part 25 and the cover-layer groove part 26 in FIG. 2.

FIG. 3 are views for explaining the reflected light of the recording/reading light beam 17 made incident from the substrate 11 side in the substrate incidence configuration shown in FIG. 1, which is the conventional configuration.

FIG. 4 are views for explaining a multilayer structure of the surface incidence type medium (the optical recording medium 20) and a phase difference in the case of recording in the cover-layer inter-groove part 25.

FIG. 5 are views for explaining a multilayer structure of the surface incidence type medium (the optical recording medium 20) and a phase difference in the case of recording in the cover-layer groove part 26.

Specifically, FIGS. 4 and 5 are views for explaining the reflected light of the recording/reading light beam 27 made incident from the incidence plane 28 side of the cover layer 24 in the surface incidence configuration in the optical recording medium 20 with the surface incidence configuration shown in FIG. 2. In FIG. 4, a pit is formed in the cover-layer inter-groove part (substrate groove part) 25 in the optical recording medium 20 to which this embodiment is applied. In FIG. 5, for comparison of effects of the present invention, a pit is formed in the cover-layer groove part (substrate inter-groove (land) part) 26 while adopting the same surface incidence configuration.

FIGS. 3A, 4A, 5A and FIGS. 3B, 4B, 5B are cross-sectional views including a recording pit before and after recording, respectively. Hereinafter, a groove and an inter-groove part on a side where a recording pit is formed will be called a "recording-groove part", and a part therebetween will be called a "inter-recording-groove part". Specifically, in FIG. 3 with the conventional configuration, the substrate groove part 16 is the "recording groove part", and the substrate inter-groove (land) part 15 is the "inter-recording-groove part". Moreover, in FIG. 4 according to the present invention, the cover-layer inter-groove part 25 is the "recording groove part", and the cover-layer groove part 26 is the "inter-recording-groove part". On the other hand, in FIG. 5 for comparative description, the cover-layer groove part 26 is the "recording groove part", and the cover-layer inter-groove part 25 is the "inter-recording-groove part".

First, upon estimating a phase difference between reflected light in the recording groove part and reflected light in the inter-recording-groove part, a phase reference plane is defined by A-A'. In FIGS. 3, 4, and 5, A-A' corresponds to an interface between the recording layer 12 and the substrate 11 in the recording groove part (FIG. 3A), to an interface between the recording layer 22 and the cover layer 24 in the inter-recording-groove part (FIG. 4A), and to an interface between the recording layer 22 and the cover layer 24 in the recording groove part (FIG. 5A), in FIGS. 3A, 4A and 5A in the unrecorded state, respectively. Meanwhile, in FIGS. 3B, 4B and 5B in the state after recording, A-A' corresponds to an interface between the recording layer 12 (a mixture layer 16m) and the substrate 11 in the recording groove part (FIG. 3B), to the interface between the recording layer 22 and the cover layer 24 in the inter-recording-groove part (FIG. 4 B), and to an interface between the recording layer 22 (a mixture layer 26m) and the cover layer 24 in the recording groove part (FIG. 4B). Above the plane A-A' (on the incidence side), no optical difference is caused by an optical path. Moreover, a reflection reference plane in the recording groove part before recording is defined by B-B', and a bottom of the substrate 21 (FIG. 3) or the cover layer 24 (FIG. 4) in the recording groove part before recording (the interface between the recording layer 12 and the substrate 11 or the interface between the recording layer 22 and the cover layer 24) is defined by C-C'. In FIGS. 3 and 5, A-A' coincides with C-C' before recording.

It is assumed that a thickness of the recording layer in the substrate groove part before recording is $d_G$, a thickness thereof in the substrate inter-groove (land) part is $d_L$, a step between the recording groove part and the inter-recording-groove part on the reflection reference plane is $d_{GL}$, and a step of the inter-recording-groove part on the substrate surface is $d_{GLS}$. In the case of FIG. 3, $d_{GL}$ depends on how the recording layer 12 is buried in the recording groove part and takes a value different from that of $d_{GLS}$. In the case of FIGS. 4 and 5, although depending on how the reflective layer 23 is covered in the recording groove part and the inter-recording-groove part, normally, the reflective layer 23 has approximately the same thickness in both of the recording groove part and the inter-recording-groove part. Thus, since the step on the surface of the substrate 21 is directly reflected, $d_{GL}=d_{GLS}$ is established.

It is assumed that a refractive index of each of the substrates 11 and 21 is $n_s$ and a refractive index of the cover layer 24 is $n_c$. In general, formation of recording pit causes the following changes. In the recorded pit portions 16p, 25p and 26p, the refractive index of each of the recording layers 12 and 22 is changed from $n_d$ to $n_d'=n_d-\delta n_d$. Moreover, in the recorded pit portions 16p, 25p and 26p, mixing occurs between the recording layer 12 and the substrate 11 or between the substrate 21 and the cover layer 24 material on the incidence side interface with the recording layers 12 and 22. Thus, mixture layers are formed. Furthermore, the volume of each of the recording layers 12 and 22 is changed, and the position of the reflection reference plane (interface between the recording layer and the reflective layer) is moved. Note that, normally, formation of the mixture layer between the substrate 11 or 21 that is an organic substance or the cover layer 24 material and the reflective layer material that is metal is negligible. Between the recording layer 12 and the substrate 11 (FIG. 1) or between the recording layer 22 and the cover layer 24 (FIG. 2), the recording layer 12 and the substrate 11 or the recording layer 22 and the cover layer 24 material are mixed. Thus, mixture layers 16m, 25m and 26m having a thickness of $d_{mix}$ are formed. Moreover, refractive indices of the mixture layers 16m, 25m and 26m are $n_s'=n_s-\delta n_s$ (FIG. 3B) and $n_c'=n_c-\delta n_c$ (FIGS. 4B and 5B).

In this event, the interface between the recording layer 12 and the substrate 11 or between the recording layer 22 and the cover layer 24 is moved by $d_{bmp}$ after recording in reference to C-C'. As shown in FIGS. 3, 4, and 5, $d_{bmp}$ sets a direction moving toward inside of the recording layers 12 and 22 to be positive. On the contrary, if $d_{bmp}$ is negative, it means that the recording layers 12 and 22 expand beyond the plane C-C'. Moreover, if an interface layer which hinders mixing of the layers is provided between the recording layer 12 and the substrate 11 in FIG. 3 or between the recording layer 22 and the cover layer 24 in FIGS. 4 and 5, $d_{mix}=0$ can be established. However, the change in the volume of the recording layers 12 and 22 can cause a change in $d_{bmp}$. It is considered that an influence of a change in the refractive index of the substrate 21 or the cover layer 24 along with the change in $d_{bmp}$ when no dye mixing occurs, is small and negligible.

Meanwhile, it is assumed that an amount of movement of the reflection reference plane in the recording groove part is $d_{pit}$ in reference to the position B-B' of the reflection reference plane before recording. As shown in FIGS. 3, 4, and 5, $d_{pit}$ sets a direction in which the recording layers 12 and 22 are contracted (a direction in which the reflection reference plane moves toward inside of the recording layers 12 and 22) to be positive. On the contrary, if $d_{pit}$ is negative, it means that the recording layers 12 and 22 are expanded beyond the plane B-B'. The thickness of the recording layer after recording is obtained as follows.

$$d_{Ga}=d_G-d_{pit}-d_{bmp} \qquad (1)$$

Note that none of $d_{GL}$, $d_G$, $d_L$, $d_{mix}$, $n_d$, $n_c$, $n_s$ and $d_{Ga}$ takes a negative value because of their definitions and physical characteristics.

For such recording pit modeling and a phase estimation method to be described below, publicly-known methods are referred to (nonpatent document 1).

Now, phase differences of reading light (reflected light) between the recording groove part and the inter-recording-groove part on the phase reference plane A-A' before recording and after recording are obtained. A phase difference of reflected light between the recording groove part and the inter-recording-groove part before recording is set to Φb. At the same time, a phase difference of reflected light between the recorded pit portions 16p, 25p and 26p and the inter-recording-groove part after recording is set to Φa. The phase differences are collectively called Φ. Both of Φb and Φa are defined as follows.

$$\Phi = \Phi b \text{ or } \Phi a = \text{(phase of the reflected light from inter-recording-groove part)} - \text{(phase of the recording groove part (including pit part after recording))} \quad (2)$$

$$\Phi = \Phi b \text{ or } \Phi a = (2\pi/\lambda)\cdot 2 \cdot \{\text{(optical path length of the inter-recording-groove part)} - \text{(optical path length of the recording groove part (including pit part after recording))}\} \quad (3)$$

Here, the reason why the equation (3) includes a coefficient of 2 for multiplication is because a both-way optical path length is considered.

In FIG. 3, the following equation is obtained.

$$\Phi b_1 = (2\pi/\lambda)\cdot 2 \cdot (n_s \cdot d_{GL} + n_d \cdot d_L - n_d \cdot d_G) = (4\pi/\lambda)\cdot\{n_s \cdot d_{GL} - n_d\cdot(d_G - d_L)\} \quad (4)$$

$$\Phi a_1 = (2\pi/\lambda)\cdot 2 \cdot \{n_s \cdot d_{GL} + n_s \cdot (d_{mix} - d_{bmp}) + n_d \cdot d_L - [(n_d - \delta n_d)\cdot(d_G - d_{pit} - d_{bmp}) + (n_s - \delta n_s)\cdot d_{mix}]\} = \Phi b_1 + \Delta\Phi \quad (5)$$

Note that the following equation is obtained at the same time.

$$\Delta\Phi = (4\pi/\lambda)\{(n_d - n_s)\cdot d_{bmp} + n_d \cdot d_{pit} + \delta n_s \cdot d_{mix} + \delta n_d\cdot(d_G - d_{pit} - d_{bmp})\} \quad (6)$$

Moreover, since the recording groove part is on nearer side than the inter-recording-groove part when viewed from the incidence side, $\Phi b_1 > 0$ is obtained.

Meanwhile, in FIG. 4, the following equations are obtained.

$$\Phi b_2 = (2\pi/\lambda)\cdot 2 \cdot \{n_d \cdot d_L - [n_d \cdot d_G + n_c\cdot(d_L + d_{GL} - d_G)]\} = (4\pi/\lambda)\cdot\{(n_c - n_d)\cdot(d_G - d_L) - n_c \cdot d_{GL}\} \quad (7)$$

$$\Phi a_2 = (2\pi/\lambda)\cdot 2 \cdot \{n_d \cdot d_L - [n_c\cdot(d_L + d_{GL} - d_G + d_{bmp} - d_{mix}) + (n_d - \delta n_d)\cdot(d_G - d_{pit} - d_{bmp}) + (n_c + \delta n_c)\cdot d_{mix}]\} = \Phi b_2 + \Delta\Phi \quad (8)$$

Note that the following equation is obtained at the same time.

$$\Delta\Phi = (4\pi/\lambda)\{(n_d - n_c)\cdot d_{bmp} + n_d \cdot d_{pit} + \delta n_c \cdot d_{mix} + \delta n_d\cdot(d_G - d_{pit} - d_{bmp})\} \quad (9)$$

Moreover, since the recording groove part is on the far side than the inter-recording-groove part when viewed from the incidence side, $\Phi b_2 < 0$ is obtained.

Furthermore, in FIG. 5, the following equation is obtained.

$$\Phi b_3 = (2\pi/\lambda)\cdot 2 \cdot \{n_d \cdot d_G + n_c\cdot(d_L + d_{GL} - d_G) - n_d \cdot d_L\} = (4\pi/\lambda)\cdot\{(n_d - n_c)\cdot(d_G - d_L) + n_c \cdot d_{GL}\} \quad (10)$$

$$\Phi a_3 = (2\pi/\lambda)\cdot 2 \cdot \{n_d \cdot d_G + n_c\cdot(d_L + d_{GL} - d_G) + n_c\cdot(d_{mix} - d_{bmp}) - [(n_d - \delta n_d)\cdot(d_L - d_{pit} - d_{bmp}) + (n_c - \delta n_c)\cdot d_{mix}]\} = \Phi b_3 + \Delta\Phi \quad (11)$$

Note that the following equation is obtained at the same time.

$$\Delta\Phi = (4\pi/\lambda)\{(n_d - n_c)\cdot d_{bmp} + n_d \cdot d_{pit} + \delta n_c \cdot d_{mix} + \delta n_d\cdot(d_L - d_{pit} - d_{bmp})\} \quad (12)$$

Moreover, since the recording groove part is at nearer side than the inter-recording-groove part when viewed from the incidence side, $\Phi b_3 > 0$ is obtained.

ΔΦ is the phase shift in the pit part, which is caused by recording, and, except that $d_L$ is replaced with $d_G$ in the equation (12), ΔΦ can be expressed by the same equation in any cases. Moreover, $\Phi b_1$, $\Phi b_2$ and $\Phi b_3$ are collectively denoted by Φb, and $\Phi a_1$, $\Phi a_2$ and $\Phi a_3$ are collectively denoted by Φa.

Modulation m of a signal, which is caused by ΔΦ is as follows.

$$m \propto 1 - \cos(\Delta\Phi) = \sin^2(\Delta\Phi/2) \quad (13)$$

$$\approx (\Delta\Phi/2)^2 \quad (14)$$

The rightmost side (14) is approximation in the case where ΔΦ is small.

If |ΔΦ| is large, the modulation is increased. However, usually, the phase shift |ΔΦ| by recording is between 0 and π, and it is considered that the phase shift is normally about π/2 or less. In reality, there has not been reported such a large phase shift in the conventional dye recording layer such as the conventional CD-R and DVD-R. Moreover, as described above, in the blue wavelength range, the phase shift tends to get even smaller due to general characteristics of the dye. On the other hand, a shift in which |ΔΦ| exceeds π may invert push-pull forcing between before and after recording and may increase a change in a push-pull signal too much. Thus, such a shift is not preferable from the viewpoint of maintaining stability of tracking servo.

Figure 6:
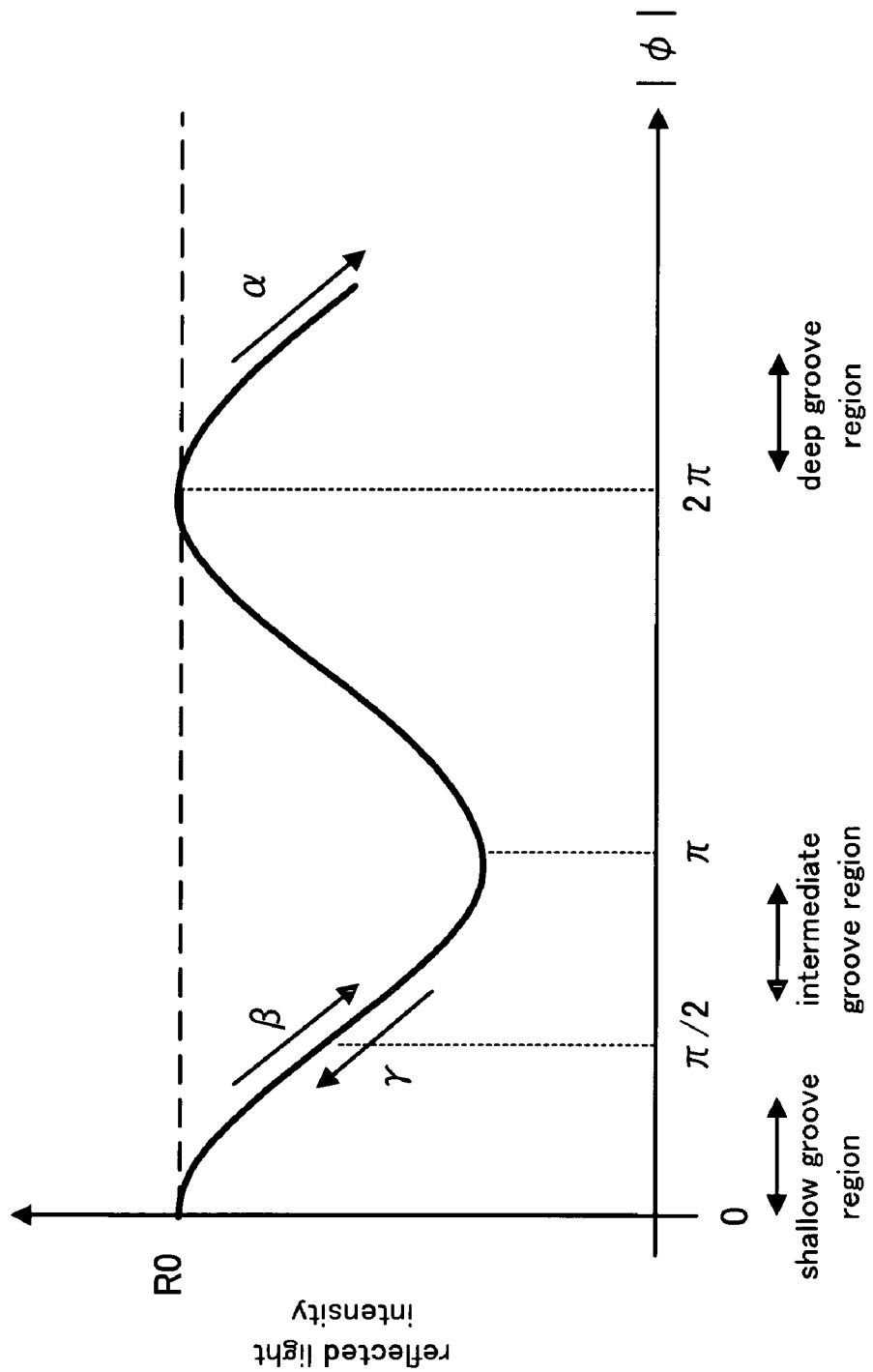
FIG. 6 is a graph showing a relationship between a phase difference and reflected light intensity in a recording groove part and a inter-recording-groove part.

Here, FIG. 6 is a graph showing a relationship between the phase difference and the reflected light intensity in the recording groove part and the inter-recording-groove part. FIG. 6 shows a relationship between |Φ| and the reflected light intensity in the recording groove part before and after recording. Here, for simplicity, an influence of absorption in the recording layers 12 and 22 is ignored. In the configurations of FIGS. 3 and 5, normally, Φb>0 is maintained. Thus, the case of ΔΦ>0 indicates the direction in which |Φ| in FIG. 6 is increased. This means, specifically, that Φb is increased to be Φa.

Meanwhile, in the configuration of FIG. 4, normally, Φb<0 is maintained. Thus, the case of ΔΦ<0 indicates the direction in which |Φ| in FIG. 6 is increased. Specifically, the relationship corresponds to one obtained by multiplying the horizontal axis in FIG. 6 by (−1). Thus, this means that |Φb| is increased to be |Φa|.

If the reflectivity of the recording groove part in the planar state ($d_{GL}=0$) is R0, as |Φ| is increased, an interference effect is caused by the phase difference Φb of the reflected light between the recording groove part and the inter-recording-groove part. Accordingly, the reflected light intensity is lowered. When the phase difference |Φ| becomes equal to π (half-wavelength), the reflected light intensity becomes minimum. Furthermore, if |Φ| is increased beyond π, the reflected light intensity is increased, and the intensity becomes maximum at |Φ|=2π.

Here, push-pull signal intensity becomes maximum when the phase difference |Φ| is π/2. Moreover, the push-pull signal intensity becomes minimum when |Φ| is π, and a polarity is inverted. Thereafter, the push-pull signal intensity is increased or decreased again to become minimum when |Φ| is 2π, and the polarity is inverted again. The above relationship is exactly the same as the relationship between the depth (equivalent to $d_{GL}$) of the pit part and the reflectivity in the ROM medium due to the phase pit (nonpatent document 5).

Some description will be given below of the push-pull signal.

Figure 7:
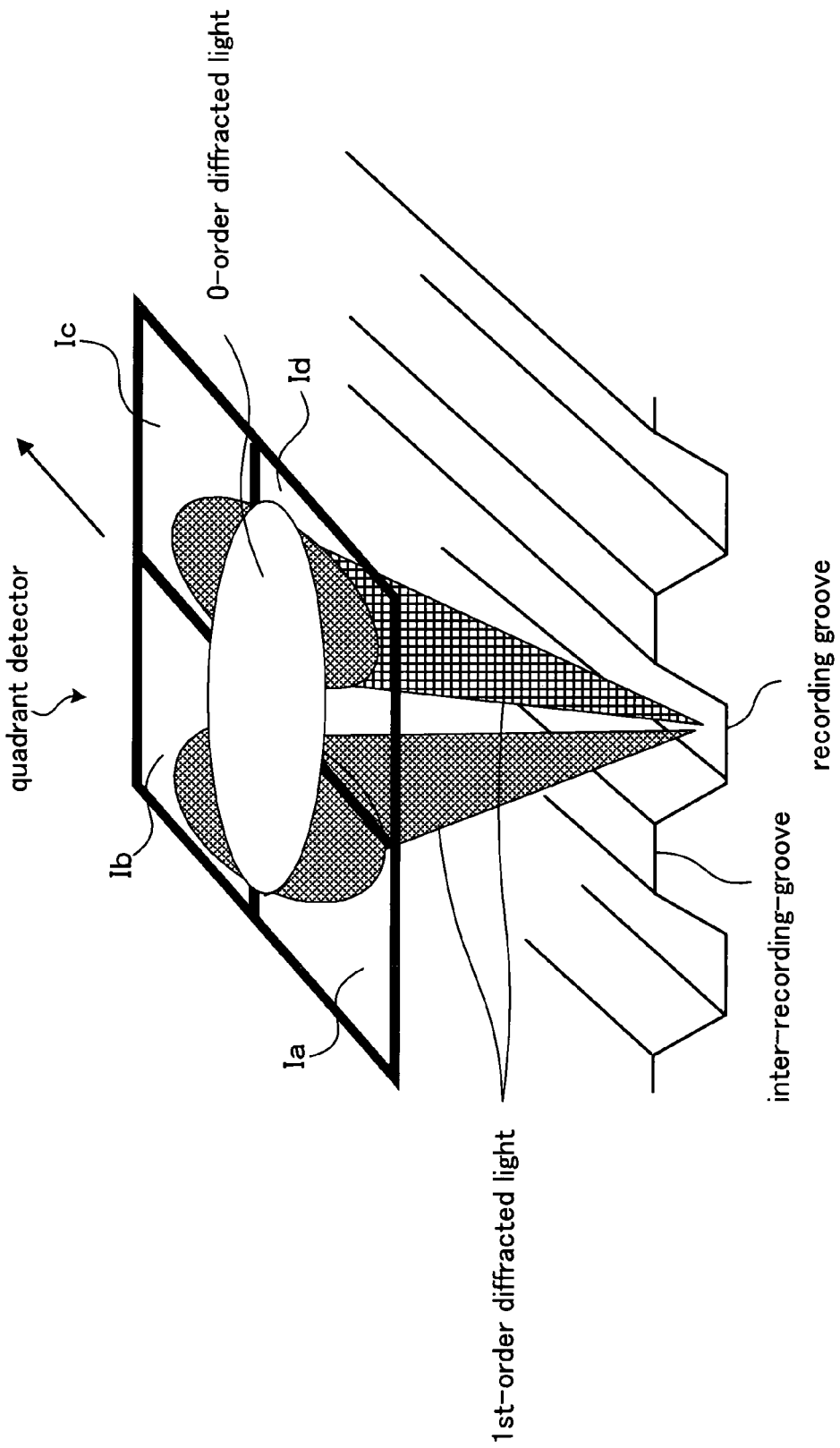
FIG. 7 is a view showing a configuration of a quadrant detector which detects a recording signal (sum signal) and a push-pull signal (difference signal).

FIG. 7 is a view showing a configuration of a quadrant detector which detects a recording signal (sum signal) and a push-pull signal (differential signal). The quadrant detector consists of four independent photodetectors, and respective outputs are set to be Ia, Ib, Ic and Id. 0-order diffracted light and 1$^{st}$-order diffracted light from the recording groove part and the inter-recording-groove part in FIG. 7 are received by the quadrant detector and converted into electric signals. Based on the signals from the quadrant detector, the following operation output is obtained.

$$I\text{sum}=(Ia+Ib+Ic+Id) \quad (15)$$

$$IPP=(Ia+Ib)-(Ic+Id) \quad (16)$$

Figure 8:
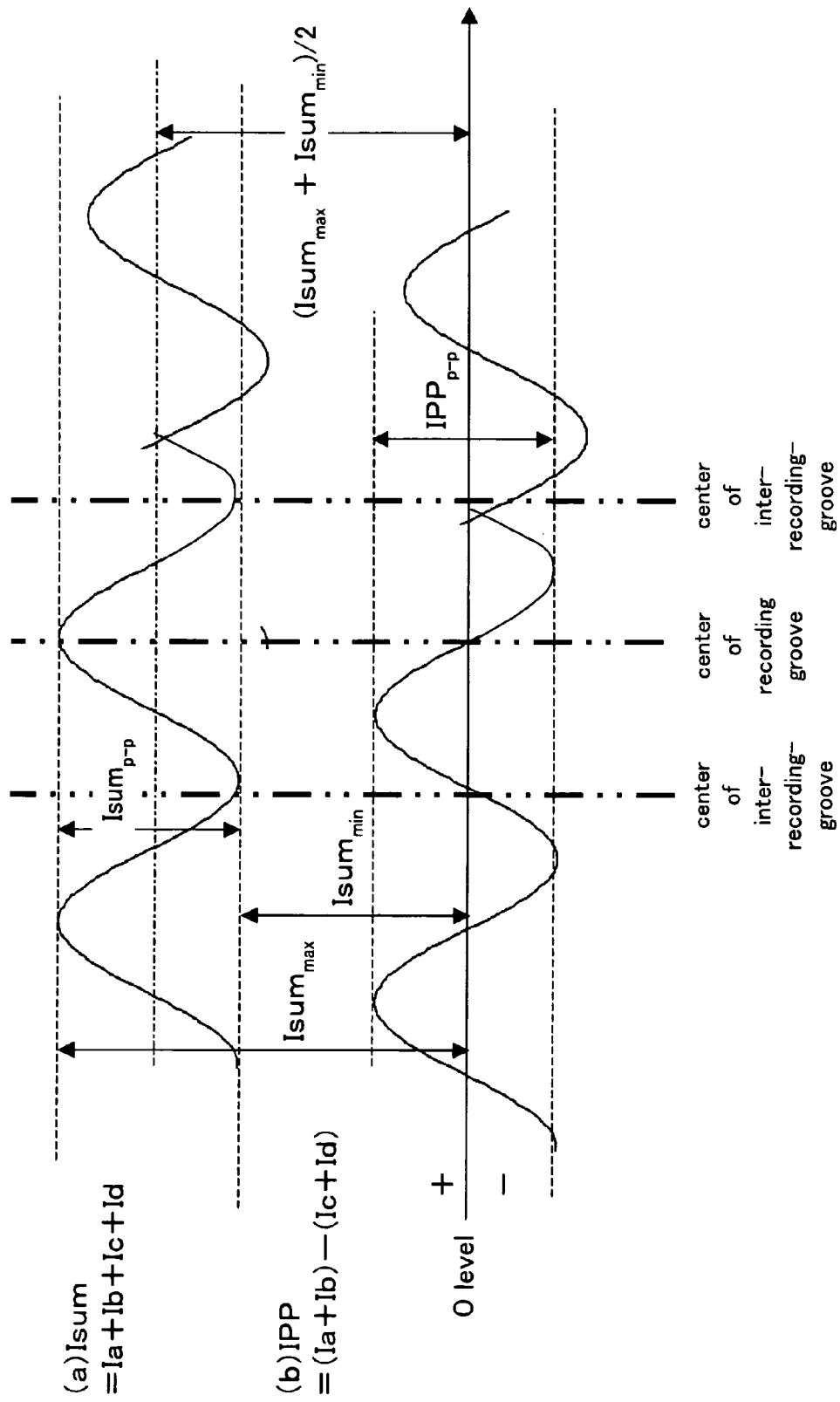
FIG. 8 is a diagram showing signals detected after an output signal actually obtained while crossing a plurality of recording grooves and between grooves passes a low-frequency pass filter (cut-off frequency of about 30 kHz).

Moreover, FIG. 8 is a diagram showing signals detected after an output signal actually obtained while crossing a plurality of recording grooves and between grooves passes a low-frequency pass filter (cut-off frequency of about 30 kHz).

In FIG. 8, $I\text{sum}_{max}$ and $I\text{sum}_{min}$ correspond to when the light beam passes right above the recording groove part or the inter-recording-groove part (above the center axis). $I\text{sum}_{p-p}$ is peak-to-peak signal amplitude of the Isum signal. $IPP_{p-p}$ is peak-to-peak signal amplitude of the push-pull signal. The push-pull signal intensity refers to $IPP_{p-p}$ and is distinguished from the push-pull signal IPP itself.

The tracking servo performs feedback servo by using the push-pull signal ((b) IPP in FIG. 8) as an error signal. In FIG. 8, the point where a polarity of the IPP signal (b) is switched from + to − corresponds to the center of the recording groove part, and the point where the polarity thereof is changed from − to + corresponds to the inter-recording-groove part. Inversion of the polarity of the push-pull signal means that the change in + and − is inverted. When + and − are inverted, although servo is supposedly targeted to the recording groove part (in other words, the recording groove part is supposedly irradiated by a focused beam spot), there arises inconvenience that the servo is targeted to the inter-recording-groove part on the contrary.

The Isum signal when the servo is targeted to the recording groove part is the recording signal. In this embodiment, an increase change after recording will be described. Here, the following operation output is called normalized push-pull signal intensity ($IPP_{norm}$).

$$IPP_{norm}=IPP_{p-p}/\{(I\text{sum}_{max}+I\text{sum}_{min})/2\} \quad (17)$$

One obtained by using IPP in place of $IPP_{p-p}$ in the equation (17) is a normalized push-pull signal.

The definitions of the normalized push-pull signal and the normalized push-pull signal intensity as described above are the same as general ones defined by the standards of recordable CD and DVD.

As is clear from the equation (13) described above, the relationship between the phase difference and the reflected light intensity as shown in FIG. 6 is periodical. The change in |Φ| between before and after recording, that is, |Φ| is normally smaller than about (π/2) in a medium mainly made of a dye. On the other hand, in this embodiment, the change in |Φ| by recording is π or less at a maximum. Thus, if necessary, the thickness of the recording layer may be accordingly reduced.

Here, if, when viewed from the phase reference plane A-A', the phase (or the optical path length) of the reflected light in the recording groove part gets smaller than that before recording by formation of the recorded pit portions 16p, 25p and 26p (if the phase is delayed compared to that before recording), that is, if ΔΦ>0, an optical distance (optical path length) of the reflection reference plane is reduced when viewed from the incidence side. This means that the reflection reference plane looks approaching a light source (or the phase reference plane A-A'). Therefore, in FIG. 3, there is the same effect as that the reflection reference plane of the recording groove part is moved downward ($d_{GL}$ is increased). As a result, the reflected light intensity in the recorded pit portion 16p is reduced. In FIG. 4, on the contrary, there is the same effect as that the reflection reference plane of the recording groove part is moved upward ($d_{GL}$ is reduced). As a result, the reflected light intensity in the recorded pit portion 25p is increased. In FIG. 5, there is the same effect as that the reflection reference plane of the recording groove part is moved upward ($d_{GL}$ is increased). As a result, the reflected light intensity in the recorded pit portion 26p is reduced.

Meanwhile, if, when viewed from the phase reference plane A-A', the phase (or the optical path length) of the reflected light in the recorded pit portions 16p, 25p and 26p gets larger than that before recording (if the phase is delayed compared to that before recording), that is, if ΔΦ<0, the optical distance (optical path length) of the reflection reference plane is increased when viewed from the incidence side. This means that the reflection reference plane looks moving away from the light source (or the phase reference plane A-A'). Therefore, in FIG. 3, there is the same effect as that the reflection reference plane of the recording groove part is moved upward ($d_{GL}$ is reduced). As a result, the reflected light intensity in the recorded pit portion 16p is increased. In FIG. 4, on the contrary, there is the same effect as that the reflection reference plane of the recording groove part is moved downward ($d_{GL}$ is increased). As a result, the reflected light intensity in the recorded pit portion 25p is reduced. In FIG. 5, there is the same effect as that the reflection reference plane of the recording groove part is moved downward ($d_{GL}$ is reduced). As a result, the reflected light intensity in the recorded pit portion 26p is increased. Here, a direction of the change in reflected light intensity, such as whether the reflected light intensity in the recorded pit portion is reduced or increased after recording, is called a polarity of recording (signal).

Therefore, if there occurs a phase shift which leads to ΔΦ<0 in the recorded pit portions 16p, 25p and 26p, in the recording groove parts of FIGS. 3 and 5, it is preferable to utilize the polarity of the signal, in which the reflected light intensity is lowered [High to Low] (hereinafter simply described as H to L) by recording. In the recording groove part of FIG. 4, it is preferable to utilize the polarity in which the reflected light intensity is increased [Low to High] (hereinafter simply described as L to H) by recording. Meanwhile, if a phase shift which leads to ΔΦ<0 occurs, in the recording groove parts of FIGS. 3 and 5, it is preferable to utilize the polarity to be L to H. In the recording groove part of FIG. 4, it is preferable to utilize the polarity to be H to L. The above relations are collectively shown in Table 1. Table 1 shows, in the configurations and the recording groove parts of FIGS. 3, 4, and 5, which one of the polarities H to L and L to H in the reflected light intensity change is preferable for ΔΦ.

TABLE 1

|  | ΔΦ > 0 | ΔΦ < 0 |
| --- | --- | --- |
| FIG. 3 | H to L | L to H |
| FIG. 4 | L to H | H to L |
| FIG. 5 | H to L | L to H |

As described above, depending on in which one of the substrate (cover-layer) groove part and the substrate (cover-layer) inter-groove part the recording pit formation position (the recording groove part) is positioned, and depending on the direction of the phase shift in the reflected light in the recorded pit portion, there are cases where the direction (increase and decrease) of the phase shift in the reflected light by recording is preferable and not preferable. In the phase-change recording medium, there has heretofore been an example of use of the phase shift in the reflected light intensity, as phase difference recording. However, in the write-once-read-many medium using the dye recording layer, there is not necessarily an example that the above changes are appropriately used concretely and actively. This is because most of conventional write-once-read-many media, each including a dye recording layer, are premised on recording performed in the substrate groove part in the configuration of FIG. 1 and H to L recording by the refractive index change in the planar state. Moreover, there have been few cases where L to H recording is performed in the inter-groove part based on the phase shift and the "reflected light intensity change in consideration of the interference effect".

(About Symbol of Phase Shift ΔΦ and Preferable Aspect of Recording Polarity)

In the recorded pit portions 16p, 25p and 26p, a phase shift due to the change in refractive index or deformation of the recording layers 12 and 22 (which, in other words, contributes to a change in reflected light intensity in consideration of a phase difference) and a change in reflected light intensity in the planar state due to a change in refractive index (in other words, a change in reflected light intensity without considering a phase shift) may optically occur at the same time. It is preferable that directions of those changes be aligned. Specifically, in order for the polarity of the recording signal to be constant regardless of recording power and the length and size of the recording pit, it is preferable that individual changes in the reflected light intensity correspond to each other.

Hereinafter, while comparing with the cases of FIGS. 3 and 5, studies will be conducted on in what kind of situation ΔΦ>0 or ΔΦ<0 occurs and which direction should be suitably utilized in the case where recording is performed in the cover-layer inter-groove part 25 of FIG. 4 in the media including the dye recording layer.

In ΔΦ, the following equations are established, $$\Phi_{bmp} = (n_d - n_c) \cdot d_{bmp} \tag{18}$$

$$\Phi_{pit} = n_d \cdot d_{pit} \tag{19}$$

$$\Phi_{mix} = \delta n_c \cdot d_{mix} \tag{20}$$

$$\Phi_n = \delta n_d \cdot (d_G - d_{pit} - d_{bmp}) = \delta n_d \cdot d_{Ga} \tag{21}$$

$\Phi_{bmp}$ corresponds to a phase shift by deformation (movement) of the incidence side interface of the recording layer, $\Phi_{pit}$ corresponds to a phase shift by deformation (movement) of the interface between the recording layers 12 and 22 and the reflective layers 13 and 23, $\Phi_{mix}$ corresponds to a phase shift by formation of the mixture layers 16m, 25m and 26m, and $\Phi_n$ corresponds to a phase shift by the change in refractive index of the recording layers 12 and 22. In order to obtain good recording characteristics while increasing the modulation and without distorting a signal waveform of a specific signal polarity, it is important that the phase shifts described above are large and directions of the changes, in other words, the signs $\Phi_{bmp}$, $\Phi_{pit}$, $\Phi_{mix}$ and $\Phi_n$ are aligned.

Above all, in order to align the directions of the phase shifts, it is more desirable to control by limiting to as few elements as possible than to accurately control all of a plurality of physical parameters related to $\Phi_{bmp}$, $\Phi_{pit}$, $\Phi_{mix}$ and $\Phi_n$ described above.

First, it is also preferable to set $d_{mix}=0$ by providing an interface layer on the incidence side interface of the recording layer. This is because, since a shift in the phase difference by $d_{mix}$ cannot be increased much, not only it is hard to actively utilize the change but also it is difficult to control the thickness. Thus, it is preferable to set $d_{mix}=0$ by providing the interface layer on the incidence side interface of the recording layer.

Next, regarding deformation, it is preferable that the deformation be converged on a localized spot and be restricted to one direction. This is because a good signal quality can be easily obtained by more accurately controlling one deformed portion than by controlling a plurality of deformed portions.

Therefore, in this embodiment, it is preferable to utilize either of $\Phi_{bmp}$ or $\Phi_{pit}$, and mainly $\Phi_n$.

Concerning $d_{pit}$, normally, since expansion of the substrate or the cover layer or reduction in the volume of the recording layer is a main factor, $d_{pit}>0$ is often observed. This is advantageous for $\Phi_{pit}$ but is disadvantageous for $d_{Ga}$, and consequently $\Phi_n$. Meanwhile, absorption in the recording layer gets the highest in a portion between an intermediate portion of the recording layer region from the light incident side. Thus, the portion has the highest temperature, and an amount of heat generated on the interface side of the reflective layer is relatively small. Moreover, by using a high extho-thermic material for the reflective layer, an influence of heat generation in the recording layer is mainly focused on the incidence side interface of the recording layer. The heat generation is converged on the interface between the recording layer 22 and the cover layer 24 side in FIG. 4. Therefore, in the configuration of FIG. 4, deformation occurs in the incidence side interface of the dye, that is, the interface with the cover layer 24. Thus, since $d_{pit}$ naturally gets small, contribution is small. Unlike the conventional configuration, it is considered that there are few influences of deformation on the substrate 21 side. In reality, it is possible to assume $d_{pit} \approx 0$. This indicates that it is better to put together deformation elements to be controlled in $d_{bmp}$.

In this case, as is clear from the equation (21), refractive index change $\delta n_d$ of the dye and deformation $d_{bmp}$ contribute to $\Phi_n$. Thus, $\Phi_n$ is the most important element for the amount and sign of ΔΦ.

Figure 9:
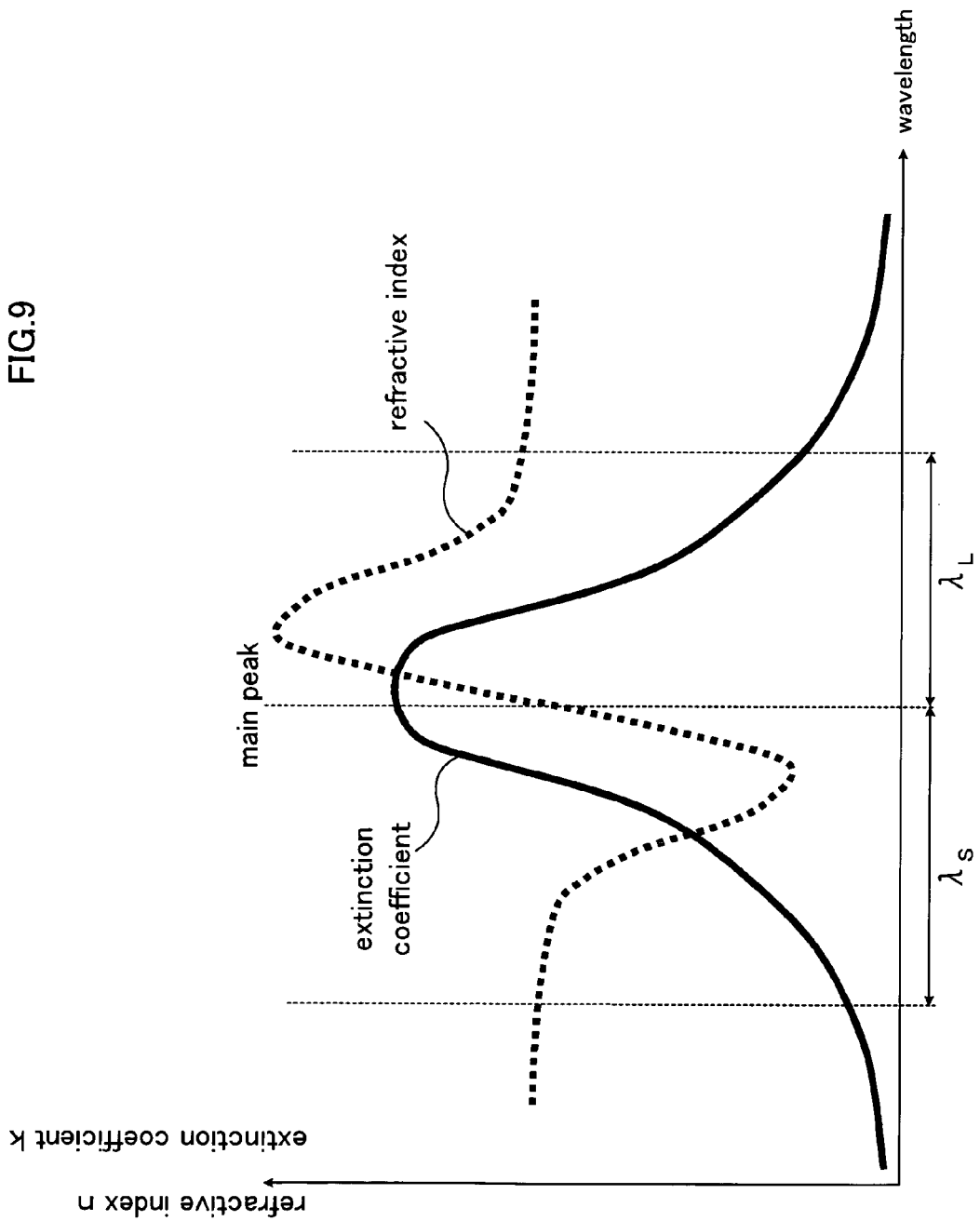
FIG. 9 is a graph showing Kramers-Kronig relations in a main absorption band of a dye.

While $d_{bmp}$ is to be considered later, among physical phenomena related to the fourth $\Phi_n$, an influence of the refractive index change $\delta_n$ of the recording layer is first discussed. The thickness $d_{Ga}$ of the recording layer after recording is $d_{Ga}>0$ by its definition. Thus, it is considered that the sign of $\delta n_d$ controls the sign of $\Phi_n$. In the present invention, the recording layer mainly made of the dye is used, and the main absorption band of the dye is an absorption band in which the maximum absorption occurs at wavelength (peak of absorption) within a visible light range (approximately from 400 to 800 nm). In the case where recording and reading are performed in a wavelength near a main absorption edge of the dye to be the main component, normally, it is considered that the recording layer is decomposed by the heat generation in the recording layer and the absorption of the recording layer is significantly diminished. At least in the unrecording state, so-called Kramers-Kronig type anomalous dispersion exists in the main absorption band. Moreover, it is considered that there exists wavelength dependence of a refractive index n and an extinction coefficient k as shown in FIG. 9. In a longer wavelength edge $\lambda_L$ of the main absorption edge, $n_d$=about from 1.5 to 3.0 and $k_d$=about from 0.1 to 1.5 can be obtained. In a shorter wavelength edge $\lambda_s$, $n_d$=about from 0.5 to 1.5 and $k_d$=about from 0.1 to 1.5 can be obtained. In a center portion of the main absorption band, $k_d$ may become too large. Thus, usually, wavelength ranges $\lambda_L$ and $\lambda_s$ which are somewhat shifted from the center of the peak are sometimes set to be a recording/reading light wavelength so as to set $k_d$ from 0.01 to 0.6. Meanwhile, behavior of the refractive index after recording may vary depending on dye materials. However, it is not necessarily the case that Kramers-Kronig relations are maintained also after recording and $n_d$ is increased. It is more likely the case that the relations are not established.

Normally, a decomposition temperature of the dye that is the main component of the recording layer is 500° C. or lower. This is because the dye as the main component of the recording layer is decomposed, by increase in temperature by recording light, to the extent that the main absorption edge can be no longer maintained. In this case, there exists no Kramers-Kronig anomalous dispersion. Thus, only a refractive index $n_d'$=about from 1 to 1.5 can be obtained.

Therefore, in the case of utilizing decomposition of the dye, it is considered that a range of options to select the dye is extended more by utilizing the case where $n_d$ and $k_d$ are reduced. Specifically, utilization of the case of $\delta n_d > 0$ extends a range of options to select the recording layer material, and thus is preferable.

Note that a cavity is often generated in the recording layer or in the interface adjacent thereto. In such a case, since inside of the cavity is considered to be $n_d'$=1, it can be regarded that the refractive index is lowered. Even if the cavity occupies a part of the recording layer, it can be regarded that the average refractive index of the recording layer is lowered. Also in this case, $\delta n_d > 0$ is established. Alternatively, even if there is a small change in the structure concerning absorption of the dye of the recording layer or even if density is lowered by expansion in the volume of the recording layer due to an increase in temperature of the recording layer, the refractive index can be lowered. Note that it is considered that, among the above-described mechanism of lowering of the refractive index, it is preferable to set $n_d \approx 1$ by forming the cavity, in order to most surely obtain a large $\delta n_d$.

Considering the above, if the optical change (including formation of the cavity, a low-density portion and the like) in the dye as the main component of the recording layer is utilized, it is more preferable to utilize $\delta n_d > 0$, that is, lowering of the refractive index, which extends the range of options to select the dye.

It is considered that the refractive index of the dye after alteration (following decomposition) by recording is lowered approximately as much as the substrate and the cover layer. Moreover, it is considered that the refractive index is also lowered as much as the cover layer or more by formation of the cavity or the like. Thus, in this embodiment, a dye which leads to $n_d' < n_c$ is preferably used. Therefore, it is considered that $\delta n_d > |n_d - n_c|$ is maintained. Meanwhile, the amounts of $\Phi_{bmp}$ and $\Phi_n$ approximately depend on the symbol of $d_{bmp}$. Since $d_{Ga} = d_G - d_{pit} - d_{bmp}$, if $d_{pit} \approx 0$ as described above, $d_{Ga} \approx d_G - d_{bmp}$. Therefore, if $d_{bmp} < 0$, $d_{Ga} > |d_{bmp}|$ is realized. Even if $d_{bmp} > 0$ is realized, that is, the volume of the recording layer is reduced, extreme contraction of the recording layer such as to reduce the thickness of the recording layer to less than 50% is not usually conceivable (alternatively, it can also be said that such contraction is not preferable because it means that the recording layer material flows out of the recorded pit portion). Thus, similarly, $d_{Ga} > d_{bmp}$ is realized. Consequently, assuming that $|\Phi_{bmp}| < \Phi_n$ is established and a major change is caused by $\Phi_n$, similarly, it is considered that the change $\delta n_d > 0$ becomes the change $\Phi_n > 0$, leading to the phase shift $\Delta\Phi > 0$.

In a conventional optical disk containing an organic dye, such as a CD-R, it is considered that $d_{mix} = d_{bmp} > 0$ is realized and there is much contribution of entering of the mixture layers 16m, 25m and 26m into the recording layers 12 and 22 sides (nonpatent document 1). $\Phi_{pit} > 0$ and $\Phi_{bmp} > 0$ are realized, and, similarly, $\Delta\Phi > 0$ is maintained as a whole. To put it the other way around, it is no exaggeration to say that many studies have been conducted to achieve modulation by increasing $\Delta\Phi > 0$ as much as possible. Considering that, in the conventional groove part shown in FIG. 1, the phase shift of $\Delta\Phi > 0$ is caused to realize H to L recording, it is natural to utilize the phase shift of $\Delta\Phi > 0$ in the recording layer 22 mainly made of the dye. Specifically, it is desirable that the phase shift in the recorded pit portion 25p be caused by formation of a portion having a refractive index lower than $n_d$ on the incident light side of the reflective layer 23. The above point is the most desirable in terms of utilizing the recording layer mainly made of the dye. Here, what is important in this embodiment is to actively and selectively utilize the phase shift of $\Delta\Phi > 0$, and is not to perform recording in the groove part (having a small optical path length) which is nearer when viewed from the incidence side or to perform H to L recording as in the case of the conventional invention.

It can be said that the conventional technology concerning blue laser optical recording has been fixed on the conventional technologies of a CD-R and a DVD-R and could not get out of preconditions that H to L recording is tried to be performed by the phase shift of $\Delta\Phi > 0$ in the cover-layer groove part 26 (see FIG. 5) to be a groove when viewed from the incidence side. Alternatively, the conventional technology has been intended to lower the reflected light intensity, that is, to perform H to L recording by utilizing a reflectivity change caused in the planar state, particularly, a large change that $\delta n_d$ becomes approximately 1 or more and a simultaneously caused large change in the extinction coefficient $k_d$ as the recording layer of from 50 to 100 nm in thickness without depending on the phase shift.

Here, a relationship between the phase shift $\Delta\Phi > 0$ and the push-pull signal will be discussed. By analogy with the conventional CD-R and DVD-R, in the case where H to L recording is performed in the cover-layer groove part 26 (see FIG. 5), if it is wished not to invert the polarity of the push-pull signal, $d_{GL}$ is restricted to a deep groove step (hereinafter called a "deep groove") such that a both-way optical path length becomes larger than 1 wavelength (to be $|\Phi b_3| > 2\pi$), or is limited to a groove step (hereinafter called a "shallow groove") in which $\Phi b_3$ is almost 0 and from which a push-pull signal can be barely sent out. In the case of the deep groove, the groove is optically increased in depth by utilizing the phase shift in the direction indicated by the arrow $\alpha$ on a slope of $|\Phi b| > 2\pi$ in FIG. 6. In this case, a groove depth to be a starting point of the arrow is required to be about 100 nm in a blue wavelength of around 400 nm. Accordingly, in a narrow track pitch as described above, molding transfer failure is likely to occur in formation. Thus, mass production becomes difficult. Moreover, even if desired groove geometry can be obtained, noise caused by microstructural roughness on a groove face tends to be mixed into a signal. Furthermore, it is difficult to evenly form the reflective layer 23 on a groove bottom and a sidewall. The reflective layer 23 itself has poor adhesion to the groove face. Accordingly, deterioration such as peeling tends to occur. As described above, if it is tried to perform H to L recording by utilizing the phase shift of $\Delta\Phi > 0$ in the conventional method using the "deep groove", it becomes difficult to narrow the track pitch.

Meanwhile, in the case of the shallow groove, H to L recording is performed by optically increasing the groove in depth by utilizing the phase shift in the direction indicated by the arrow β on a slope between |Φ|=0 to π in FIG. 6. If it is tried to obtain certain push-pull signal intensity in the unrecorded state, a groove depth is set to about from 20 nm to 30 nm in a blue wavelength. If the recording layer 22 is formed in the state as described above, the recording layer tends to be formed to have the same thickness in the recording groove part (in this case, the cover-layer groove part 26) and in the inter-groove part, similar to the case of the planar state. In addition, the recording pit tends to protrude from the recording groove part. Moreover, leakage of diffracted light from the recording pit into an adjacent recording grooves significantly increases crosstalk. Similarly, if it is tried to perform H to L recording by utilizing the phase shift of ΔΦ>0 in the conventional method, it becomes difficult to narrow the track pitch.

The inventors of the present invention have conducted a study on, in a true sense, a surface incidence type dye medium, particularly, a medium having a coating type recording layer, which can overcome the problems described above. As a result, the inventors have found out that a configuration suitable for the surface incidence type dye medium is not the conventional H to L recording using the "deep groove" but is one to obtain a signal having L to H recording polarity by using the phase shift in the direction indicated by the arrow γ in FIG. 6, therefore, by using an "intermediate groove" to be described later. Specifically, what the inventors have found out is the optical recording medium 20 which performs recording/reading by receiving recording/reading light from the cover layer 24 side, and a recording method. To be more specific, in the optical recording medium 20, when a guide groove part on a far side from a plane of incidence of the recording/reading light beam 27 on the cover layer 24 (the plane 29 on which the recording/reading light beam 27 is made incident) is set as a recording groove part, reflected light intensity of a recorded pit portion formed in the recording groove part is set to be higher than reflected light intensity at the time of unrecorded recording groove part. A write-once-read-many medium using a dye as a recording layer has heretofore been characterized in that the same recording signal as that of a ROM medium can be obtained after recording. Thus, it is only necessary to secure reading compatibility after recording. Here, it is not required to maintain high reflected light intensity similar to that of the ROM medium before recording. Accordingly, H-level reflected light intensity after recording may be within a range of the reflected light intensity (often simply called reflectivity in the ROM medium) which is defined by the ROM medium. L to H recording never conflicts with maintaining read compatibility with the ROM medium.

Note that what is important in this embodiment is that lowering of the refractive index of the recording layer, lowering of the refractive index in the pit part due to formation of the cavity and the like, and deformation in the recording layer 22 or on the interface thereof all occur on the recording/reading light incidence side of the reflective layer 23 that is the main reflective surface. Furthermore, as described above, it is preferable that $d_{pit} \approx 0$ and $d_{mix} \approx 0$. Specifically, it is preferable that, in the recorded pit portion, neither deformation nor mixture occur in both of the interfaces between the reflective layer and the recording layer and between the reflective layer and the substrate. This is because the elements which control the recording signal polarity can be simplified and distortion in the recording signal waveform can be suppressed. If a semi-transparent reflective layer (thin metal such as Ag and Al or a semiconductor film such as Si and Ge) exists between the recording layer 22 and the cover layer 24 and if the main reflective surface is moved to any interface of the semi-transparent film, even by L to H recording, it is difficult to realize good L to H recording in the cover-layer inter-groove part 25. This is because, if almost all reflections occur in the semi-transparent reflective film, the phase shift by the refractive index change $\delta n_d$ in the recording layer 22 can be hardly utilized, which makes it difficult to increase signal amplitude. Moreover, if there is any influence of light transmitted through the semi-transparent reflective layer, contributions of both a phase of the reflected light from a metal reflective layer on a back side and a phase of the reflected light from the semi-transparent layer are mixed. Thus, it becomes complicated and difficult to control the directions of the phase shifts by aligning the directions in the same direction.

In the surface incidence configuration as shown in FIG. 4, when a guide groove part on a far side from the plane 29 (FIG. 2) on which the recording/reading light beam 27 (FIG. 2) is made incident is set as a recording groove part, if the recording principle by the phase shift, which is the same as that of the conventional configuration, is applied, L to H recording can be performed by utilizing such a phase shift as ΔΦ>0.

Thus, first, it is desirable that the phase shift in the recorded pit portion 25*p* be caused by formation of a portion having a refractive index lower than $n_d$ on the incident light side of the reflective layer 23. Moreover, in order to maintain stability of various servos before recording, it is preferable that at least 3% to 30% of reflectivity be maintained.

Assuming that a reflected light intensity obtained by depositing only a reflective film having known reference reflectivity ($R_{ref}$) with the same configuration as that of the optical recording medium 20 shown in FIG. 2 and by irradiating the recording groove part with a focused laser beam so as to come into focus is $I_{ref}$ and a reflected light intensity obtained similarly by irradiating the recording groove part with the focused laser beam in the optical recording medium 20 shown in FIG. 2 is $I_s$, the recording groove part reflectivity ($R_g$) in the unrecorded state, which is mentioned above, is obtained by $R_g = R_{ref}(I_s/I_{ref})$. Similarly, after recording, as to the recording signal amplitude, recording groove part reflectivity corresponding to low reflected light intensity $I_L$ between recording pits (a space part) is called $R_L$ and recording groove part reflectivity corresponding to high reflected light intensity $I_H$ of the recording pit (a mark part) is called $R_H$.

Hereinafter, according to usage, the recording groove part reflectivity described above is used for quantification of a change in the reflected light intensity of the recording groove part.

In this embodiment, since the phase shift by recording is utilized, it is preferable to increase transparency of the recording layer 22 itself. In the case where only the recording layer 22 is formed on a transparent polycarbonate resin substrate, transmittance is preferably 40% or more, more preferably, 50% or more, and still more preferably, 60% or more. If the transmittance is too high, recording light energy cannot be sufficiently absorbed. Thus, the transmittance is preferably 95% or less, more preferably, 90% or less.

Meanwhile, such high transmittance can be generally confirmed by the following observation. In a disk (in the unrecorded state) with the configuration shown in FIG. 2, reflectivity R0 in the planar state is measured in a flat part (a mirror surface part), and the reflectivity is 40% or more, preferably, 50% or more, more preferably, 70% or more of the reflectivity in the planar state of a disk with the same configuration, in which the thickness of the recording layer is set to 0.

(About Preferable Aspects of Recording Groove Depth $d_{GL}$, Thickness $d_G$ of Recording Layer in Recording Groove Part and Thickness $d_L$ of Recording Layer in Inter-Recording-Groove Part)

In the case where L to H recording is performed in the cover-layer inter-groove part 25 by utilizing the phase shift of $\Delta\Phi>0$, the groove depth is optically changed in the pit part. Thus, the push-pull signal which strongly depends on the groove depth tends to be changed between before and after recording. Particularly, such a phase shift causes polarity inversion in the push-pull signal becomes a problem.

In order not to cause a change in the polarity of the push-pull signal by performing L to H recording, it is preferable to utilize the optical phenomenon in which the groove is made shallower by the phase shift in the direction indicated by the arrow γ on the slope of $0<|\Phi b|$ and $|\Phi a|<\pi$ in FIG. 6. Specifically, in FIG. 4, such a change as to reduce the optical path length to the reflection reference plane in the recording groove part when viewed from the phase difference reference plane A-A' is caused in the recorded pit portion 25p. In the case of FIG. 4, $\Phi b=\Phi b_2<0$ and $\Phi a=\Phi a_2<0$. Moreover, since $\Delta\Phi>0$, $|\Phi b|>|\Phi a|$ is established. Note that, in the relationship where the phase difference is defined as shown in the equation (2), $\Phi b$ and $\Phi a$ are negative in the case of FIG. 4. Thus, absolute values of $\Phi b$ and $\Phi a$ are referred to.

Particularly, in the case where the normalized push-pull signal intensity $IPP_{norm}$ in the equation (17) is used as the push-pull signal, in this embodiment, since the average reflectivity after recording is increased, the denominator in the equation (17) is increased.

In order to maintain the normalized push-pull signal intensity $IPP_{norm}$ after recording to be sufficient level, it is preferable that the push-pull signal intensity $IPP_{p-p}$ that is the numerator in the equation (17) be increased after recording or at least a large value be maintained. Specifically, it is preferable that $|\Phi a|$ be around $\pi/2$ after recording. Meanwhile, in order to secure a sufficient push-pull signal also before recording, it is desirable that $|\Phi b|$ be smaller than $\pi$ by about $(1/16)\pi$. Thus, it is preferable that $|\Phi b|$ be within a range of $\pi/2$ to $(15/16)\pi$ in the path γ.

To be more specific, in FIG. 4, in order to set $|\Phi b_2|=(4\pi/\lambda)$ $|\psi b_2|$ within a range of $\pi/2$ to $(15/16)\pi$, it is preferable that the following equation be set within a range of $\lambda/8$ to $(15/64)\cdot\lambda$.

$$|\psi b_2| = |(n_c - n_d)\cdot(d_G - d_L) - n_c\cdot d_{GL}| = |(n_d - n_c)\cdot(d_G - d_L) + n_c\cdot d_{GL}|$$

In this event, when $d_G=d_L$ and the blue wavelength is set to the recording/reading light wavelength $\lambda=350$ to 450 nm, the groove depth $d_{GL}$ is obtained by the following equation according to the equation (7)

$$|\psi b_2| = n_c\cdot d_{GL} \quad (7a)$$

The same equation can also be obtained by $n_d \approx n_c$. If $n_c$ is about 1.4 to 1.6 that is a value of a general polymeric material, the groove depth $d_{GL}$ is normally 30 nm or more, preferably, 35 nm or more. Meanwhile, it is assumed that the groove depth $d_{GL}$ is normally 70 nm or less, preferably, 65 nm or less, more preferably, 60 nm or less. It is assumed that the groove having such a depth is called an "intermediate groove". Compared with the case where the "deep groove" is used in FIGS. 3 and 5 described above, there is obtained an advantage that groove formation and coverage of the cover-layer inter-groove part 25 with the reflective film are significantly facilitated.

Considering, in general, the recording layer tends to be unevenly deposited in the substrate groove part when the recording layer is deposited by use of a spin-coating method, $d_G>d_L$ is naturally established. Furthermore, if the thickness of the recording layer is reduced as a whole by reducing the amount of the dye to be applied, $d_L \approx 0$ can be actually established. Thus, it is made possible to confine the recording layer almost completely into the recording groove (in this case, the cover-layer inter-groove part 25).

In this case, the equation (7) is changed to the following equation.

$$|\psi b_2| = |(n_c - n_d)\cdot d_G - n_c\cdot d_{GL}| \quad (7\text{ b})$$
$$= |(n_d - n_c)\cdot d_G + n_c\cdot d_{GL}|$$

Accordingly, a correction is required for the preferable range of the groove depth only by $|(n_c-n_d)\cdot d_G|$ with respect to the equation (7a). It is preferable that if $n_d>n_c$, the groove be somewhat shallower, and if $n_d<n_c$, the groove be somewhat deeper. In the dye recording layer used in this embodiment, $(n_c-n_d)$ is approximately within a range of −0.5 to +0.5, and $d_G$ is about 30 nm. Thus, a correction of about 10 nm at most may be considered. On the contrary, if groove geometry of $n_d\cdot d_{GL}$ is given, the smaller $n_d$ is than $n_c$, the more $|\Phi b_2|$ is reduced. Thus, with reference to FIG. 6, the reflected light intensity of the groove part is increased. Meanwhile, the larger $n_d$ is than $n_c$, the more the reflected light intensity of the groove part is reduced.

Moreover, it is preferable that the thickness of the recording layer be smaller than the groove depth and be set to $d_G<d_{GL}$. Even if the recording pit follows deformation as described later, there is obtained an effect that at least a width thereof is suppressed in a groove width. This is because crosstalk can be reduced. Thus, it is preferable to set $(d_G/d_{GL})\leq 1$, more preferable to set $(d_G/d_{GL})\leq 0.8$, and still more preferable to set $(d_G/d_{GL})\leq 0.7$.

Specifically, in the optical recording medium 20 to which this embodiment is applied, it is preferable that the recording layer 22 be formed by coating and $d_{GL}>d_G>d_L$ be established. It is more preferable to set $d_L/d_G\leq 0.5$ so as to actually hardly deposit the recording layer 22 on the inter-recording-groove part. Meanwhile, as described later, it is preferable that $d_L$ be substantially 0. Thus, the lower limit of $d_L/d_G$ is ideally 0.

In the case where $d_{GL}$ is from 30 to 70 nm as described above, $d_G$ is set preferably to 5 nm or more, more preferably, to 10 nm or more. This is because the phase shift can be increased by setting $d_G$ to 5 nm or more, and light energy absorption required to form the recording pit can be achieved. Meanwhile, $d_G$ is set preferably less than 50 nm, more preferably, to 45 nm or less, still more preferably, to 40 nm or less. Also in order to reduce the influence of the "reflectivity change in the planar state" due to the refractive index change and then mainly to use the phase shift, it is desirable that the recording layer 22 be thin as described above. Such as the conventional CD-R and DVD-R, in the recording layer mainly made of the dye having a refractive index as high as from 2.5 to 3 in the unrecorded state, if $n_d$ is reduced by recording, lowering of the "reflectivity in the planar state" may be caused. In the case where L to H recording is performed by the phase difference shift, the undesirable polarity inversion may be caused, which is not preferable.

Furthermore, the thin recording layer 22 can prevent deformation in the recorded pit portion from getting too large and from protruding to the inter-recording-groove part.

In the present invention in which the recording pit is formed in the cover-layer inter-groove part, use of the "intermediate groove" depth as described above and reduction in the thickness of the recording layer 22 to confine the recording layer into the recording groove having the "intermediate groove" depth by setting $d_L/d_G \leq 1$ are even more preferable when the cavity formation in the recorded pit portion as described later and bulging deformation in the cover layer direction are positively used. Also in the above point, the present invention is more excellent in the effect of suppressing crosstalk than the case where H to L recording is performed by recording in the cover-layer on-groove part and forming the cavity.

Accordingly, there is achieved an advantage that the recording pit is almost completely confined into the recording groove, and leakage (crosstalk) of diffracted light from the recorded pit portion 25p in FIG. 4 into the adjacent recording grooves can be significantly reduced. Specifically, to focus on L to H recording by recording in the cover-layer inter-groove part 25 not only leads to an advantageous combination of the phase shift of $\Delta\Phi > 0$ and recording in the cover-layer inter-groove part 25 but also makes it easy to obtain a configuration more suitable for high-density recording by reducing a track pitch. Furthermore, if $d_L$ is set to approximately 0, in $|\psi b_2|$ in the equation (7b), contribution of the term $(n_c - n_d) \cdot d_G$ can be maximized and $d_{GL}$ can be reduced slightly. Thus, groove formation is more facilitated. For example, in the case where the recording/reading light wavelength $\lambda$ is 400 nm and $n_c$ is about 1.5, $d_G$ to be $(15/64) \cdot \lambda$ is 62.5 nm if $d_G = d_L$. However, $d_G$ can be set to 57 nm if $d_L = 0$, $|n_c - n_d| = 0.3$, $\delta n_d = 0.5$ and $d_G = 0.5 \cdot d_{GL}$. When the track pitch becomes about 0.3 μm, such a difference of 5 nm in the groove depth significantly affects easiness of groove geometry transfer from a stamper.

(About Preferable Aspects of Recording Layer Refractive Index, $n_d$, $n_c$, $\delta n_d$ and Deformation Amount $d_{bmp}$)

For high-density recording, it is important to perform L to H recording by utilizing the phase shift of $\Delta\Phi > 0$ and performing recording in the cover-layer inter-groove part 25 in the surface incidence recording. Meanwhile, in order to obtain better recording quality, it is desirable to consider the following items.

First, to increase $|\Delta\Phi|$ as a whole in order to increase the recording signal amplitude is cited. Next, in mark length modulation recording, in order to provide a practical recording power margin for the all mark lengths from the shortest mark length to the longest mark length and to realize good jitter characteristics, it is preferable to carry out the following. Specifically, it is preferable to allow the direction and size of each phase shift, which contribute to $\Delta\Phi$, to coincide within a specific range for fluctuations of recording power and of the mark length. It is preferable to reduce, to a negligible degree, at least mixing of phase shifts in opposite directions by the recording power fluctuations or the mark length.

First, in order to increase $\Phi_n$ in a positive direction, it is preferable that $\delta n_d > 0$, that is, the phase (optical path length) of the recorded pit portion 25p be significantly lowered compared with that before recording. The thickness $d_{Ga}$ of the recording layer after recording is preferably large, more preferably $d_G \leq d_{Ga}$. As described above, in order to reduce crosstalk and the like, it is preferable that $d_{Ga}$ be not much larger than $d_{GL}$. Note that, if deformation of $d_{bmp} < 0$ accompanies, $d_{Ga} > d_{GL}$ may be established. In such a case, it is preferable that $d_{Ga}$ be 3 times larger than $d_{GL}$ or less. As described above, even if $d_{Ga}$ is large, as long as the horizontal width of the recording pit does not protrude beyond the recording groove width, an influence on crosstalk is small. Therefore, if $d_{Ga} > d_{GL}$, particularly, it is preferable that $d_L$ be small and 10 nm or less, which can be substantially regarded as 0. Alternatively, not only $d_L/d_G \leq 0.5$ is satisfied as described above but also, more preferably, $d_L/d_G \leq 0.3$, still more preferably, $d_L/d_G \leq 0.2$ is satisfied.

From the equation (21), $\delta n_d$ and $d_{Ga} = d_G - d_{pit} - d_{bmp} \approx d_G - d_{bmp}$ are established. In order to increase $d_{Ga}$, $d_{bmp} < 0$, that is, deformation of the recording layer 22 bulging toward the cover layer 24 is preferable. Specifically, in the normal dye, $\delta n_d > 0$ as described above. Thus, by setting $d_{bmp} < 0$, phase shift of $\Delta\Phi > 0$ can be increased through $\Phi_n$ in the equation (21).

Meanwhile, $d_{bmp}$ also contributes to a component $\Phi_{bmp}$ in the equation (18). Hereinafter, a recording mechanism (recording mode) which actively utilizes $d_{bmp}$ through $\Phi_{bmp}$ will be considered.

First, as a first aspect, considered is a case where a dye having small $n_d$ is selected so as to set $n_d - n_c < 0$. In order to set $\Phi_{bmp} > 0$, $d_{bmp} < 0$, in other words, deformation of the recording layer 22 bulging toward the cover layer 24 in FIG. 4 is preferable. Here, if $d_{bmp} < 0$, $d_{Ga}$ is also increased, which is very desirable. Specifically, even if $\delta n_d$ is small, the absolute value of $d_{bmp} < 0$ is large, in other words, if deformation of the recording layer 22 bulging toward the cover layer 24 is large, large modulation can be also obtained. Thus, a recording layer having small $\delta n_d$, in some cases, a recording layer material in which $\delta n_d$ is almost 0 can also be used. This is particularly preferable for utilization in a blue wavelength range in which it is difficult to obtain a dye having large $n_d$ over 2.5 in such a case of use in an infrared or red wavelength range such as a CD-R and a DVD-R.

In the case where a cavity is generated in the recording layer 22 or in the interface adjacent thereto, bulging deformation due to the cavity is considered to cause deformation of $d_{bmp} < 0$ in the interface between the recording layer 22 and the cover layer 24. Considering that $n_d'$ in the cavity is lowered to about 1, such a lowering is very preferable for obtaining large signal amplitude.

It is not necessarily the case that $n_d < n_c$ is strictly required. $n_d$ may be equal to $n_c$ or less. Since a polymeric material is usually used for the cover layer material, $n_c$ is from 1.4 to 1.6. Thus, $n_d$ is preferably 1.6 or less, more preferably, 1.5 or less. As the lower limit, normally, $n_d$ is preferably 1.0 or more, more preferably, 1.2 or more, still more preferably, 1.3 or more. This approximately corresponds to the case where the wavelength side $\lambda_s$ of the short absorption edge is set to the recording/reading light wavelength.

Next, as a second aspect, considered is a case where $n_d'$ gets smaller than $n_c$ even when $n_d > n_c$. In the equation (9), assuming $\Phi_{pit}$ and $\Phi_{mix} \approx 0$, the following equation is obtained.

$$\Delta\Phi \approx (4\pi/\lambda)\{(n_d - n_c) \cdot d_{bmp} + \delta n_d \cdot (d_G - d_{bmp})\} \quad (9\,a)$$
$$= (4\pi/\lambda)\{(n_d - n_c - \delta n_d) \cdot d_{bmp} + \delta n_d \cdot d_G\}$$
$$= (4\pi/\lambda)\{(n_d' - n_c) \cdot d_{bmp} + \delta n_d \cdot d_G\}$$

Here, $\delta n_d \cdot d_G > 0$ is established. In the case where $n_d'$ is sufficiently lowered, particularly, $n_d'$ gets equal to 1 after a cavity is formed, $n_d' - n_c < 0$. Thus, it is preferable that $d_{bmp} < 0$ be established. If $n_d$ is larger than 2 as in the case of use for the conventional CD-R or DVD-R, $n_d' > n_c$ may be established. If $n_d$ is 2 or less, $n_d' < n_c$ is almost surely established, which is preferable. It is more preferable that $n_d$ be 1.9 or less. Furthermore, it is very preferable because when a cavity ($n_d'=1$) is formed, $n_d'<n_c$ is surely established and $\delta n_d>0$ is increased.

Consequently, assuming that a preferable aspect of combination of $n_d$, $n_c$, $\delta n_d$ and $d_{bmp}$ in the present invention is called a recording mode, the recording modes are sequentially listed as below from the most preferable recording mode.

(Recording Mode 1)

$\delta n_d>0$ and $n_d\lesssim n_c$ ($n_d\lesssim n_c$ means that $n_d$ is about $n_c$ or less) are established, and $d_{bmp}<=0$ is established.

If $n_c$=from 1.4 to 1.6, $n_d$ is preferably 1.6 or less.

It is preferable that a cavity be generated in the recording layer 22 or in the interface adjacent thereto.

(Recording Mode 2)

$\delta n_d>0$ and $n_d>n_c$ are established, and $n_d'<n_c$ and $d_{bmp}<=0$ are established.

Similarly, if $n_c$=from 1.4 to 1.6, $n_d$ is preferably 2 or less.

It is preferable that a cavity be generated in the recording layer 22 or in the interface adjacent thereto.

From the viewpoint of the equation (9a), recording modes 1 and 2 are the same if $n_d'<n_c$, and it is impossible to say which one is advantageous. However, in recording mode 2, if it is difficult to estimate $n_d'$ after recording, as long as $\delta n_d>0$, $n_d'<n_c$ is surely guaranteed by $n_d'<n_d<n_c$. Thus, in the case where deformation of $d_{bmp}<0$ occurs, recording mode 1 is preferable. If no cavity is formed or $d_{bmp}\approx 0$, there is a case where recording mode 2 is advantageous, in which $n_d$ in unrecorded is large, from a point that $\delta n_d$ can be increased.

Note that, as a third aspect, the following recording mode 3 is applicable from the standpoint of the equation (9).

(Recording Mode 3)

$\delta n_d<0$, $n_d>n_c$ and $d_{bmp}>0$ are established.

When $\delta n_d$ is relatively large, a negative effect that $d_{Ga}$ is reduced, which is caused by $d_{bmp}>0$, can be offset. However, according to the study by the inventors of the present invention, there is a case where an amount of bulging deformation of $d_{bmp}<0$ can reach close to 3 times $d_{GL}$ or $d_G$. On the other hand, collapsing deformation of $d_{bmp}>0$ hardly reaches 50% of $d_G$ or more. Thus, the third aspect as described above is not necessarily preferable although the third aspect does not hinder application to this embodiment.

Furthermore, in this case, the third aspect depends substantially on only a change in $\delta n_d$. As a result, the third aspect has to depend on a dye having large $n_d$ of over 2 such as the conventional CD-R and DVD-R. Moreover, the third aspect is much less preferable if lowering of the reflected light intensity due to the "reflectivity change in the planar state", that is, H to L polarity is mixed.

Note that, although already mentioned above, what is important in this embodiment is that phenomena related to the recording modes described above occur on the incident light side of the main reflective surface. Moreover, the multilayer structure of FIG. 4 is important to realize the phenomena.

In order to facilitate deformation of $d_{bmp}<0$, it is desirable that a volume expansion pressure be caused in thermal alteration of the recording layer 22 due to thermal expansion, decomposition and ablation. Moreover, it is preferable that an interface layer be provided at the interface between the recording layer 22 and the cover layer 24 to keep the pressure therein so as not to leak into another layer. It is desirable that the interface layer have high gas barrier properties and be more easily to be deformed than the cover layer 24. Particularly, when a dye having a strong ablation property is used as a main component, the volume expansion pressure tends to be locally caused in a part of the recording layer 22. Moreover, in this event, a cavity tends to be formed at the same time. Even if a change in the refractive index of the recording layer itself, which is mainly made of the dye, is small, an effect by formation of the cavity ($n_d'$ inside can be regarded as 1) is added to increase $\delta n_d$ of the recording layer 22, which is preferable. Specifically, in order to increase $\delta n_d>0$, it is preferable to form the cavity in the recording layer 22 or in the interface with a layer adjacent thereto. Moreover, bulging of the recoding layer 22 toward the cover layer 24, which is caused by the pressure in the cavity and is to be $d_{bmp}<0$, is the most preferable because the bulging is considered to cause the shift of $\Delta\Phi>0$ with the utmost efficiency.

As described above, for prevention of a phenomenon that the recording signal polarity (H to L or L to H) is inverted or mixed (thereby obtaining a derivative waveform) by the mark length, it is effective to make the aligned combination among $n_d$, $n_d'$ and $n_c$ and the symbol of $d_{bmp}$ (the direction of deformation) to have the specific relationship.

Here, based on characteristics of a dye having an anomalous dispersion property, some supplementary explanations are added for the lower limit of $n_d$. FIG. 9 is a graph showing Kramers-Kronig relations in a main absorption band of the dye. In Kramers-Kronig anomalous dispersion, the higher the absorption peak is, the lower the refractive index is in the short wavelength edge $\lambda_s$ and the higher the refractive index is in the long wavelength edge $\lambda_L$. In the conventional CD-R and DVD-R, it has been preferable to use a dye having $n_d$ of 2 to 3 in the long wavelength edge $\lambda_L$. Thus, the greatest challenge is to synthesize a dye having a very steep absorption peak. In the short wavelength edge $\lambda_s$, if such an absorption peak is realized, $n_d$ can be lowered to about 0.5. Concerning such a dye having a steep peak, the biggest drawback in the case of utilizing a wavelength range in which absorption of the dye is drastically shifted is that, when the recording/reading light wavelength $\lambda$ is shifted, stable recording characteristics cannot be obtained due to drastic shift in optical characteristics. Normally, a wavelength of light emitted from a semiconductor laser used for recording and reading varies at least by ±5 nm, depending on a temperature (normally, about from 0° C. to 70° C.) of an environment in which the semiconductor laser is used. Particularly, in high-density recording using a blue wavelength of about 400 nm and a high NA (numerical aperture), a change in the optical characteristics due to such wavelength variation is not preferable.

Furthermore, as is clear from the equation (9a), if the phase shift is utilized by using the cover-layer inter-groove part 25 as the recording part, a change such as to increase $n_d$ leads to H to L recording utilizing the "shallow groove" on the path β in FIG. 6 with the shift of $\Delta\Phi<0$. Thus, good L to H recording cannot be realized. Although the use of the cover-layer groove part 26 can realize L to H recording, as described above, recording in the cover-layer groove part 26 is not suitable for the case where the recording layer 22 is formed by use of the coating method. Moreover, a large change of $n_d'>n_c$ is not normally realized in the region of $\lambda_s$, but $(n_d'-n_c)>0$ is obtained. In order not to conflict with $\Delta\Phi<0$, $d_{bmp}>0$ has to be set. However, similarly, an amount of deformation to be $d_{bmp}>0$ is limited. Thus, it is difficult to obtain large signal amplitude.

Meanwhile, in the blue wavelength recording, there has been also proposed H to L recording which utilizes a dye having $n_d$ smaller than about 1 and $\delta n_d<0$, and utilizes a reflected light intensity change due to the "reflectivity change in the planar state". However, in this case, there is a problem that it is difficult to obtain a large $\delta n_d$. Normally, since $n_d$=from 0.5 to 1.0 and $n_d'$=about from 1.0 to 1.5, $\delta n_d$ is smaller than about 0.5. Thus, there has been proposed utilization of a very complicated configuration in which dielectric layers formed by use of a sputtering method or a vacuum deposition method are provided above and below the recording layer 22. However, for the dye recording layer which should originally utilize an advantage on a manufacturing process cost, which is achieved by using the coating method, an undesirable increase in cost arises. Note that $n_d$ is larger than 0.

Figure 24:
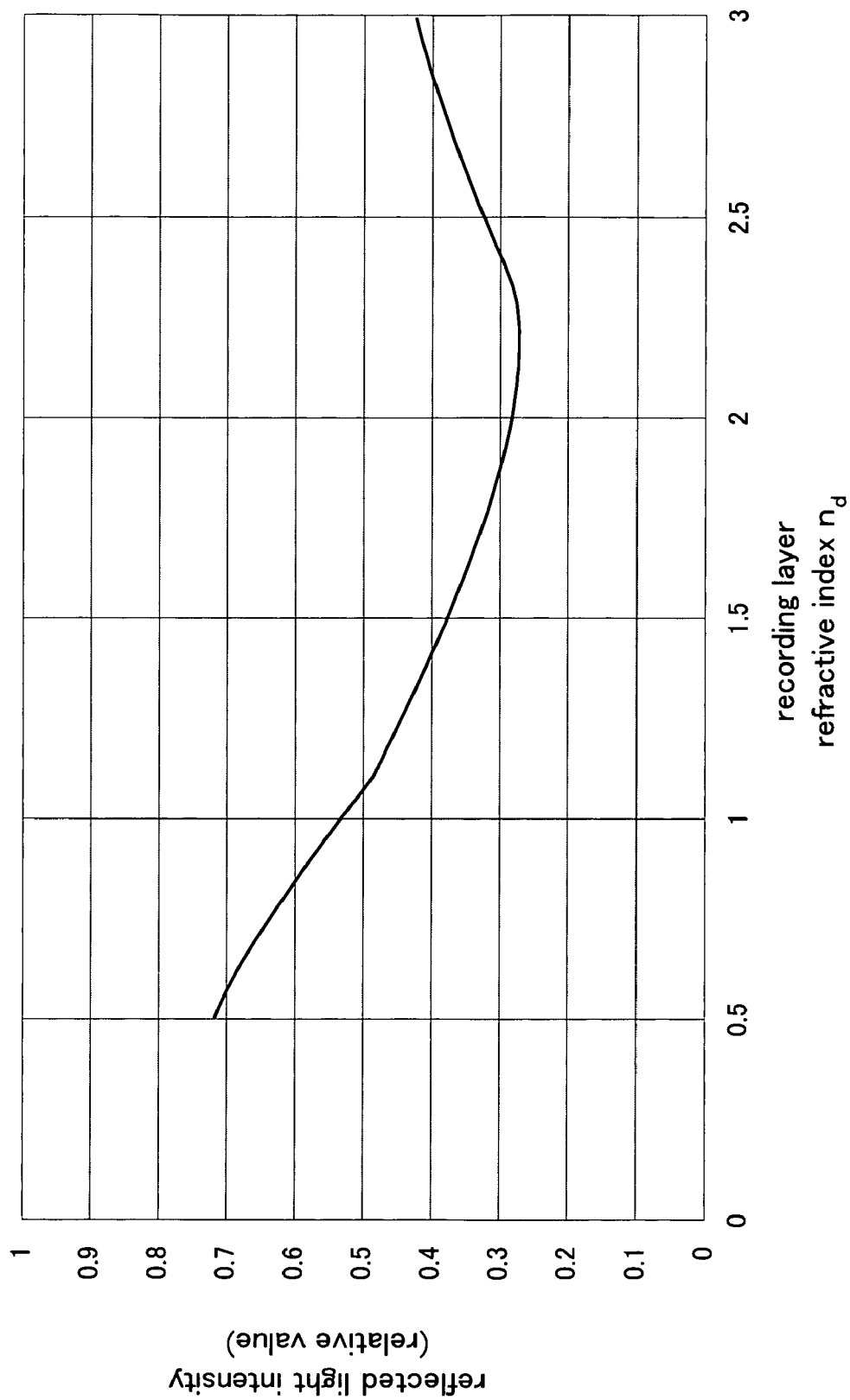
FIG. 24 is a graph showing calculated values of dependence of reflected light intensity R0 on a refractive index $n_d$ of the recording layer in a planar part assuming that, in the multilayer structure of FIG. 2, a film thickness of the recording layer is 30 nm, $k_d$=0.4 is fixed, an Ag reflective layer is used (complex refractive index of 0.09–i·2.0), a film thickness of an interface layer is 20 nm (refractive index of 2.3–i·0.0), and an imaginary part of a complex refractive index is 0.0 when cover layer $n_c$=1.5.

FIG. 24 is a graph showing calculated values of dependence of reflected light intensity R0 on the refractive index $n_d$ of the recording layer in a planar region assuming that, in the multilayer structure of FIG. 2, a film thickness of the recording layer is 30 nm, $k_d$=0.4 is fixed, an Ag reflective layer is used (complex refractive index of 0.09–i·2.0), a film thickness of an interface layer is 20 nm (refractive index of 2.3–i·0.0), and an imaginary part of a complex refractive index is 0.0 when cover layer $n_c$=1.5. If $n_d$ is about 2 or less, it is understood that the refractive index is increased if $n_d$ is reduced. On the other hand, if $n_d$ is less than 1, $\delta n_d$<0, that is, a change such as to increase $n_d$ causes reduction in the reflected light intensity due to the reflectivity change in the planar state and causes a negative change of $\Phi_n$ in the equation (21). Thus, it is understood that application of such a change to the cases of FIGS. 3 and 5 makes it easy to obtain a signal having H to L polarity.

If a reduction in $k_d$ by recording is added, the reflected light intensity after recording can be further increased compared with that before recording. In a state where no phase difference is involved, although the magnitude of the reflectivity change itself is small, there is at least no conflict with the recording signal polarity of L to H polarity due to the phase difference.

From the viewpoint as described above, it is understood that, for performing good L to H recording, it is very convenient that the cover-layer inter-groove part is used as the recording groove part and $n_d$ is reduced after recording ($\delta n_d$>0) in the dye having $n_d$ of 1 to 2. At the same time, if $k_d$ is reduced by recording, absorption in the recorded pit portion is reduced. This is preferable since the reflectivity in the planar state is increased. However, such a case is a phenomenon that can normally occur when the dye is decomposed and anomalous dispersion is eliminated. Specifically, the increase in the reflected light intensity due to the local phase shift in recording modes 1 and 2 is very convenient, as a whole, for obtaining a signal having L to H polarity without distortion, since the increase in the reflected light intensity has a good affinity with the increase in the reflected light intensity in the planar state.

(About Preferable Aspects of Concrete Multilayer Structure and Material)

In consideration of the situation that development of a blue wavelength laser has been advanced, concrete materials and aspects of the multilayer structure shown in FIGS. 2 and 4 will be described below, particularly, by assuming the case where the wavelength λ of the recording/reading light beam 27 is around 405 nm.

(Substrate)

In the surface incidence configuration, as the substrate 21, plastic having appropriate processability and rigidity, metal, glass and the like can be used. Unlike the conventional substrate incidence configuration, there are no restrictions on transparency and birefringence. A guide groove is formed in a surface of the substrate. For metal and glass, it is required to provide a thin optical or thermosetting resin layer on a surface and to form a groove therein. In this point, in terms of manufacturing, it is preferable to use a plastic material and form a shape of the substrate 21, particularly, a disk shape and the guide groove in the surface all at once by injection molding.

As the plastic material which can be injection molded, polycarbonate resin used for the conventional CD or DVD, polyolefin resin, acryl resin, epoxy resin and the like can be used. It is preferable that a thickness of the substrate 21 be set to about from 0.5 nm to 1.2 nm. It is preferable that the sum of the thicknesses of the substrate and the cover layer be set to 1.2 mm, which is the same as that of the conventional CD or DVD. This is because a case and the like, which are used for the conventional CD or DVD, can be directly used. It is specified for a Blu-Ray disk that the thickness of the substrate is set to 1.1 mm and the thickness of the cover layer is set to 0.1 mm (nonpatent document 9).

In the substrate 21, a guide groove for tracking is formed. In this embodiment, for achieving higher density than a CD-R or a DVD-R, it is preferable that a track pitch at which the cover-layer inter-groove part 25 is set to be the recording groove part be set to from 0.1 μm to 0.6 μm. It is more preferable that the track pitch be set to from 0.2 μm to 0.4 μm. As described above, a depth of the groove depends on the recording/reading light wavelength λ, $d_{GL}$, $d_G$, $d_L$ and the like. It is preferable that the groove depth be within a range of approximately from 30 nm to 70 nm. The groove depth is appropriately optimized within the range described above in consideration of the recording groove part reflectivity $R_g$, the signal characteristics of a recording signal, the push-pull signal characteristics, the optical characteristics of a recording layer and the like in the unrecording state. For example, in order to maintain the same $R_g$ for a change in the optical characteristics of the recording layer, it is preferable that, if $n_d$ and $k_d$ are large, the groove depth be relatively reduced, and, if $n_d$ and $k_d$ are small, the groove depth be relatively increased. Moreover, even with the same groove depth, $R_g$ can be maintained at 10% or more by selecting a recording layer which meets the following. Specifically, if $n_d$ is about 1.5 or more, $k_d$ is set to about 0.5 or less. On the other hand, if $k_d$ is about 0.5 or more, $n_d$ is set to about 1.5 or less.

In this embodiment, interference caused by a phase difference of the reflected light between the recording groove part and the inter-recording-groove part is utilized. Thus, the both are required to exist within a focused light spot. Consequently, it is preferable that a recording groove width (a width of the cover-layer inter-groove part 25) is set smaller than the spot diameter (diameter in a groove transverse direction) of the recording/reading light beam 27 on the recording layer 22. In the case where the track pitch is set to 0.32 μm in an optical system having the recording/reading light wavelength λ=405 nm and NA (numeral aperture)=0.85, the recording groove width is set preferably within a range of from 0.1 μm to 0.2 μm. If the recording groove width is outside the range described above, it often becomes difficult to form the groove or the inter-groove part.

The guide groove normally has a rectangular shape. Particularly, it is desirable that, when the recording layer is formed by application to be described later, a dye be selectively accumulated on the substrate groove part for several tens of seconds until most of a solvent of a solution containing the dye is evaporated. Thus, it is also preferable to facilitate dropping and accumulation of the dye solution in the substrate groove part by rounding off corners of the substrate inter-groove (land) part of the rectangular groove. Such a groove geometry having round corners is obtained by etching a surface of a plastic substrate or a stamper after being exposed to plasma, UV ozone or the like for several seconds to several minutes. In etching by plasma, a sharp portion such as the corner of the groove part (an edge of the inter-groove part) in the substrate tends to be selectively scraped off. Thus, the etching by plasma is suitable to obtain the round shape of the corner of the groove part.

In order to provide additional information such as an address and a synchronizing signal, the guide groove normally has an additional signal obtained by groove geometry modulation such as groove wobbling and groove depth modulation, an uneven pit due to intermittence of the recording groove part or the inter-recording-groove part, and the like. For example, in the Blu-Ray disk, a wobble address system using two modulation methods including MSK (minimum-shift-keying) and STW (saw-tooth-wobbles) is used (non-patent document 9).

(Layer Having Light Reflecting Function)

For a layer having a light reflecting function (the reflective layer 23), it is preferable to use one having high reflectivity for the recording/reading light wavelength and having reflectivity of 70% or more for the recording/reading light wavelength. As a layer showing high reflectivity in visible light used as a wavelength for recording and reading, particularly, in a blue wavelength range, Au, Ag, Al and an alloy mainly made of those can be cited. It is preferable to use an alloy mainly made of Ag having high reflectivity at $\lambda=405$ nm and low absorption. By using Ag as a main component, Au, Cu, a rare-earth element (particularly, Nd), Nb, Ta, V, Mo, Mn, Mg, Cr, Bi, Al, Si, Ge or the like is added by 0.01 atom % to 10 atom %. Thus, corrosion resistance to moisture, oxygen, sulfur and the like can be enhanced, which is preferable. Besides the above, it is also possible to use a dielectric mirror in which a plurality of dielectric layers are laminated.

A thickness of the reflective layer 23 is preferably equal to $d_{GL}$ or less, in order to maintain a groove step on the surface of the substrate 21. Similarly, when the recording/reading light wavelength $\lambda=405$ nm, as described above, $d_{GL}$ is preferably set to 70 nm or less. Thus, the thickness of the reflective layer is preferably 70 nm or less, more preferably, 65 nm or less. Except for the case of formation of a dual-layer medium to be described later, the lower limit of the thickness of the reflective layer is preferably 30 nm or more, more preferably, 40 nm or more. Surface roughness Ra of the reflective layer 23 is preferably 5 nm or less, more preferably, 1 nm or less. Ag has a nature that flatness is increased by addition of additives. In this sense, it is preferable to add the above-described element to be added preferably by 0.1 atom % or more, more preferably, by 0.5 atom % or more. The reflective layer 23 can be formed by use of a sputtering method, an ion plating method, an electron-beam evaporation method, and the like.

The groove depth $d_{GL}$ defined by the step on the reflection reference plane is approximately equal to the groove depth $d_{GLS}$ in the surface of the substrate 21. The groove depth can be directly measured by observing the cross section by use of an electron microscope. Alternatively, the groove depth can be measured by use of a probe method such as an atomic force microscope (AFM). If the groove or the inter-groove part is not completely flat, $d_{GL}$ is defined by a difference in height between the groove and the inter-groove part at their centers. Similarly, a groove width means a width of the groove part in which the recording layer 22 actually exists after deposition of the reflective layer 23. If the groove geometry in the surface of the substrate 21 is maintained approximately the same even after formation of the reflective layer 23, a groove width value in the surface of the substrate 21 can be used. Moreover, as the groove width, a width at a half-depth the groove depth is adopted. Similarly, the groove width can be directly measured by observing the cross section by use of the electron microscope. Alternatively, the groove width can be measured by use of the probe method such as the atomic force microscope (AFM).

(Recording Layer Mainly Made of Dye)

A dye to be used in this embodiment is an organic compound having a distinguished absorption band attributable to its structure in a visible light (and its vicinity) wavelength range of from 300 nm to 800 nm. A dye which has absorption in the wavelength $\lambda$ of the recording/reading light beam 27 and is altered by recording to cause an optical change that can be detected as a change in reflected light intensity of reading light in the recording layer 22 in an unrecorded (pre-recorded) state where the dye as described above is formed as the recording layer 22 is called a "main component dye". The main component dye may exert the functions described above as a mixture of a plurality of dyes.

A content of the main component dye is preferably 50% or more by weight %, more preferably, 80% or more, still more preferably, 90% or more. As to the main component dye, it is preferable that a single dye have absorption in the wavelength $\lambda$ of the recording/reading light beam 27 and be altered by recording to cause the optical change described above. Meanwhile, the dye may have its functions allocated in such a manner that the dye has absorption in the wavelength $\lambda$ of the recording/reading light beam 27 and indirectly alters another dye by generating heat so as to cause an optical change. In the main component dye, besides the above, a dye as a so-called quencher may be mixed for improving archival stability (stability with respect to temperature, humidity and light) of the dye having the light absorbing function. As a material contained other than the main component dye, a binding agent (binder) made of a monomeric or polymeric material, a dielectric material and the like can be cited.

The main component dye is not particularly limited by the structure. In this embodiment, the dye causes a change of $\delta n_d > 0$ in the recording layer 22 by recording. Thus, as long as the extinction coefficient $k_d > 0$ in the unrecorded (pre-recorded) state, there are no strict restrictions on the optical characteristics in principle. The main component dye may have absorption in the wavelength $\lambda$ of the recording/reading light beam 27 and may cause alteration by light absorption and heat generation by itself to cause lowering of the refractive index and $\delta n_d > 0$. Here, alteration specifically means a phenomenon, such as expansion, decomposition, ablation and melting, which is caused by absorption and heat generation by the main component dye. The dye to be the main component itself may be altered to lower the refractive index by accompanying some kind of a structural change. Moreover, the change of $\delta n_d > 0$ may be formation of a cavity in the recording layer 22 and/or in the interface, or may be lowering of the refractive index of the recording layer 22 due to thermal expansion.

A temperature indicating such alteration is preferably within a range of from 100° C. to 500° C., more preferably, within a range of from 100° C. to 350° C. From the viewpoint of storage stability and resistance to deterioration of the reading light, it is still more preferable that the temperature be 150° C. or more. Moreover, it is preferable that a decomposition temperature be 300° C. or less, because jitter characteristics, particularly, at a high linear velocity of 10 m/s or more tend to get better. It is preferable that the decomposition temperature be 280 or less, because characteristics in high-speed recording may be further improved. Normally, the alteration behavior described above is measured as thermal characteristics of the main component dye. Moreover, by thermogravimetry-differential thermal analysis (TG-DTA), general behavior can be measured as a weight reduction start temperature. As described above, $d_{bmp}<0$, that is, simultaneous occurrence of deformation such as bulging of the recording layer 22 toward the cover layer 24 is preferable for utilizing the phase shift of $\Delta\Phi>0$. Therefore, it is preferable to use one having a sublimation property or one which has high volatility of decomposed matter and can cause a pressure for expansion in the recording layer 22.

Recording (reading) light power for causing the alteration described above by absorbing energy of recording (reading) light is called recording sensitivity. Particularly, output power of a semiconductor laser with a wavelength of about 400 nm is still lower than that of a red laser. Thus, from the viewpoint of the recording sensitivity, $k_d \leq 0.1$ is preferable. On the other hand, in order to set the recording groove part reflectivity $R_g$ in the unrecorded state to 3% or more, $k_d \leq 1.5$ is preferable and $k_d \leq 1.2$ is more preferable. Moreover, $k_d \leq 1.0$ is still more preferable.

The reflectivity $R_g$ before recording or reflectivity $R_L$ between recording pits is more preferably 10% or more. Thus, $k_d$ is set preferably to 0.6 or less, more preferably, to 0.5 or less. Moreover, if $k_d$ is higher than about 0.6, $n_d$ is set preferably to 1.7 or less, more preferably, to 1.6 or less. However, if $k_d$ is larger than about 1.0, $n_d$ is set preferably smaller than 1.3. Accordingly, light absorption sufficient to generate heat and cause alteration in the recording layer can be obtained. Particularly, in recording at a high linear velocity of 10 m/s or more, $k_d$ is preferably set to 0.25 or more, in order to maintain good recording sensitivity. It is more preferable that $k_d$ be 0.3 or more. Particularly, in the recording pit, if $k_d' \leq k_d$ (in other words, $k_d$ is reduced by recording), an increase in reflected light intensity due to a change in $k_d$ never conflicts with an increase in reflected light intensity due to the phase shift $\Delta\Phi$. Thus, signal amplitude can be increased without distorting a signal waveform. In order to additionally utilize an increase in reflected light intensity due to lowering of $k_d$, $k_d$ is preferably 0.2 or more, more preferably, 0.3 or more. Meanwhile, $k_d'$ is set to 0.3 or less, preferably, 0.2 or less, more preferably, 0.1 or less. Thus, reflectivity $R_H$ after recording can be maintained as high as approximately 30% or more, as in the case of a ROM medium.

The thickness $d_G$ of the recording layer is preferably smaller than $d_{GL}$ as described above so as to sufficiently reduce crosstalk by confining the layer into the cover-layer inter-groove part by the recording pit. $d_G/d_{GL}$ is set preferably to 0.8 or less, more preferably, to 0.7 or less. In the wavelength around 400 nm, in which $d_{GL}$ is preferably set to 70 nm or less, $d_G$ is set preferably to 70 nm or less, more preferably, less than 50 nm. Furthermore, in the recording layer having $k_d$ of 0.3 or more, particularly, the thickness of the recording layer is preferably less than 50 nm, more preferably, 40 nm or less, in order to prevent occurrence of alteration in the recording layer by absorption of reading light in the case where irradiation of the reading light beam is performed many times.

Note that, as to intensity of the reading light beam, normally, reading light intensity (mW)/reading light beam scanning rate (m/s) is preferably 0.2 mW·s/m or less, more preferably, 0.1 mW·s/m or less.

Furthermore, if the thickness of the recording layer is increased too much beyond the preferable values described above, absolute values of the phase shift amount $\delta n_d \cdot d_G$ and the deformation amount $d_{bmp}$ ($<0$) are increased in equation (9) or (9a). Accordingly, $\Delta\Phi$ sometimes gets too high as a whole. When the polarity of the push-pull signal becomes too small or the polarity is inverted, the tracking servo may become unstable. Thus, too much increase in the thickness of the recording layer is not preferable.

On the other hand, it is preferable that the lower limit of the thickness of the recording layer be 5 nm or more and 10 nm or more.

As a dye independently showing preferable characteristics, a dye which can be used in "recording mode 1" or "recording mode 2" is cited.

Specifically, in the dye, a main absorption band peak is within a range of approximately from 300 nm to 600 nm, and a molar absorption coefficient (in chloroform) at the main absorption band peak is within a range of from 20000 to 150000. In an absorption band having a steep peak in which a molar absorption coefficient exceeds approximately 100000, the refractive index in the long wavelength edge $\lambda_L$ is larger than 2 in FIG. 9. Thus, in the case of using such a dye, it is desirable that the recording/reading light wavelength be positioned at the short wavelength edge $\lambda_s$.

Figure 19:
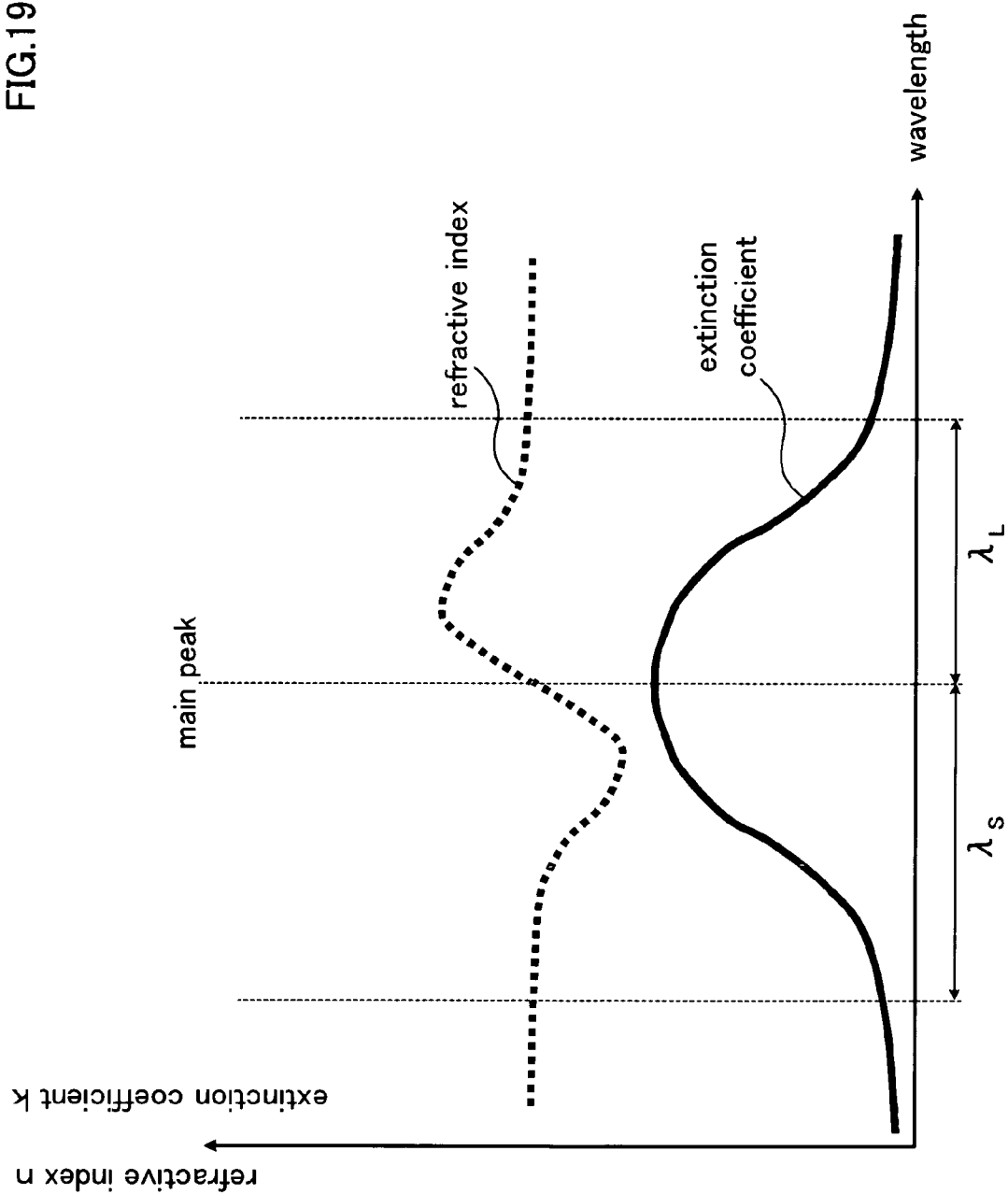
FIG. 19 is a graph showing Kramers-Kronig relations in a relatively flat main absorption band.

Meanwhile, in the case of a relatively gradual and flat absorption band, for example, as shown in FIG. 19, which normally has a molar absorption coefficient of 100000 or less, more preferably, 80000 or less, still more preferably, 70000 or less, the refractive index may be within a range of approximately 1 or more and 2 or less over the entire absorption band. Here, FIG. 19 is a graph showing Kramers-Kronig relations in a relatively flat main absorption band. Moreover, the extinction coefficient $k_d$ may also become 0.6 or less over the entire wavelength range of the absorption band. It is preferable that the molar absorption coefficient be preferably 20000 or more, more preferably, 30000 or more, because the extinction coefficient $k_d$ becomes 0.2 or more and 0.3 or more. Therefore, the recording/reading light wavelength $\lambda$ may be positioned at any of the center portion of the absorption band, the long wavelength edge $\lambda_L$ and the short wavelength edge $\lambda_s$.

In the present invention, the edge $\lambda_s$ having $n_d$ of from 1 to 2 is preferably utilized without using the dye having a steep peak such as the conventional one. Thus, it can be said that the present invention is excellent in that it is possible to use the dye as described above, which has been heretofore difficult to use due to a low refractive index, and in that a range of options to select the dye is significantly extended. The range of $n_d$ is preferably from 1.2 to 1.9, more preferably, from 1.2 to 1.6.

Note that, as described above, it is possible accordingly select a still more preferable range of $n_d$ depending on the value of $k_d$. Particularly, a preferable range as a combination of $n_d$ and $k_d$ is $n_d$=from 1.2 to 1.9 and $k_d$=from 0.28 to 1, more preferably, $n_d$=from 1.3 to 1.9 and $k_d$=from 0.3 to 1.

Furthermore, $n_d'$ is less likely to become 1.5 or less only by elimination of the main absorption band due to decomposition of the dye. Thus, particularly, if $n_d$ is 1.6 or less, it is preferable that formation of a cavity be involved. It is more preferable that deformation of $d_{bmp}<0$ be involved and the deformation amount $|d_{bmp}|$ become twice $d_G$ or more.

Furthermore, there is also an advantage that stability with respect to fluctuations of the recording/reading light $\lambda$ is obtained by using the vicinity of the center portion of the relatively flat absorption band.

Meanwhile, the case of performing recording and reading at the short wavelength edge $\lambda_S$ is preferable in that a dye having a main absorption band in a long wavelength range for the heretofore known CD-R and DVD-R and its derivative material can be also used. Such a dye has well-known nature, and there is reliable data on safety and stability thereof. Moreover, a synthesis route and a mass production method are also established. Thus, such a dye is advantageous in terms of costs.

Note that, as an advantage in the case of utilizing $\lambda_s$, the absorption band of the dye is hardly extended to a ultraviolet wavelength range having a wavelength of 400 nm or less.

Thus, there is no need to worry about deterioration by absorption of ultraviolet light. The above advantage not only solves the problem of the archival stability but also leads to an advantage that a spin-coating method can be used to form the cover layer by use of UV cure resin. It is preferable to standardize the process as much as possible with a coating type process, so that device costs can be suppressed.

In a mercury lamp or the like, which is normal ultraviolet irradiation equipment for curing UV cure resin, light in a wavelength range of approximately 350 nm or less is used for excitation of a polymerization initiator. Particularly, an extinction coefficient $k_d$ in the wave length range of 350 nm or less is preferably 0.5 or less, more preferably, 0.3 or less, or may be 0.

As the dye having the absorption band as described above, a methine compound, a (metal-) azo compound, a pyrone compound, a porphyrin compound and the like, and a mixture thereof can be used. To be more specific, an metal-azo dye JP-A-9-277703, JP-A-10-036693 and the like) and a pyrone dye (JP-A-2003-266954) are preferable in that the both dyes are originally excellent in light resistance, has a weight reduction start temperature $T_d$ of from 150° C. to 400° C. in TG-DTA, and has steep reduction characteristics (volatility of decomposed matter is high and a cavity is easily formed). A particularly preferable dye has $n_d$=from 1.2 to 1.9, $k_d$=from 0.3 to 1, and $T_d$=from 150° C. to 300° C. Above all, an metal-azo dye which satisfies the characteristics described above is preferable.

As the azo dye, to be more specific, cited is a metal complex compound formed of a compound having a coupler component having a 6-hydroxy-2-pyridone structure and a diazo component selected from isoxazole triazole and pyrazole, and metal ions having coordination of the organic dye compound. Particularly, a metal-containing pyridine azo compound having the following general formulas [I] and [II] is preferable.

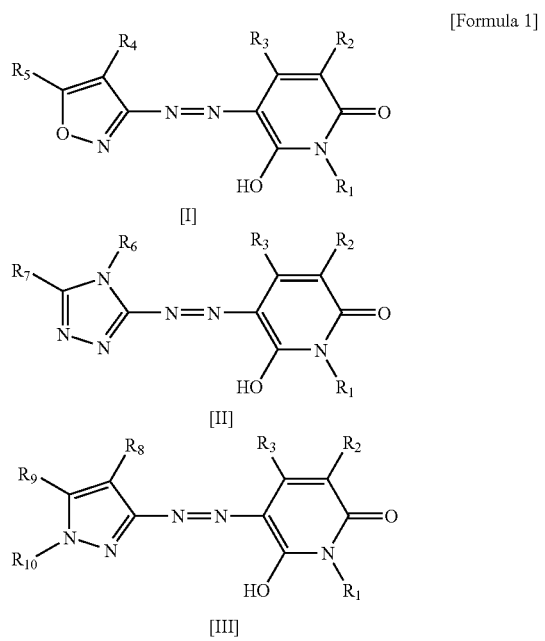

[I]

[II]

[III]

(In the formulas, $R_1$ to $R_{10}$ are independently hydrogen atoms or monatomic functional groups)

Moreover, a cyclic β-diketone azo compound and a metal-containing cyclic β-diketone azo compound formed of metal ions are preferable, which are represented by the following general formulas [IV] and [V].

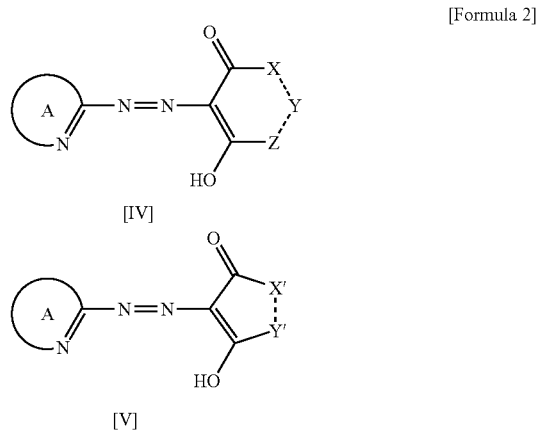

[Formula 2]

[IV]

[V]

(In the formulas, ring A is a nitrogen-containing complex aromatic ring formed with carbon atoms and nitrogen atoms, and X, X', Y, Y' and Z indicate any of a carbon atom which may have a substituent group (including spiro), an oxygen atom, a sulfur atom, a nitrogen atom expressed by N—$R_{11}$, C=O, C=S and C=$NR_{12}$, as well as a hydrogen atom. Those atoms form a 5 or 6-member ring structure with a 6-diketone structure. $R_{11}$ indicates any of a hydrogen atom, a straight-chain or branched alkyl group, a cyclic alkyl group, an aralkyl group, an aryl group, a heterocyclic group, an acyl group expressed by —$COR_{13}$, and an amino group expressing —$NR_{14} R_{15}$, and $R_{12}$ indicates any of a hydrogen atom, a straight-chain or branched alkyl group and an aryl group. $R_{13}$ indicates a hydrocarbon radical or a heterocyclic group. $R_{14}$ and $R_{15}$ indicate a hydrogen atom, a hydrocarbon radical or a heterocyclic group. Moreover, those described above may be replaced with each other according to need. If X, X', Y, Y' and Z are carbon atoms or nitrogen atoms expressed by N—$R_{11}$, bonding of adjacent atoms may be single bond or double bond. Furthermore, if X, X', Y, Y' and Z are carbon atoms, nitrogen atoms expressed by N—$R_{11}$ or C=$NR_{12}$, adjacent atoms may be condensed to form a saturated or unsaturated hydrocarbon ring or a heterocyclic ring.)

In the following description, the compound expressed by the general formula [VI] and the metal-azo compound made of metal are also preferable.

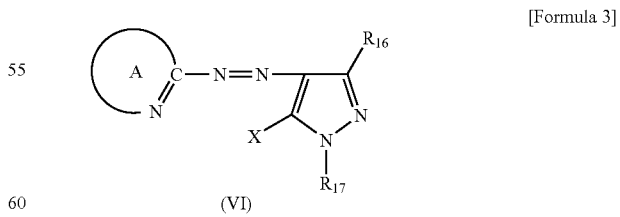

[Formula 3]

(VI)

(In the formula, A represents residue which forms a complex aromatic ring together with bonded carbon atoms and nitrogen atoms. X represents a group having active hydrogen. $R_{16}$ and $R_{17}$ represent hydrogen or arbitrary substituent groups, respectively.)

Furthermore, the metal-azo compound expressed by the following general formula [VII] can be also cited.

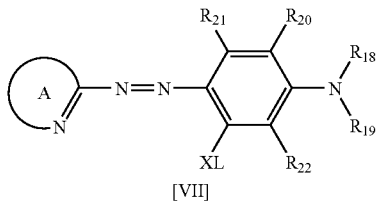

[Formula 4]

[VII]

(In the formula [VII], ring A is a nitrogen-containing complex aromatic ring formed with carbon atoms and nitrogen atoms. XL represents a substituent group which enables coordination of metal when desorption of L turns X into an anion. $R_{18}$ and $R_{19}$ represent any of a hydrogen atom, a straight-chain or branched alkyl group, a cyclic alkyl group, an aralkyl group and an alkenyl group, respectively. $R_{18}$ and $R_{19}$ may form a condensation ring with themselves or with adjacent substituent groups. $R_{20}$, $R_{21}$ and $R_{22}$ represent hydrogen or arbitrary substituent groups, respectively.)

Those azo dyes described above are preferable since the dyes have a main absorption band of a shorter wavelength than the azo dye used in the conventional CD-R and DVD-R, and the extinction coefficient $k_d$ around 400 nm takes a large value of about 0.3 to 1. As metal ions, divalent metal ions such as Ni, Co, Cu, Zn, Fe and Mn can be cited. Particularly, the compound containing Ni and Co is preferable since the compound is excellent in light resistance and resistance to high-temperature high-humidity environment. Note that the metal-azo dye expressed by the formula [VIII] can also be used as a compound Y to be described later by increasing the wavelength.

As the pyrone dye, to be more specific, the compound having any of the following general formulas [VIII] and [IX] is preferable.

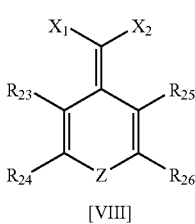

[Formula 5]

[VIII]

(In the formula [VIII], $R_{23}$ to $R_{26}$ represent hydrogen atoms or arbitrary substituent groups. Alternatively, $R_{23}$ and $R_{24}$ are condensed and $R_{25}$ and $R_{26}$ are condensed, respectively, to form a hydrocarbon ring or a heterocyclic structure. The hydrocarbon ring and the heterocyclic ring may have substituent groups. $X_1$ represents an electron-attracting group and $X_2$ represents a hydrogen atom or —Q—Y (Q represents direct bond, an alkylene group with carbon number 1 or 2, an arylene group or a heteroarylene group, and Y represents an electron-attracting group.) The alkylene group, the arylene group and the heteroarylene group may have arbitrary substituent groups besides Y. Z represents —O—, —S—, —SO$_2$—, —NR$_{27}$—($R_{27}$ represents a hydrogen atom, a replaceable hydrocarbon group, a replaceable heterocyclic group, a cyano group or a hydroxyl group), —NR$_{28}$R$_{29}$— ($R_{28}$ and $R_{29}$ represent a hydrogen atom, a replaceable hydrocarbon group or a replaceable heterocyclic group, respectively), —COR$_{30}$— ($R_{30}$ represents a replaceable hydrocarbon group or a replaceable heterocyclic group) or —COR$_{31}$ ($R_{31}$ represents a replaceable hydrocarbon group or a replaceable heterocyclic group).)

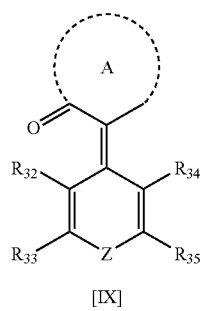

[Formula 6]

[IX]

(In the formula [IX], $R_{32}$ to $R_{35}$ represent hydrogen atoms or arbitrary substituent groups. Alternatively, $R_{32}$ and $R_{33}$ are condensed and $R_{34}$ and $R_{35}$ are condensed, respectively, to form a hydrocarbon ring or a heterocyclic structure. The hydrocarbon ring and the heterocyclic ring may have substituent groups. Ring A represents a carbocyclic ketone ring or a heterocyclic ketone ring, which may have a substituent group together with C=O. Z represents —O—, —S—, —SO$_2$—, —NR$_{36}$—($R_{36}$ represents a hydrogen atom, a replaceable hydrocarbon group, a replaceable heterocyclic group, a cyano group or a hydroxy group), —NR$_{37}$R$_{38}$ ($R_{37}$ and $R_{38}$ represent a hydrogen atom, a replaceable hydrocarbon group or a replaceable heterocyclic group, respectively), —COR$_{39}$— ($R_{39}$ represents a replaceable hydrocarbon group or a replaceable heterocyclic group) or —COR$_{40}$ ($R_{40}$ represents a replaceable hydrocarbon group or a replaceable heterocyclic group).)

Note that, in the optical recording medium 20 to which this embodiment is applied, a dye of $n_d$<$n_c$ or another organic or inorganic material are mixed with the dye X having $n_d$ larger than about 2 to obtain a mixture Y. Accordingly, the average $n_d$ of the recording layer 22 can be lowered to be equal to $n_c$ or less. In this case, the dye of $n_d$>$n_c$ realizes a light absorption function mainly by use of a dye having high $k_d$. In the dye of $n_d$<$n_c$, it is preferable to mix in a material which causes deformation of $d_{bmp}$<0 mainly by decomposition. Note that, in this case, the material may be a dye.

The dye X is a dye which has $n_d$>$n_c$, particularly, $n_d$>2, and has a high refractive index on the long wavelength side of the recording/reading light wavelength in the main absorption band (in the band $\lambda_L$ in FIG. 9). As such a dye, one having a main absorption band peak at from 300 nm to 400 nm and a refractive index $n_d$ of from 2 to 3 is preferable.

As the dye X, specifically, a porphyrin, stilbene, (carbo)styryl, coumarin, pyrone, chalcone, triazole, methine (cyanine and oxonol), sulfonylimine or azlactone compound and the like, and a mixture thereof can be cited. Particularly, a coumarin dye (Japanese Patent Laid-open No. 2000-043423), a carbostyryl dye (Japanese Patent Laid-open No. 2001-287466), the above-described pyrone dye (Japanese Patent Laid-open No. 2003-266954) and the like are preferable since those dyes have appropriate decomposition or ablation temperature. Moreover, phthalocyanine and naphthalocyanine compounds having a strong absorption band around from 350 nm to 400 nm, which is not the main absorption band but conforms thereto, derivatives thereof and a mixture thereof are also preferable.

As the mixture Y, an metal-azo dye having a main absorption band in from 600 nm to 800 nm of wavelength band can be cited. The dye suitable for use in the CD-R and DVD-R, having the extinction coefficient $k_d$ of 0.2 or less and 0.1 or less in the vicinity of 405 nm is preferable. The refractive index $n_d$ is as very high as 2.5 or more in the long wavelength edge $\lambda_L$. However, it is convenient that the refractive index $n_d$ is set to about 1.5 in the short wavelength edge since it is sufficiently distant from the absorption peak.

To be more specific, the metal-azo compound expressed by the general formula [X] can be cited, which is disclosed in Japanese Patent Laid-open No. Hei 6(1994)-65514.

[Formula 7]

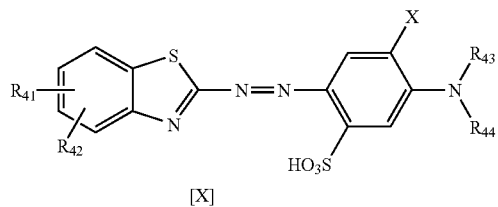

[X]

(In the formula [X], $R_{41}$ and $R_{42}$ represent hydrogen atoms, halogen atoms, alkyl groups with carbon numbers 1 to 6, fluoroalkyl groups, branched alkyl groups, nitro groups, cyano groups, $COOR_{45}$, $COR_{46}$, $OR_{47}$ or $SR_{48}$ ($R_{45}$ to $R_{48}$ represent alkyl groups having carbon numbers 1 to 6, fluoroalkyl groups, branched alkyl groups or cyclic alkyl groups). X represents a hydrogen atom, an alkyl group having carbon numbers 1 to 3, a branched alkyl group, $OR_{49}$ or $SR_{50}$ ($R_{49}$ and $R_{50}$ represent alkyl groups having carbon numbers 1 to 3). $R_{43}$ and $R_{44}$ represent hydrogen atoms, alkyl groups having carbon numbers 1 to 10, branched alkyl groups or cyclic alkyl groups. $R_{43}$ and $R_{44}$ may be bonded to an adjacent benzene ring. Alternatively, a nitrogen atom, $R_{43}$ and $R_{44}$ may form one ring.)

Alternatively, the metal-azo compound expressed by the general formula [XI], which is disclosed in Japanese Patent Laid-open No. 2002-114922, is also preferable.

[Formula 8]

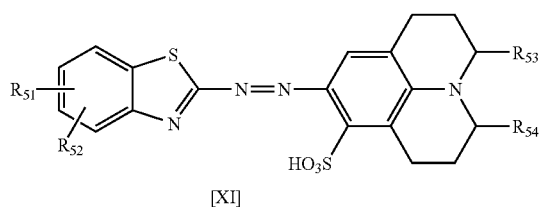

[XI]

(In the formula [XI], $R_{51}$ and $R_{52}$ represent hydrogen atoms, halogen atoms, alkyl groups with carbon numbers 1 to 6, fluoroalkyl groups, branched alkyl groups, nitro groups, cyano groups, $COOR_{55}$, $COR_{56}$, $OR_{57}$ or $SR_{58}$ ($R_{55}$ to $R_{58}$ represent alkyl groups having carbon numbers 1 to 6, fluoroalkyl groups, branched alkyl groups or cyclic alkyl groups). X represents a hydrogen atom, an alkyl group having carbon numbers 1 to 3, a branched alkyl group, $OR_{59}$ or $SR_{60}$ ($R_{59}$ and $R_{60}$ represent alkyl groups having carbon numbers 1 to 3). $R_{53}$ and $R_{54}$ represent hydrogen atoms or alkyl groups having carbon numbers 1 to 3.)

In this embodiment, the recording layer 22 is formed by the coating method, the vacuum evaporation method or the like. However, particularly, it is preferable to form the recording layer 22 by use of the coating method. Specifically, an application liquid for the recording layer 22 is prepared by dissolving the dye, as a main component, together with a binder, quencher and the like in an appropriate solvent, and is applied onto the reflective layer 23 described above. A concentration of the main component dye in the solution is normally from 0.01 wt % to 10 wt %, preferably, from 0.1 wt % to 5 wt %, more preferably, from 0.2 wt % to 2 wt %. Accordingly, the recording layer 22 is normally formed to have a thickness of about from 1 nm to 100 nm. In order to set the thickness to less than 50 nm, the dye concentration is set preferably to less than 1 wt %, more preferably, less than 0.8 wt %. Moreover, it is preferable that the number of times of application be more controlled.

As the solvent which solves the main component dye material and the like, cited are: alcohol such as ethanol, n-propanol, isopropanol, n-butanol diacetone alcohol; a fluorohydrocarbon solvent such as tetrafluoropropanol (TFP) and octafluoropentanol (OFP); glycol ethers such as ethylene glycol monomethyl ether, ethylene glycol monoethyl ether and propylene glycol monomethyl ether; ester such as butyl acetate, ethyl lactate and cellosolve acetate; chlorinated hydrocarbon such as dichlormethane and chloroform; hydrocarbon such as dimethylcyclohexane; ether such as tetrahydrofuran, ethyl ether and dioxane; ketone such as methyl ethyl ketone, cyclohexanone and methyl isobutyl ketone; and the like. The solvent is appropriately selected in consideration of solubility of the main component dye material and the like to be dissolved. Moreover, two kinds or more of those described above can be mixed and used.

As the binder, it is possible to use an organic polymer such as cellulose derivative, natural polymer, hydrocarbon resin, vinyl resin, acryl resin, polyvinyl alcohol and epoxy resin. Furthermore, for improving light resistance, various dyes or a fading preventing agent other than dyes can be contained in the recording layer 22. As the fading preventing agent, generally, a singlet oxygen quencher is used. Usage of the fading preventing agent such as the singlet oxygen quencher is normally 0.1 wt % to 50 wt %, preferably, 1 wt % to 30 wt %, more preferably, 5 wt % to 25 wt %, relative to the recording layer material.

As the coating method, a spray method, a spin-coating method, a dipping method, a roll coating method and the like can be cited. Particularly, for a disk-shaped recording medium, the spin-coating method is preferable since a uniform film thickness can be secured and defective density can be reduced.

(Interface Layer)

In this embodiment, particularly, the interface layer is provided between the recording layer 22 and the cover layer 24. Thus, bulging of the recording layer 22 toward the cover layer 24 and $d_{bmp}<0$ can be effectively utilized. The thickness of the cover layer 24 is preferably from 1 nm to 50 nm. The upper limit thereof is set to 30 nm. Moreover, the lower limit thereof is set preferably to 5 nm or less. Reflection on the interface layer is desired to be as small as possible. This is in order to selectively utilize the phase shift of reflected light from the reflective layer 23 that is the main reflective surface. It is not preferable in this embodiment that the reflective surface be on the interface layer. Thus, it is desirable that a difference in refractive index between the interface layer and the recording layer 22 or between the interface layer and the cover layer 24 be small. In either case, the difference is preferably 1 or less, more preferably, 0.7 or less, still more preferably, 0.5 or less.

Note that there have been known the following effects achieved by using the interface layer, including suppression of formation of the mixture layer 25 $m$ as shown in FIG. 4, prevention of corrosion caused by an adhesive used when the cover layer 24 is attached to the recording layer 22 in a reverse configuration and prevention of penetration of a solvent to the recording layer 22, which is caused by a solvent used when the cover layer 24 is applied. In this embodiment, it is possible, if necessary, to utilize such effects in combination. As a material used as the interface layer, one which is transparent to the recording/reading light wavelength and is chemically, mechanically and thermally stable, is preferable. Here, "transparent" means that transmittance with respect to the recording/reading light beam 27 is 80% or more. However, the transmittance is preferably 90% or more. The upper limit of the transmittance is 100%.

As the interface layer, metal, an oxide such as a semiconductor, a dielectric compound such as a nitride, a carbide, a sulfide, magnesium (Mg) and a fluoride such as calcium (Ca) or a mixture thereof is preferable. As the refractive index of the interface layer, as described above, one having a difference of 1 or less between the recording layer and the cover layer is preferable. As a value, the refractive index is desired to be 1 to 2.5. Depending on hardness and the thickness of the interface layer, deformation of the recording layer 22, particularly, bulging deformation ($d_{bmp}$<0) toward the cover layer 24 can be facilitated or suppressed. In order to effectively utilize the bulging deformation, a dielectric material having a relatively low hardness is preferable. Particularly, a material obtained by mixing another metal, an oxide such as a semiconductor, a nitride or a carbide into $ZnO$, $In_2O_3$, $Ga_2O_3$, $ZnS$ or a sulfide of rare earth metal is preferable. Moreover, it is also possible to use a plastic sputtered film and a plasma-polymerized film of a hydrocarbon molecule. Note that, even if the interface layer is provided, the optical path length in the equations (2) and (3) and the equations (7) to (9) still hold if the thickness and the refractive index are the same in the recording groove part and the inter-groove part and are not significantly changed by recording.

(Cover Layer)

As the cover layer 24, a material which is transparent to the recording/reading light beam 27 and has small birefringence is selected. The cover layer 24 is normally formed by attaching a plastic plate (called a sheet) with an adhesive or by curing with light, radiation, heat or the like after application. The cover layer 24 has transmittance of, preferably, 70% or more, more preferably, 80% or more with respect to the wavelength λ of the recording/reading light beam 27.

The plastic used as a sheet material is polycarbonate, polyolefin, acryl, cellulose triacetate, polyethylene terephthalate or the like. For attachment, light, radiation cure, thermosetting resin and an pressure-sensitive adhesive are used. As the pressure-sensitive adhesive, it is possible to use a pressure-sensitive adhesive made of respective polymers of acryl, methacrylate, rubber, silicon and urethane.

For example, after a coating fluid is prepared by dissolving photo-curing resin, which forms an adhesive layer, in an appropriate solvent, this coating fluid is applied onto the recording layer 22 or the interface layer to form a coated film. Thereafter, a polycarbonate sheet is attached onto the coated film. Subsequently, in the attached state, if necessary, the coated film is extended and expanded by rotating the medium.

Thereafter, the film is cured by ultraviolet irradiation by use of a UV lamp. Alternatively, the pressure-sensitive adhesive is previously applied to the sheet, and the sheet is attached to the recording layer 22 or the interface layer. Thereafter, the sheet is pressed by appropriate pressure and pressure-bonded to the layer.

As the pressure-sensitive adhesive, from the viewpoint of transparency and durability, an acryl or methacrylate polymer adhesive is preferable. To be more specific, 2-ethylhexyl acrylate, n-butyl acrylate, iso-octyl acrylate and the like are used as main component monomers. These main component monomers are copolymerized with a polar monomer such as acrylic acid, methacrylic acid, acrylamide derivative, maleic acid, hydroxyl ethyl acrylate and glycidyl acrylate. Physical properties such as a glass transition temperature Tg, tack performance (adhesion force immediately formed in contact with a low pressure), peeling strength and shear adhesion can be controlled by control of a molecular weight of the main component monomer, mixing of short-chain components and control of crosslinking point density by acrylic acid-(non-patent document 11, Chapter 9). As a solvent for acryl polymer, acetic ester, butyl acetate, toluene, methyl ethyl ketone, cyclohexane or the like can be used. It is preferable that the pressure-sensitive adhesive further contain polyisocyanate crosslinker.

As the pressure-sensitive adhesive, the materials as described above are used. The pressure-sensitive adhesive is evenly applied by a predetermined amount onto a surface of the cover layer sheet material, which comes into contact with the recording layer side, and the solvent is dried. Thereafter, the sheet material is attached to a surface on the recording layer (on a surface of the interface layer if the layer is included) and pressed by a roller or the like. Subsequently, the adhesive is cured. When the cover layer sheet material having the pressure-sensitive adhesive applied thereto is attached to the surface of the recording medium having the recording layer formed thereon, attachment is preferably performed in vacuum so as not to form a bubble by taking in air.

Moreover, after the pressure-sensitive adhesive is applied onto a mold releasing film and the solvent is dried, the cover layer sheet is attached thereto. Thereafter, the mould releasing film is removed, and the cover layer sheet and the adhesive layer are integrated. Subsequently, the integrated layer may be attached to the recording medium.

In the case where the cover layer 24 is formed by use of the coating method, the spin-coating method, the dipping method or the like is used. Particularly, for the disk-shaped medium, the spin-coating method is often used. As the material of the cover layer 24 by coating, similarly, urethane, epoxy or acryl resin is used. The material is irradiated with ultraviolet light, electron rays or radiation after application, and is cured by facilitating radical polymerization or cationic polymerization.

Here, in order to utilize deformation of $d_{bmp}$<0, it is desirable that the layer of the cover layer 24 on the side which at least comes into contact with the recording layer 22 or the interface layer (at least the range of thickness equal to or larger than $d_{GL}$) can easily follow the bulging deformation. Moreover, it is preferable that $d_{bmp}$ ranges from equal to $d_G$ or to 3 times of $d_G$. It is rather desirable to actively utilize large deformation, which is 1.5 times as large or more. The cover layer 24 preferably has appropriate softness (hardness). For example, in the case where the cover layer 24 is formed of a sheet material made of resin having a thickness of from 50 μm to 100 μm, and the layer is attached with a pressure-sensitive adhesive, since the adhesive layer has a glass transition temperature as low as from −50° C. to 50° C. and is relatively soft, the deformation of $d_{bmp}$<0 becomes relatively large. It is particularly preferable that the glass transition temperature be equal to room temperature or lower. Normally, the thickness of the adhesive layer made of the adhesive is preferably from 1 µm to 50 µm, more preferably, from 5 µm to 30 µm. It is preferable to provide a deformation facilitating layer which actively controls the amount of the bulging deformation by controlling the thickness of the adhesive layer material, the glass transition temperature and the crosslinking density. Alternatively, in the cover layer 24 formed by the coating method, for control of the deformation amount $d_{bmp}$, it is also preferable to apply more than one layer by separating a deformation facilitating layer having a thickness of from 1 µm to 50 µm, preferably, from 5 µm to 30 µm and having relatively low hardness from a layer having a remaining thickness.

As described above, in the case where the deformation facilitating layer is formed, by use of the pressure-sensitive adhesive, an adhesive, a protective coat agent or the like, on the recording layer (the interface layer) side of the cover layer, in order to provide certain flexibility, the glass transition temperature Tg is preferably 25° C. or less, more preferably, 0° C. or less, still more preferably, −10° C. or less. The glass transition temperature Tg mentioned here is a value measured after curing of the pressure-sensitive adhesive, the adhesive, the protective coat agent or the like. A simple measurement method of Tg is differential scanning calorimetry (DSC). Moreover, Tg can also be obtained by using a dynamic viscoelasticity measuring apparatus to measure temperature dependence of a storage elastic modulus (nonpatent document 11, Chapter 5).

Facilitation of the deformation of $d_{bmp}$<0 not only can increase the signal amplitude of L to H but also has an advantage that the recording power required for recording can be reduced. On the other hand, if the deformation is too large, crosstalk is increased or the push-pull signal becomes too small. Thus, it is preferable that the deformation facilitating layer maintain proper viscoelasticity even at the glass transition temperature or more.

As to the cover layer 24, in order to further provide the incidence side surface thereof with functions such as scuff resistance and resistance to fingerprint adhesion, a layer having a thickness of about from 0.1 µm to 50 µm may be additionally provided on the surface thereof. The thickness of the cover layer 24 is preferably from 0.01 mm to 0.3 mm, more preferably, from 0.05 mm to 0.15 mm although depending on the wavelength λ of the recording/reading light beam 27 and NA (numerical aperture) of the objective lens 28. It is preferable that the overall thickness including thicknesses of an adhesion layer, a hard coat layer and the like be set within an optically allowable thickness range. For example, in a so-called Blu-Ray disk, the thickness of the cover layer is preferably controlled to be about 100 µm±3 µm or less.

Note that, as in the case of providing the deformation facilitating layer, if a layer having a different refractive index is provided on the recording layer side of the cover layer, the value of the layer on the recording layer side is referred to as the refractive index $n_c$ of the cover layer in the present invention.

(Another Configuration)

In this embodiment, it is possible to insert interface layers into respective interfaces between the substrate 21, the reflective layer 23 and the recording layer 22, besides the above-described interface between the recording layer 22 and the cover layer 24, for prevention of contact and diffusion between the respective layers, and control of phase differences and reflectivity.

Aspects of Other Embodiments (1) Semi-Transparent Recording Medium for Multilayer Recording In the optical recording medium 20 to which this embodiment is applied, if the thickness of the reflective layer 23 is reduced so as to allow approximately 50% or more of the recording/reading light to transmit through the reflective layer 23, a so-called multilayer recording medium can be possible. Specifically, the multilayer recording medium is a recording medium having a plurality of information layers provided on the substrate 21.

Figure 10:
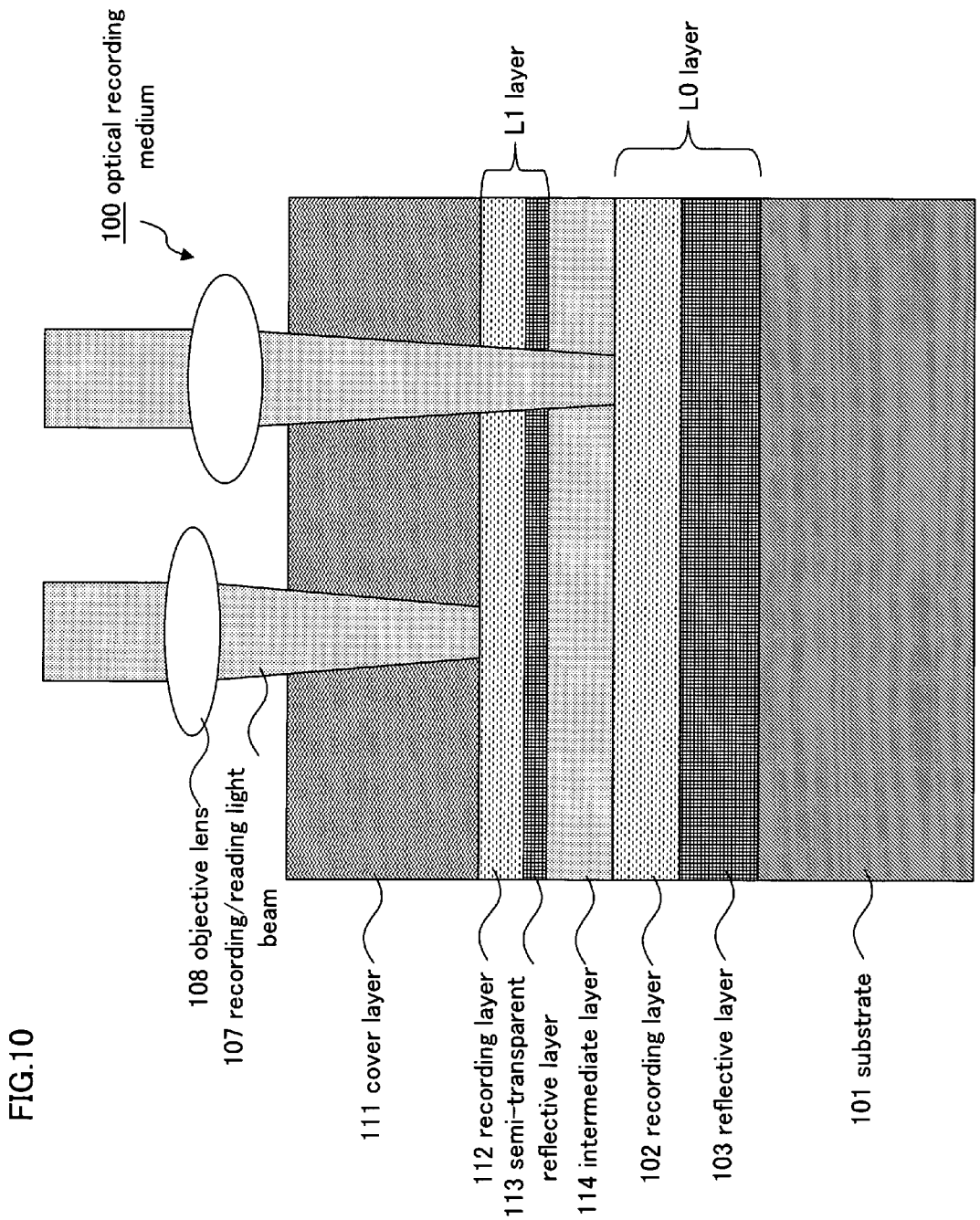
FIG. 10 is a view showing an optical recording medium in which two information layers are provided.

FIG. 10 is a view showing an optical recording medium 100 in which two information layers are provided. The information layer on the side on which a recording/reading light beam 107 is made incident is called a L1 layer, and the information layer on the far side is called a L0 layer. The L1 layer preferably has transmittance of 50% or more. If a semi-transparent reflective layer 113 of the L1 layer is, for example, Ag alloy, a thickness of the Ag alloy is set preferably to from 1 nm to 50 nm, more preferably, to from 5 nm to 30 nm, still more preferably, from 5 nm to 20 nm. Such a highly transparent reflective layer is called the semi-transparent reflective layer 113. In order to prevent crosstalking of signals, a transparent intermediate layer 114 is provided between the L0 and L1 layers. Note that, for a reflective layer 103 of the L0 layer in FIG. 10, it is possible to use the same material as that of the above-described reflective layer 23 (FIG. 2). Note that, also in this case, it is important in this embodiment that a main reflective surface is on the interface between the semi-transparent reflective layer 113 and a recording layer 112 in the L1 layer and is on the interface between the reflective layer 103 and a recording layer 102 in the L0 layer.

For example, in an optical system in which a wavelength λ of the recording/reading light beam 107 is 405 nm and NA (numerical aperture) is 0.85, a thickness of the intermediate layer 114 is set to about 25 µm, and a thickness of a cover layer 111 is set to about 75 µm. Similarly, a thickness distribution of the intermediate layer 114 is preferably set to about ±2 µm or less. Within the range of the multilayer structure in the optical recording medium 100 to which this embodiment is applied, different layer structures or the same layer structure may be used for the respective L0 and L1 layers. Moreover, compositions and materials of the recording layers 102 and 112, which are used for the respective information layers and are mainly made of dyes, may be different from each other or may be the same.

In this embodiment, particularly, since a phase shift is utilized, it is expected that an amount of light transmitted through the L1 layer is hardly changed before and after recording. This means that, regardless of whether the L1 layer is recorded or unrecorded, an amount of light transmitted to the L0 layer and an amount of light reflected from the L0 layer are hardly changed. Moreover, the above point is preferable because stable recording and reading of the L0 layer can be performed regardless of the state of the L1 layer.

(2) Partial ROM Disk

In the optical recording medium 20 to which this embodiment is applied, absorption of reading light in the recording layer 22 is relatively small. Thus, the reflected light intensity from the reflective film itself in the mirror surface part is hardly attenuated in the recording layer 22. As a result, it is possible to maintain the value of 50% or more of the reflected light intensity in the case where the thickness of the recording layer is set to 0. Meanwhile, since the recording groove part is the substrate groove part and the depth thereof is the "intermediate groove", $R_g$ in the unrecorded state can be reduced to from 3% to 30%. Normally, in consideration of the modulation and the push-pull signal intensity, the pit depth of the ROM is set to have a phase difference $\Phi$ of from $\pi/2$ to $\pi$ in FIG. 6. Thus, the pit depth of the ROM and the intermediate groove depth of the present invention become approximately the same. Specifically, a value $\Phi p$ obtained by subtracting a phase of reflected light in the pit part from a phase of reflected light in the pit peripheral part of the ROM can be set approximately the same as $\Phi b$ defined by the equation (2). Thus, if the recording pit, in which the recording groove is partially and intermittently formed, is provided, as a conventional ROM, by use of change in reflected light intensity according to phase, information can be previously recorded on the substrate. Furthermore, if a portion where the recording groove is partially cut off and a continuous groove part are formed, a partial ROM can be easily realized. If the "shallow groove" and the "deep groove" shown in FIG. 6 are adopted, it is difficult to obtain signal amplitude in the ROM part or it is difficult to transfer the pit. In the conventional CD-R and DVD-R, since the "deep groove" is adopted, it is required to separately set the pit depth to the range of the "intermediate groove" having a significantly different depth. It is very difficult to previously form the partial ROM on the substrate.

However, according to the present invention, intermittence or continuity of the groove allows a fixed thickness of photoresist on a glass master in formation of a stamper, and can be easily realized by turning on/off a laser beam for exposure. Normally, a portion to be exposed in the photoresist becomes the groove in the substrate or the pit part. By use of the stamper formed as described above, it is possible to form a substrate in which a read-only data region including a pit array having the same depth as that of the recording groove is provided at least in a part on the substrate. On this substrate, together with the ROM part and the recording groove part, the same multilayer structure as that shown in FIG. 2, that is, the layer 23 having the light reflecting function, the recording layer 22 containing, as the main component, the dye having the light absorption function for the recording/reading light wavelength in the unrecorded state, and the cover layer 24 which makes the recording/reading light incident on the recording layer are at least formed. Thus, a partial ROM medium is formed. In the optical recording medium of the present invention, absorption of the recording/reading light in the recording layer 22 mainly made of the dye is small, and the transmittance can be set to 70% or more. Thus, in the ROM part, it is possible to obtain approximately the same reflectivity and modulation as those of the ROM medium having no dye main component recording layer. Moreover, after the recording pit is formed in the recording groove part, for the reflectivity $R_H$ after recording although slightly lowered, reflectivity close to inter-mark (space) reflectivity in the ROM part can be obtained. Thus, a servo which keeps the same servo gain can be realized. There is also an advantage that, in the recording groove part, tracking by DPD (Differential Phase Detection), which is used for a tracking servo of the ROM medium, can be realized, as in the case of the ROM part. Since a DPD signal is largely influenced by a phase difference in the (recording) pit (mark) part, it is possible to secure a DPD signal as large as that in the ROM part in the recording medium of the present invention, which has the recorded pit portion mainly including the phase shift.

Note that, in a method for manufacturing the partial ROM as described above, the pit depth in the ROM part and the depth $d_{GLS}$ of the recording groove are set the same. However, the both depths do not have to be strictly the same. For example, if the laser beam power is varied between on and off in the pit part and the recording groove part without using two-step modulation of the laser beam power such as turning on/off of the laser beam for exposure, the pit depth and the depth of the recording groove can be set different from each other. As described above, in the present invention, the fact that the recording pit and the recording groove have the same depth means that $|\Phi p - \Phi b|$ is less than $\pi/2$. However, normally, $|\Phi p - \Phi b|$ is preferably $\pi/3$ or less, more preferably, $\pi/4$ or less.

Moreover, if the dye used for the recording layer 22 is changed to one susceptible to corrosion under specific conditions or with time, it is possible to realize a ROM medium which can be played in early stages but can no longer be played after a predetermined period of time. For example, if, at a video rental store, a disk can no longer be played after a predetermined rental period, the disk can be utilized as a digital video disk which is less likely to become unreturnable and to be wrongfully used.

Meanwhile, if the dye used for the recording layer 22 is changed to a dye which is not transparent in early stages but is turned transparent under specific conditions or with time, it is also possible to realize a ROM medium which cannot be played during distribution but can be played after the medium is delivered to a user.

Furthermore, if the L to H recording, that is, the recording method described in this embodiment is performed by irradiating the ROM pit part by the recording light beam, the reflectivity in the pit part is increased to make reading of a ROM signal impossible. Such a method can be also realized and utilized for security of information on the recording medium.

(3) Additional Specification Concerning Push-Pull Signal

In the optical recording medium 10 having the conventional configuration shown in FIG. 1, since the recording layer 12 is formed by the coating method, $d_G > d_L$ is established. Thus, the groove step $d_{GL}$ on the reflection reference plane formed on the recording layer 12 becomes shallower than the groove step $d_{GLS}$ on the substrate 11. Specifically, $d_{GL} < d_{GLS}$ is established. Therefore, in the optical recording medium 10 having the configuration of FIG. 1, even if $d_{GLS}$ is set to the depth of the "deep groove" described in FIG. 6, the step can be about the "shallow groove" to the "intermediate groove" on the reflection reference plane. Moreover, the medium is designed in such a manner that the reflectivity $R_g$ in the unrecorded is normally set as high as about 50% to 80% for securing of ROM compatibility. Thus, the normalized push-pull signal intensity $IPP_{norm}$ is normally about from 0.2 to 0.4 in a DVD. An optical recording device is designed according to a value of such normalized push-pull signal intensity. Design of a next-generation recording device compatible with a blue laser has been advanced on the assumption that the same value is realized on a medium side.

Meanwhile, in the optical recording medium 20 shown in FIG. 2, to which this embodiment is applied, it has been already mentioned that the groove step $d_{GL}$ on the reflection reference plane becomes approximately equal to the substrate groove step $d_{GLS}$. According to the study conducted by the inventors of the present invention, if the "intermediate groove" described in FIG. 6 is used as $d_{GLS}$, $d_{GL}$ also takes the same value. Moreover, the reflectivity in the recording groove part in the unrecorded state is normally as low as about from 3% to 30%, compared with that of the conventional ROM-compatible medium. Thus, $IPP_{norm}$ gets higher than that of the optical recording medium 10 (FIG. 1) having the conventional configuration and, in some cases, takes a high value exceeding 1. Moreover, since the reflectivity is increased after recording, $IPP_{norm}$ is often lowered to about 50% of that before recording. However, $IPP_{norm}$ is desirably secured to be at least 0.2 or more, in order to stabilize the tracking servo. Particularly, if the groove depth is made closer to the "shallow groove" in order to reduce $IPP_{norm}$ before recording, sufficient signal amplitude cannot be obtained. Therefore, at least after recording, from 0.2 to 0.5 is set as the $IPP_{norm}$ value, which is the same as that of the existing DVD-R and the like. Moreover, before recording, $IPP_{norm}$ is preferably set to from 0.5 to 0.8 in order to maintain the value described above. Thus, in the beam having the recording/reading light wavelength λ of about 405 nm and NA (numerical aperture) of 0.85, it is preferable that the track pitch be set to 0.32 μm and $d_{GLS} \approx d_{GL}$ is set to from 40 nm to 60 nm. The groove width is set to from 0.14 μm to 0.18 μm. Moreover, the reflectivity $R_g$ in the recording groove part in the unrecording state is preferably set to from 10% to 25%. Thus, it is preferable that the thickness $d_G$ of the recording layer be from 20 nm to 40 nm, the refractive index $n_d$ be set to from 1 to 2 and the extinction coefficient $k_d$ be set to from 0.2 to 0.5.

(Examination of Recording by Phase Difference)

Principally, whether or not L to H recording is performed by use of the phase shift ΔΦ in the recorded pit portion 25p shown in FIG. 4 can be examined as described below. Note that the contribution of the phase shifts in the recorded pit portion 16p in FIG. 3 and in the recorded pit portion 26p in FIG. 5 can be similarly examined. In this embodiment, the reflected light intensity change due to the reflectivity change in the planar state of the recording layer 22 between before and after recording is not the main factor of recording. Therefore, if good signal amplitude with L to H polarity can be obtained compared with the case where the guide groove depth is the "intermediate groove" when recording is performed by providing the multilayer structure including the reflective layer 23, the recording layer 22, the cover layer 24 and the like on the flat surface, not the reflected light intensity change due to the phase shift but the reflected light intensity change due to the reflectivity change in the planar state is considered to be the main factor.

Alternatively, even if some kind of signal amplitude is observed in the case where recording is performed in the mirror surface part (the portion in the planar state), the phase shift is considered to be the main factor of the signal amplitude if the signal amplitude is not more than half the signal amplitude in the case where L to H recording is performed with the predetermined "intermediate groove" depth.

In this embodiment, the main recording principles are assumed to be as described below. Specifically, as shown in FIG. 6, the reflected light intensity in the unrecorded state in the recording groove part is lowered with respect to the reflectivity R0 in the planar and unrecorded state by providing the guide groove, the phase shift such as to optically reduce the groove depth is caused by recording, and the reflected light intensity after recording is made closer to R0. Therefore, as described above, in recording on the flat surface, significant increase in the reflected light intensity relative to R0 is impossible. According to FIG. 6, if there is the phase shift of ΔΦ>0, the reflected light intensity is likely to be rather lowered, in other words, H to L recording is likely to occur. In such a case, the polarity of the push-pull signal is inverted.

Regarding the increase in the reflected light intensity relative to R0, there is a high possibility that significant lowering of the extinction coefficient in the recording layer 22 drastically reduces the amount of light absorbed in the recording layer 22, which leads to the increase in the reflected light intensity. It may be difficult to conduct examination by performing recording on a complete flat surface (the mirror surface part) with a focused light beam and performing reading, because tracking of the tracking servo is impossible. However, in such a case, similar examination is conducted while maintaining tracking of the guide groove in the very shallow groove of about 20 nm to 30 nm, for example. Accordingly, it is possible to determine that there is the effect of the phase shift if, similarly, the L to H recording signal amplitude is significantly (approximately half or less) lowered compared with the case of the "intermediate groove". In such a case of the "shallow groove", if the large L to H recording signal amplitude is still observed, the main factor is contribution to recording by the increasing of the reflectivity in the planar state due to significant reduction in the extinction coefficient $k_d$ of the recording layer 22. The above point is considered to be different from the recording method by use of the phase different in this embodiment.

Alternatively, even if recording is not performed in the completely planar state, when the guide groove depth is made smaller from the depth close to |Φb|=π, if the L to H signal amplitude starts to get lowered when the depth becomes smaller than approximately |Φb|=π/2, it is possible to determine similarly that there is the effect of the phase shift.

(Measurement of Refractive Index of Recording Layer in Thin Film State)

As the refractive index of the recording layer 22 in this embodiment, a value measured by the following method is used. An optical constant (complex refractive index $n_d^*=n_d-i \cdot k_d$) is measured by ellipsometry. The measurement and a calculation method will be described below.

Ellipsometry is a method of measuring an optical constant, a thickness of a thin film, and the like based on a difference in a polarized state due to light reflection by irradiating samples with polarized light p and polarized light s. As measured values, a phase difference Δ and an amplitude ratio Ψ are obtained, which are defined in the following equation as a ratio of an amplitude reflection coefficient $r_p$ and an amplitude reflection coefficient $r_s$ of the polarized light p and the polarized light s. Thus, based on these values, the optical constant and the thin film thickness are calculated by fitting using numerical calculation (least squares method) and the like.

[Equation 1]

$$\rho \equiv \tan\Psi \exp(i\Delta) \equiv \frac{r_p}{r_s} \qquad (22)$$

In this measurement, first, a sample is prepared by applying a dye onto a substrate made of polycarbonate. Thereafter, light having a wavelength λ=405 nm is made incident on the sample in the air while changing an incident angle. Thus, dependence of Ψ and Δ on the incident angle is measured.

Meanwhile, it has been generally known that ρ=tan Ψ·exp (iΔ) when the light having the wavelength λ is made incident on the sample having a structure of medium (air)/thin film (dye)/substrate (polycarbonate) from the air side at the incident angle $\theta_0$ is expressed by the following equation (23) when the complex refractive indices of the medium, the thin film and the substrate are set to $N_0$, $N_1$ and $N_2=n_d^*$, respectively, and the thickness of the thin film is set to d (nonpatent document 10).

[Equation 2]

$$\rho = \left[\frac{r_{01,p} + r_{12,p}\exp(-i2\beta)}{1 + r_{01,p}r_{12,p}\exp(-i2\beta)}\right] / \left[\frac{r_{01,s} + r_{12,s}\exp(-i2\beta)}{1 + r_{01,s}r_{12,s}\exp(-i2\beta)}\right] \quad (23)$$

[Equation 3]

$$\beta = 2\pi d N_1 \cos\theta_1 / \lambda \quad (24)$$

[Equation 4]

$$r_{jk,p} = \frac{N_k\cos\theta_j - N_j\cos\theta_k}{N_k\cos\theta_j + N_j\cos\theta_k} \quad (25)$$

[Equation 5]

$$r_{jk,s} = \frac{N_j\cos\theta_j - N_k\cos\theta_k}{N_j\cos\theta_j + N_k\cos\theta_k} \text{ Note that } (j, k = 0, 1, 2) \quad (26)$$

[Equation 6]

$$N_0\sin\theta_0 = N_1\sin\theta_1 = N_2\sin\theta_2 \quad (27)$$

A complex refractive index $N_2$ ($=n_d^*=n_d-i\cdot k_d$) and a film thickness d of a dye thin film which can explain the equation (23) without confliction with the incident angle dependence of the measured $\Psi$ and $\Delta$ are obtained by the least squares method.

Note that, here, as the refractive index $N_0$ of the air and the refractive index $N_1$ of polycarbonate, $N_0=1.0$ and $N_1=1.58$ are used based on the values in the document.

Note that, here, by least squares approximation, only a plurality of combinations of $n_d$, $k_d$ and d are obtained and a unique combination cannot be obtained. However, if any one of $n_d$, $k_d$ and d can be obtained, the other two values can be determined.

Since the purpose of this measurement is to obtain $n_d$ and $k_d$, it is required to separately obtain d. Thus, in this embodiment, it is utilized that, although $n_d$ and $k_d$ are amounts dependent on the wavelength, d is an amount not dependent on the wavelength. Specifically, first, $n_d$ and d are obtained by use of a wavelength $\lambda_0$ in which there is no absorption, that is, $k_d$ is regarded as 0 in wavelength dependence of an absorption spectrum of the dye. Next, by use of d thus obtained, $n_d$ and $k_d$ in the predetermined wavelength $\lambda$ (the recording/reading light wavelength) are obtained.

Hereinafter, description will be given of a process of obtaining an optical constant of a Ni-containing azo dye (dye A2) (of which molar absorption coefficient in a chloroform solution is 55000) which has the following structural formula, as a concrete example.

First, 0.8 g of an octafluoropentanol (OFP) solution containing 0.75 wt % of the dye A2 is dropped in the vicinity of a center of a polycarbonate substrate which has a disk shape with a diameter of 120 mm and has a flat surface including no guide groove. Thereafter, the substrate is rotated and maintained for 3 seconds while increasing the number of revolutions to 4200 rpm in 20 seconds. Thus, the OFP solution containing the dye A2 is extended. Thereafter, the substrate is kept at 100° C. for 1 hour to volatilize OFP that is a solvent. Thus, a thin film of the dye A2 is formed.

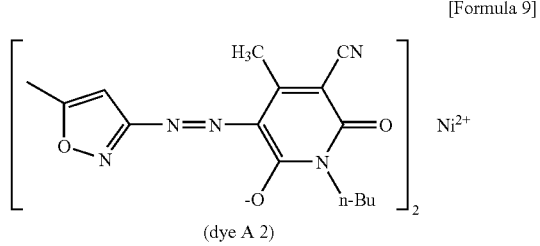

(dye A 2)

Figure 20A:
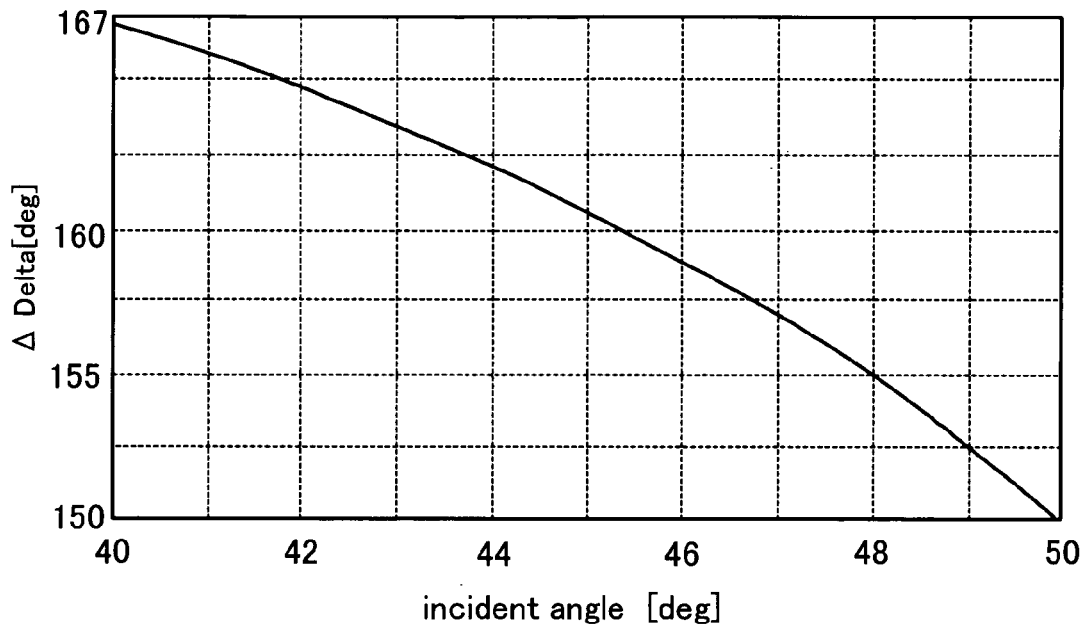
FIG. 20 are graphs showing an example of ellipsometry measurement data on dye A2.
Figure 20B:
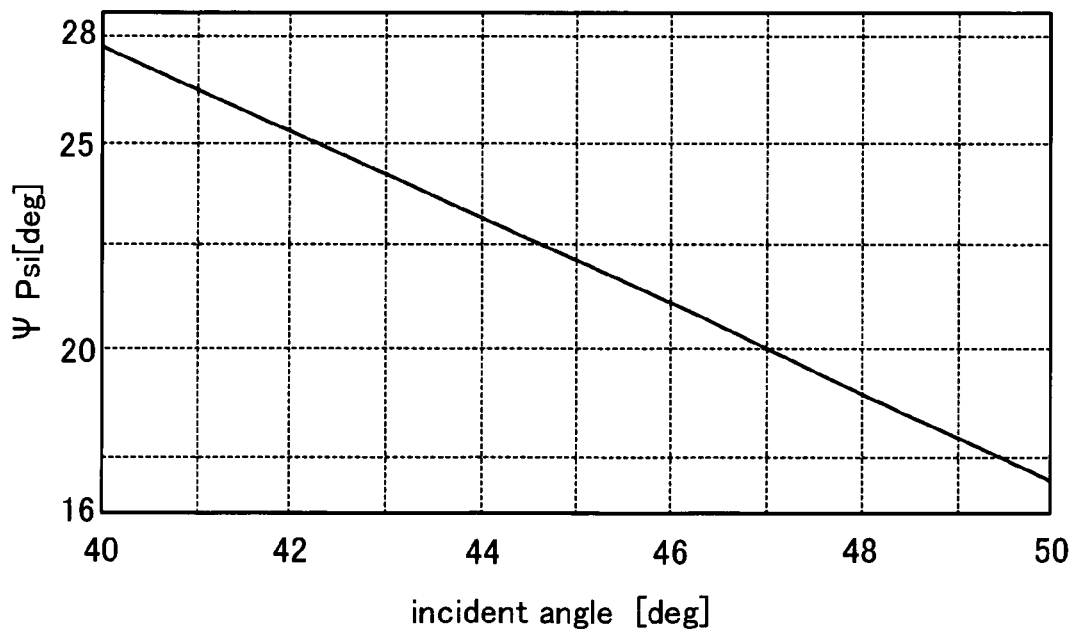
Figure 21:
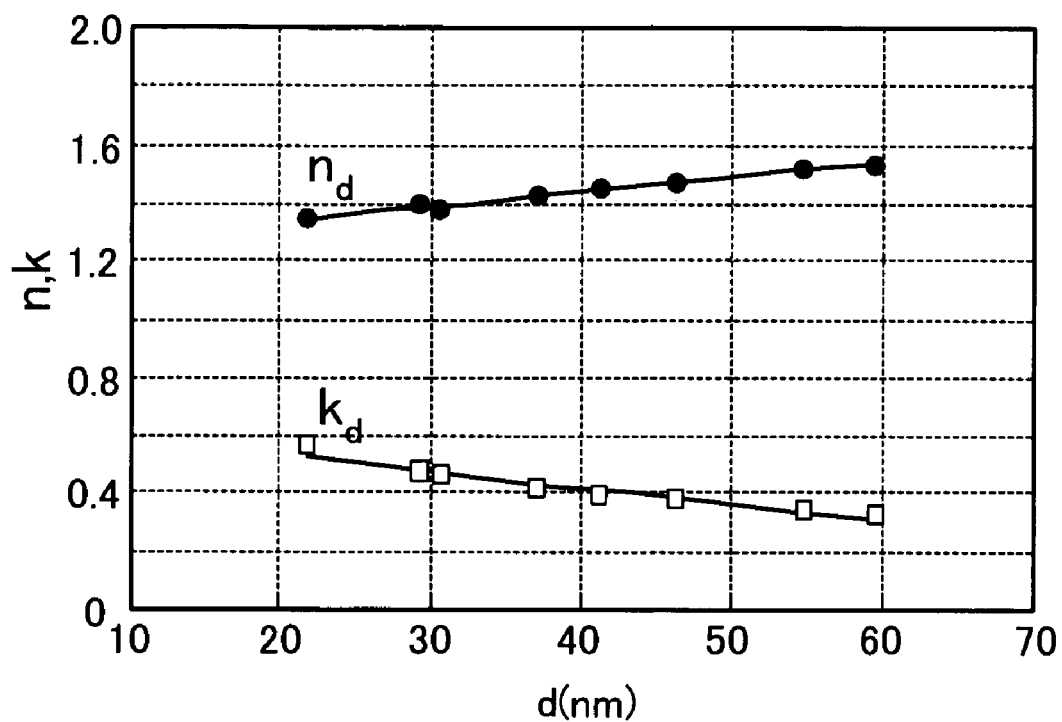
FIG. 21 is a graph showing d dependence by obtaining $n_d$ and $k_d$ with a film thickness d as a given initial value based on $\Delta$ and $\Psi$ which are obtained by ellipsometry measurement of dye A2.

By use of ellipsometer "MEL-30S" made by Nippon Bunko, the incident angle dependence of $\Psi$ and $\Delta$ in the wavelength 405 nm are measured in the range of 40° to 50°. Here, FIG. 20 are graphs showing an example of ellipsometry measurement data on the dye A2. For the measured values, the least squares method is applied to the equation (23) described above to obtain $n_d$, $k_d$ and d. Here, if the given d is given as an initial condition to the case of applying the least squares method, a plurality of combination candidates of $n_d$, $k_d$ and d are obtained. FIG. 21 shows dependence of $n_d$ and $k_d$ on d, which is plotted as a graph. Here, FIG. 21 is a graph showing d dependence of $n_d$ and $k_d$ obtained by using the thickness d as the given initial value based on $\Delta$ and $\Psi$ obtained by the ellipsometry measurement for the dye A2. Specifically, with reference to FIG. 21, when d is given as a variable parameter, $n_d$ and $k_d$ can be obtained by the least squares method, which give the best approximate values that can explain the incident angle dependence of $r_s$ and $r_p$ in the equation (23).

Figure 22:
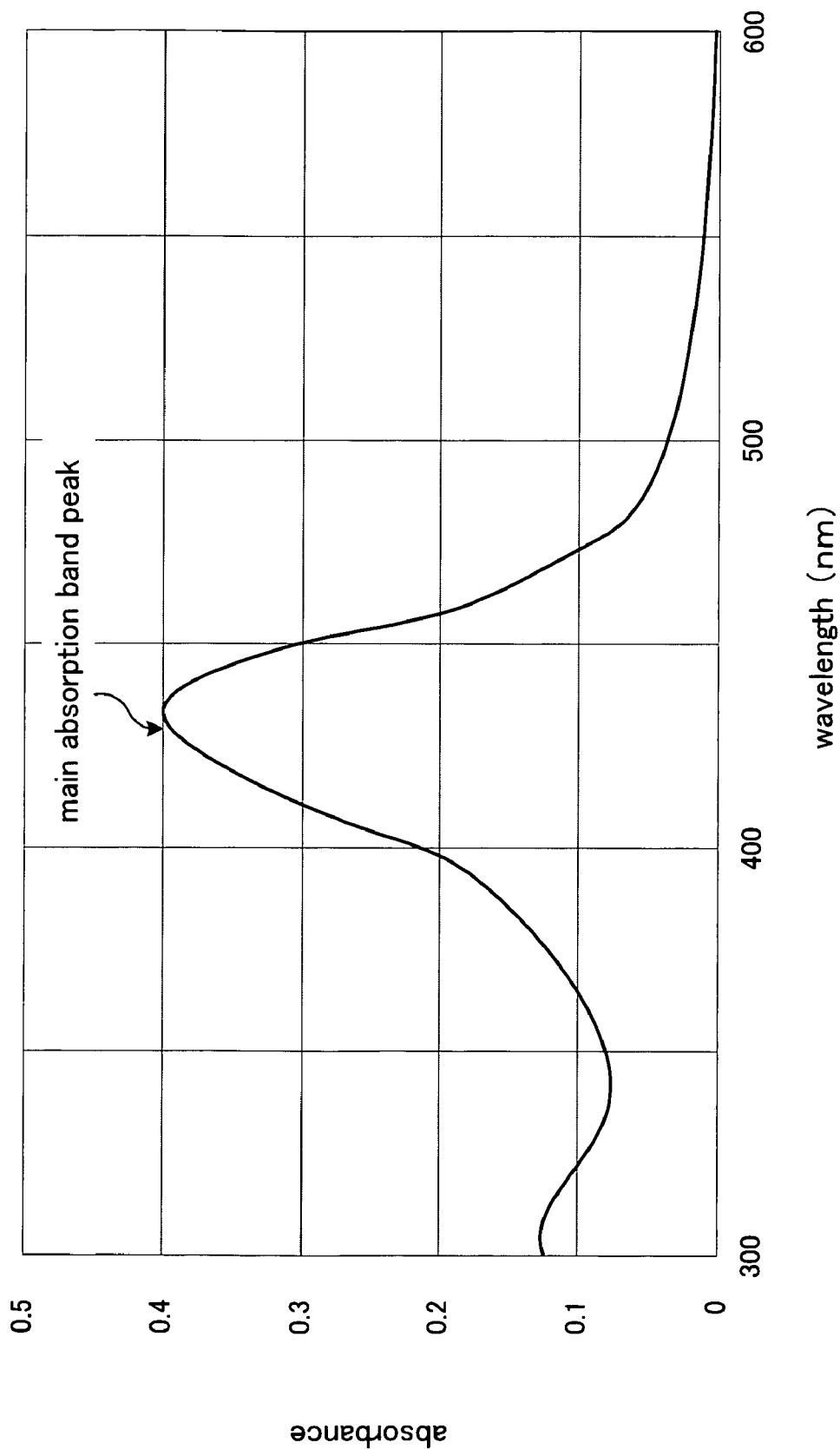
FIG. 22 is a graph showing an example of an absorption spectrum of dye A2.

Next, in order to obtain the thickness d, first, the absorption spectrum of the dye is measured by use of a spectrometer "U3300" made by Hitachi, Ltd. Here, FIG. 22 is a graph showing an example of the absorption spectrum of the dye A2. With reference to FIG. 22, it is understood that there is no absorption when the wavelength is 700 nm. By use of the wavelength=700 nm, similarly, the incident angle dependence of $\Psi$ and $\Delta$ is measured in the range of 40° to 50°, and the least squares method is applied by adding the condition of $k_d=0$ in the equation (23). As a result, n and d=28.5 nm are uniquely obtained. By applying this value of d to FIG. 21, the refractive index $n_d=1.37$ and the extinction coefficient $k_d=0.48$ in the wavelength of 405 nm are obtained.

Figure 23:
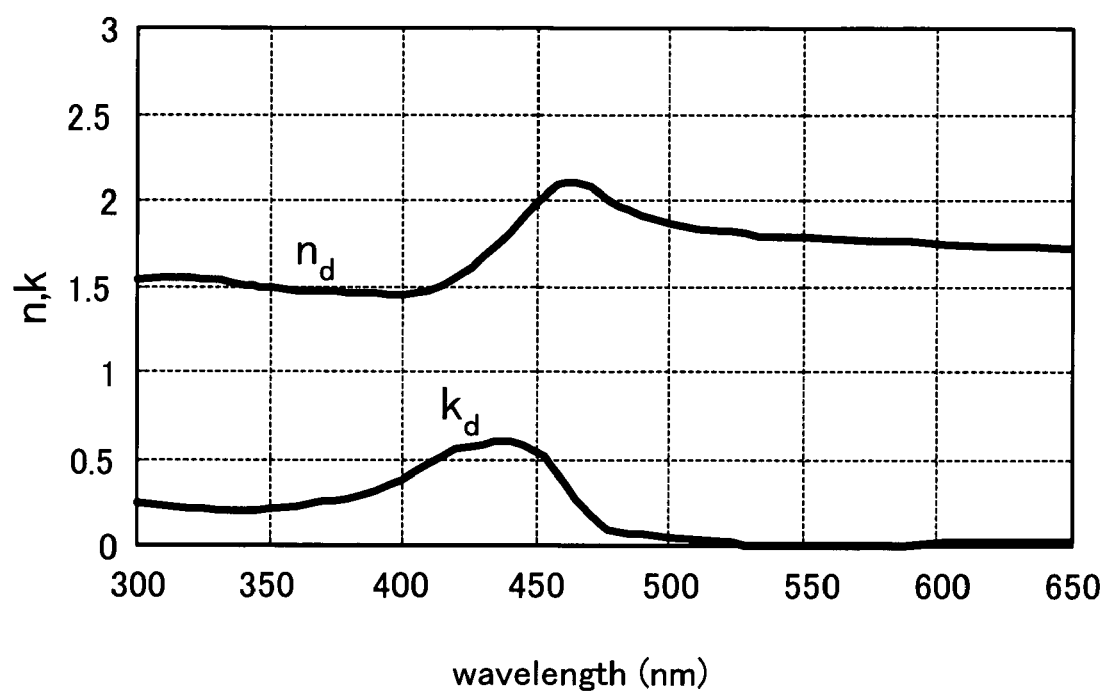
FIG. 23 shows an actual measurement example of wavelength dependence of a complex refractive index $n_d^*$ in a main absorption band with anomalous dispersion.

By repeating the same procedures for the respective wavelengths in the absorption band, wavelength dependence of $n_d^*$ in the main absorption band of the dye A2 is obtained. Here, FIG. 23 shows an actual measurement example of the wavelength dependence of the complex refractive index $n_d^*$ in a main absorption band with anomalous dispersion. With reference to FIG. 23, it is confirmed also by use of this measurement method that there exist Kramers-Kronig anomalous dispersion relations for a relatively gradual absorption band as shown in FIG. 19. In the following examples and comparative examples, values of $n_d^*$ for respective dyes are obtained by use of the same procedures.

(About Recording Method and Optical Recording Device According to Present Invention)

The present invention also provides an optical recording method for an optical recording medium having a structure in which at least a layer having a light reflection function, a recording layer containing, as a main component, a dye having a light absorption function with respect to a recording/reading light wavelength in an unrecording state, and a cover layer are sequentially formed on a substrate having a guide groove formed therein. The method is characterized in that the guide groove part 25 on a far side from a plane of incidence of the recording/reading light beam 27 on the cover layer is set as a recording groove part, and reflected light intensity of a recorded pit portion formed in the recording groove part is set to be higher than the reflected light intensity at the time of unrecording in the recording groove part by making the recording/reading light incident from the cover layer side. This recording method is a recording method for a so-called surface incidence recording medium and is suitable for, particularly, high-density recording using a violet-blue laser diode having a wavelength from 350 to 450 nm as a recording/reading light source and using a focused light beam having NA as high as from 0.6 to 1.

As a basic structure of the recording device used in the present invention, the same one as that of the conventional optical recording device can be used. For example, as the focus servo or tracking servo system, the heretofore known system can be applied. It is only necessary that the cover-layer inter-groove part be irradiated by a spot at a focus plane of the focused light beam, and the cover-layer inter-groove part is tracked by the tracking servo. To be more specific, the method utilizing the push-pull signal as described with reference to FIG. 7 is preferable, and the push-pull signal is normally utilized.

In the present invention, as described above, detected is the "(local) reflected light intensity change caused by the phase difference" considering the two-dimensional interference of the reflected light having different phases between the recording pit and its peripheral part. Thus, the diameter in the recording groove part transverse direction of the spot of the focused recording/reading light beam 27 is normally set larger than the width of the recording pit. The width of the recording pit in the present invention is limited by the groove width of the recording groove part. Thus, the recording beam spot diameter D (defined by $1/e^2$ intensity of a Gaussian beam) is preferably larger than the recording groove width (the width of the cover-layer inter-groove part) Wg. However, if D is too large, crosstalk with the adjacent recording groove part is increased. Thus, normally, Wg<D≦2TP (TP is the track pitch of the recording groove) is preferable, and D≦1.5TP is more preferable.

In the case where recording is performed in the cover-layer inter-groove part, the focused recording/reading light beam 27 causes the recording layer main component dye to increase the temperature and generate heat. Thus, alteration (expansion, decomposition, ablation, melting and the like) occurs. In the case where mark length modulation recording is performed, power of the recording/reading light beam (recording power) is modulated to be strong or weak according to a mark length. Note that the mark length modulation method particularly has no limitations. In the method, EFM modulation (CD), EFM+modulation (DVD), 1-7PP modulation (Blu-Ray) and the like can be applied, which are usually used Run-Length-Limited codes.

However, in the recording/reading system based on the H to L polarity signal, for L to H recording, the polarity of the recording data signal is sometimes previously inverted so as to invert the recording signal polarity between the mark and space. In such a manner, the signal after recording can be set apparently the same as the H to L polarity signal.

Usually, the recording power is set to a high level Pw in the mark part and is set to a low level Ps between marks (in a space). Ps/Pw is normally set to 0.5 or less. Ps is power such as to cause no alteration in the recording layer in one pass of irradiation, and is utilized for preheating the recording layer before using Pw. The well-known recording pulse strategies are appropriately used also in the recording method and the recording device according to the present invention. For example, it is possible to use recording strategies such as intermittent irradiation in a shorter irradiation time of the recording power Pw corresponding to the recording mark part, modulation into a plurality of power levels, and irradiation of a power level Pb much lower than Ps for a fixed period of time until the power level is shifted to Ps after irradiation of Pw.

EXAMPLE

The embodiment will be described more in detail below based on examples. Note that the embodiment is not limited to the examples.

(Methods of Preparing and Evaluating Sample)

A reflective layer having a thickness of about 65 nm was formed by sputtering an alloy target of $Ag_{97.4}Nd_{0.7}Cu_{0.9}Au_{1.0}$, $Ag_{98.1}Nd_{1.0}Cu_{0.9}$ or $Ag_{99.45}Bi_{0.35}Nd_{0.2}$, of which compositions were all by atomic %, on a step substrate which was made of polycarbonate resin and had a guide groove formed therein under conditions that a track pitch was 0.32 μm, a groove width was about from 0.18 μm to 0.2 μm and a groove depth was about from 25 nm to 65 nm (a refractive index in a wavelength of 405 nm was 1.58. Hereinafter, the refractive index was similarly the value in the wavelength of 405 nm.). As to a complex refractive index, a refractive index in a real part was 0.09, and an extinction coefficient in an imaginary part was 2. As to recoding characteristics, there was no significant difference between the both reflective layers. Moreover, the main component dye was formed by use of a spin-coating method after being diluted with octafluoropentanol (OFP).

Conditions of the spin-coating method are as follows. Specifically, a 1.5 g of solution obtained by dissolving each dye, if not otherwise specified, at a concentration of from 0.6 wt % to 0.8 wt % in OFP was dispensed to the vicinity of the center of a disk to form a ring shape. Thereafter, the disk was rotated for 7 seconds at 1200 rpm to spread the dye. Subsequently, the disk was rotated for 3 seconds at 9200 rpm to sweep off the dye. Note that, after coating, the disk was kept in an environment of 100° C. for 1 hour to vaporize and remove OFP that was the solvent.

Thereafter, by use of the sputtering method, an interface layer of $ZnS:SiO_2$ (refractive index of about 2.3) was formed to have a thickness of about from 20 to 30 nm. Thereafter, a transparent cover layer was attached thereto. Specifically, the cover layer was formed of a sheet made of polycarbonate resin (refractive index of 1.58) having a thickness of 75 μm and a pressure-sensitive adhesive layer (refractive index of 1.5) having a thickness of 25 μm, and had a total thickness of 100 μm. The cover layer had transmittance of about 90%. Moreover, in this configuration, in the case where the thickness of the recording layer was set to 0, reflectivity of a disk planar part (mirror surface part) was about 60%. In measurement, by inserting a polycarbonate resin substrate having no dye applied in a reference optical path, an influence of absorption of the substrate in the ultraviolet range was eliminated.

Moreover, the groove depth and the groove width in the substrate were measured by use of an atomic force microscope (AFM: NanoScopeIIIa made by Digital Instruments Co., Ltd.).

An absorption spectrum in the state where only the recording layer was applied on the polycarbonate resin substrate was measured by use of a spectrometer (U3300 made by Hitachi, Ltd.). Moreover, measurement of a weight reduction start temperature by TG-DTA was performed in the following manner. Specifically, a dye powder of from 3 mg to 4 mg was evenly ground in a mortar, and the powder sample was heated from 30° C. to 600° C. at a heat-up rate of 10° C./min by using a TG-DTA apparatus (TG/TDA6200) made by Seiko Instruments Inc. Nitrogen was used as flow gas. An optical density (OD) value and a molar absorption light coefficient (∈) were measured by dissolving the dye in chloroform (dye concentration 5 mg/l) and similarly using the spectrometer. Those were values in the wavelength showing the strongest absorption (peak) in the main absorption band.

The recording/reading of the disk was evaluated by use of ODU 1000 tester made by Pulsetech Corp. which had an optical system having a recording/reading light wavelength λ of 406 nm, NA (numerical aperture) of 0.85 and a focused beam spot diameter of about 0.42 μm (point with $1/e^2$ intensity). The recording and reading were performed in the coverlayer inter-groove part 25 (the substrate groove part) in FIGS. 2 and 4.

Assuming that a linear velocity of 5.3 m/s (recording condition 1) or 4.9 m/s (recording condition 2) was 1-time velocity, the disk was rotated at 1-time velocity or 2-times velocity. A higher linear density was obtained under recording condition 2 than recording condition 1.

The recording power was changed in a range of from 5 mW to 9 mW, and reading was performed only at 1-time velocity. The reading light power was set to 0.35 mW.

For recording, a mark length modulation signal (17PP) was used, which was subjected to (1, 7)RLL-NRZI modulation. A reference clock period T was set to 15.15 nsec. (channel clock frequency of 66 MHz) at 1-time velocity and to 7.58 nsec. (channel clock frequency of 132 MHz) at 2-times velocity.

Jitter was measured in the following manner. Specifically, a recording signal was binarized after being subjected to waveform equalization by a limit equalizer. Thereafter, a distribution σ of time differences between a rise edge and a fall edge of the binarized signal and a rise edge of a channel clock signal was measured by use of a time interval analyzer. Thus, assuming that a channel clock period was T, jitter was measured by σ/T (Data to Clock Jitter). The measurement conditions described above approximately conformed to the measurement conditions in the Blu-Ray disk (nonpatent documents 7 and 9).

The reflected light intensity in reading was proportional to a voltage output of a reading detector, and the reflectivity was set to one normalized by the existing reflectivity $R_{ref}$ as described above. By measuring $R_H$ and $R_L$ described above, modulation m was calculated by the following equation.

$$m=(R_H-R_L)/R_H$$

Figure 11:
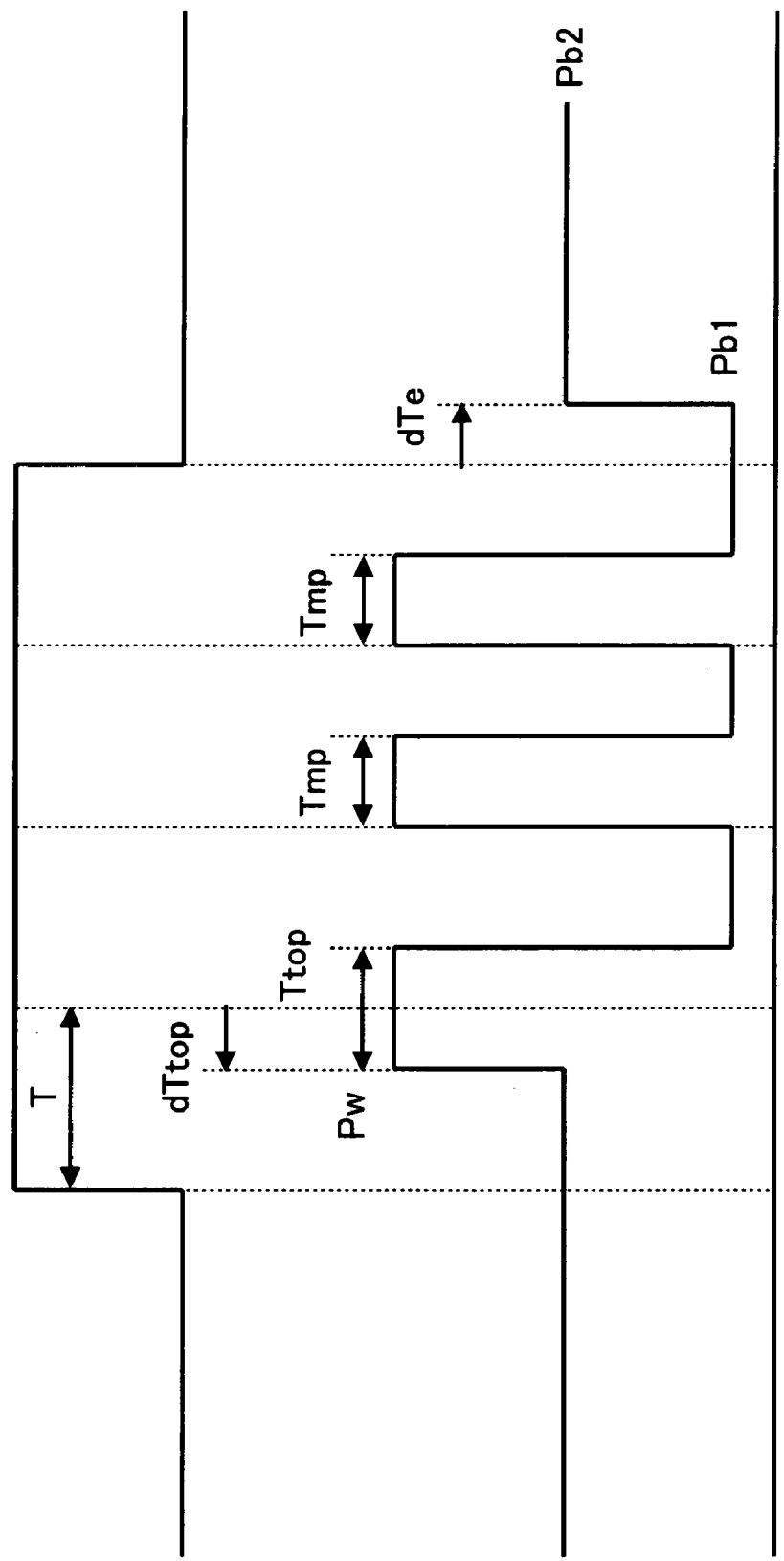
FIG. 11 is a diagram showing a divided recording pulse used for recording in examples 1 and 2.

In recording, the divided recording pulse shown in FIG. 11 was used. Specifically, nT (n was a natural number of 2 to 8, and T was the channel clock period) mark length was recorded by n−1 recording pulse (recording power Pw). Pw was the recording power, and Pb1 and Pb2 were bias power. A delay of a top recording pulse (dTtop, a value where the direction of the arrow in FIG. 11 was positive), a top pulse length (Ttop), an intermediate pulse length (Tmp) and delay time of irradiation time of the bias power Pb1 at the end (dTe, a value where the direction of the arrow in FIG. 11 was negative) were set to be time length parameters. Tmp was repeated with the clock period T. Note that different parameters were used between 2T and 3T mark lengths, and 4T and 9T mark lengths. Moreover, when Pw was set to be variable, Pw was changed by fixing a Pb2/Pw ratio.

The recording signal was evaluated in the following manner. Specifically, first, it was confirmed that L to H recording by the phase shift was realized, the polarity of the push-pull signal was not inverted, and thus $0<|\Phi a|\Phi b|<\pi$ was established. Thereafter, the magnitude of the modulation and a distorted state of the waveform were read from the recording/reading signal. Thus, it was roughly observed whether or not signal quality of L to H recording was good. The minimum requirements were to obtain approximately 40% or more of modulation and to obtain L to H polarity signals in all mark lengths.

As to the jitter value, normally, evaluation criteria sequentially get severer in the order of 1-time velocity recording under recording condition 1, 2-times velocity recording under recording condition 1, 1-time velocity recording under recording condition 2 and 2-times velocity recording under recording condition 2. In the above order of the recording conditions, the jitter value gets worse. The jitter value is said to have a retrievable level after error correction if the value is lower than approximately about 10%. Thus, the case where the jitter value was at least lowered to about 10% in 1-time velocity recording under recording condition 1 in addition to the above minimum requirements was set to be the example of this embodiment.

Furthermore, recording power dependence of the jitter value was measured, and the recording power Pwo to be the minimum jitter value was set to be optimum recording power. Pwo is, normally, maximized in 2-times velocity recording under recording condition 1, and tends to have a difference in characteristics of the recording layer dye. As described above, the preferable aspect in the L to H recording was clarified.

Example 1

FIG. 12 shows an absorption spectrum in a state where only the auriferous azo dye (dye A) used as the material of the recording layer was applied. Note that the chemical formula of the metal-azo dye (dye A) is represented below.

[Formula 10]

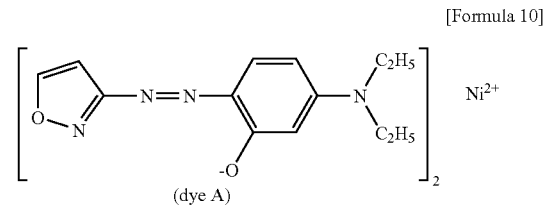

(dye A)

As is clear from FIG. 12, the metal-azo dye (dye A) has the main absorption band on the long wavelength side having the recording/reading light wavelength λ of 405 nm, and the peak thereof is around 510 nm. Thus, recording and reading were performed on the short wavelength side $\lambda_s$ of the absorption spectrum.

The complex refractive index of the recording layer in the thin film in unrecorded state was $n_d=1.38$ and $k_d=0.15$. Moreover, in the recording layer after the solvent was dried and vaporized, dye A was regarded as 100% except for a very minute amount of residual solvent.

Assuming that the recording medium described above was disk 1, disks 2 and 3 were prepared, which had exactly the same configuration as that of the disk 1 except that the groove depth of the substrate was set to 50 nm and 25 nm, respectively. These disks 1 to 3 had a mirror surface region having no guide groove in addition to a recording region formed of the guide groove described above.

On the disks 1 to 3, a single signal was recorded by laser beam irradiation along a guide groove part which was far when viewed from the plane of incidence of the recording/reading light beam in the recording region. Specifically, the tone signal was formed of a mark (recorded pit portion) having a length of 0.64 μm and a space (unrecorded part between marks). Next, reflectivities of the mark and the space were measured. Moreover, reflected light intensity of the unrecorded mirror surface region was measured by being converted into reflectivity. The respective reflectivities are shown in Table 2. Note that the reflectivity of the mirror surface region corresponds to R0 in FIG. 6 described above.

TABLE 2

|  | Groove Depth (nm) | Space (Unrecorded Part Reflectivity %) | Mark (Recorded Part Reflectivity %) | Mirror Surface Part Reflectivity % |
|---|---|---|---|---|
| Disk 1 | 65 | 9 | 35 | 53 |
| Disk 2 | 50 | 17 | 41 | 53 |
| Disk 3 | 25 | 40 | 42 | 52 |

In Table 2, in the all cases, it was confirmed that the reflectivity of the mark part was higher than that of the space part in the unrecorded state, and L to H recording was performed. The reflectivity of the mirror surface region in the unrecorded state was approximately the same in the disks 1 to 3. Meanwhile, the reflectivity of the space part in the recording groove part was lower than that of the mirror surface region in the all cases. Moreover, the deeper the groove was, the lower the reflectivity was. Moreover, the reflectivity of the mark part in the recording groove part was lower than that of the mirror surface region in the all cases, but was higher than that of the space part. The reflectivity of the mark part was approximated to the reflectivity of the mirror surface region by recording. For example, the disk 1 having the largest groove depth had the lowest reflectivity of the unrecorded part and had a large difference in reflectivity between the unrecorded part and the recorded part. On the contrary, in the disk 3 having the shallowest groove, the reflectivity of the unrecorded part was approximated to that of the mirror surface region, and a difference in reflectivity between the unrecorded part and the recorded part was very small.

The above result suggests the following. Specifically, in the recorded region, the reflected light intensity is lowered by a phase difference in the reflected light from the groove part and the inter-groove part. In the scope of this example, the deeper the groove is, the larger the phase difference becomes. If the recording pit is formed here, a change in the optical characteristics of the recording layer is caused by alteration. Accordingly, the phase difference in the reflected light from the groove part and the inter-groove part is reduced. This suggests that $\Delta\Phi > 0$ is established in the equation (9). Specifically, it is considered that the reflected light intensity is approximated to that in the shallow groove state. Moreover, it is conceivable that the reflected light intensity is changed on the path γ in FIG. 6.

FIG. 13 are transmission electron micrographs of a cross section of the disk 2 used in example 1. FIG. 13A shows a picture of the cross section of the disk 2 in the unrecorded state, which is taken by a transmission electron microscope (TEM), and FIG. 13B shows a picture of the cross section of the disk 2 in the recorded state, which is taken by the transmission electron microscope (TEM). The cross-section sample was prepared as described below. When an adhesive tape was attached to the cover layer and pulled, a partially stripped plane on the interface between the interface layer and the cover layer was exposed. Thereafter, W (tungsten) was deposited on the stripped surface for protection. Furthermore, sputtering was performed by high-speed ion irradiation in vacuum from above the stripped plane covered with W, thereby forming a hole. The disk having the cross section formed on the side of the hole was observed by the transmission electron microscope.

In the cross-sectional images shown in FIGS. 13A and 13B, since the recording layer is an organic material and allows transmission of electrons, the layer looks white. It is found out that the thickness $d_L$ of the recording layer is approximately 0 in the inter-recording-groove part (the cover-layer on-groove part), and the thickness $d_G$ of the recording layer is about 30 nm in the recording groove part. Moreover, the groove depth $d_{GL}$ specified by the step of the reflection reference plane is about 55 nm, which is approximately the same as that measured on the substrate surface by AFM. It is found out that, in the recorded pit portion, there is deformation of the recording layer bulging toward the cover layer from the shape of the interface layer (in other words, in FIG. 4, $d_{bmp} < 0$). Furthermore, the recording layer after recording looks more white than the recording layer in unrecorded state. Thus, it is considered that a cavity (that is, $n_d' = 1$) is formed. Moreover, it is also found out that the recording pit is confined in the groove without protruding from the recording groove part.

Note that a height of the cavity after recording from the reflection reference plane is about 80 nm, and $d_{bmp}$ is 50 nm. Moreover, there is no alteration or deformation found in the interface between the reflective layer and the substrate. Thus, it can be also confirmed that $d_{pit} \approx d_{mix} \approx 0$ is established. Now, by use of the values described above and $n_d = 1.38$, $n_c = 1.5$, $\delta n_d = 1.38 - 1 = 0.38$ (note that the refractive index in the cavity is set to 1), $\lambda = 406$ nm, $d_G \approx 30$ nm, $d_L \approx 0$ nm and $d_{GL} \approx 55$ nm, values of the respective phases in this embodiment are estimated as described below.

$\Phi b_2$ in the equation (7) is calculated as below.

$$\Phi b_2 = (4\pi/406) \times (0.12 \times 30 - 1.5 \times 55) \approx -0.78\pi$$

Therefore, $|\Phi b_2| < \pi$ is established.

$\Delta\Phi$ in the equation (9) is calculated as below.

$$\Delta\Phi = (4\pi/406) \times (0.12 \times 50 + 0.38 \times 80) \approx 0.36\pi$$

Thus, the assumption that $\Delta\Phi$ is normally set to $(\pi/2)$ or less was satisfied.

Moreover, $\Phi a_2$ in the equation (8) is calculated as below.

$$\Phi a_2 \approx (-0.78 + 0.36)\pi = -0.42\pi$$

Thus, it can be confirmed that $|\Phi b_2| > |\Phi a_2|$ is also satisfied.

As described above, the L to H recording cannot be performed with the shallow groove. Thus, it is possible to sum up that the L to H signal amplitude in this recording medium is mainly caused by the phase shift ($\Delta\Phi > 0$) in the recorded pit portion. To be more specific, it is found out that the phase shift is dependent on lowering of the refractive index ($\delta n_d > 0$) which involves cavity formation in the recorded pit portion and leads to the deformation of the recording layer bulging toward the cover layer in the recorded pit portion. Moreover, since the polarity of the push-pull signal is not changed, it can be said that the L to H recording by using the phase shift of $0 < |\Phi a| < |\Phi b| < \pi$ is performed.

Next, more specific recording characteristics of the disk 2 were evaluated by recording and reading of a random signal subjected to the mark length modulation recording.

Figure 14A:
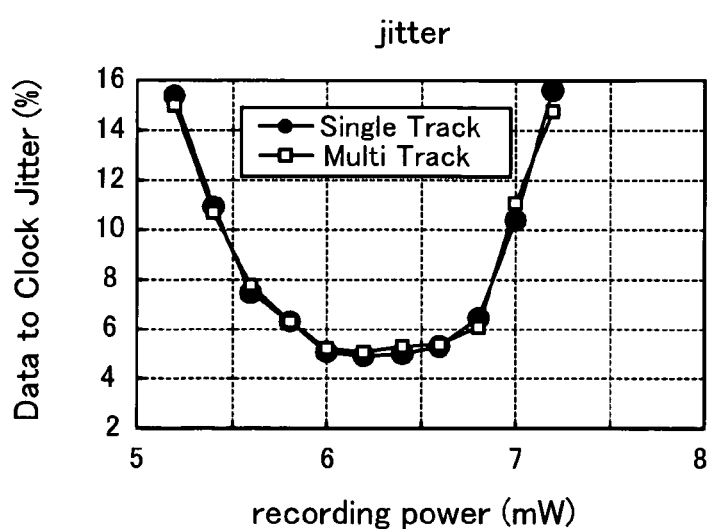
FIG. 14 are graphs showing recording characteristics at the time of 1-time velocity recording of disk 2 under recording condition 1.
Figure 14B:
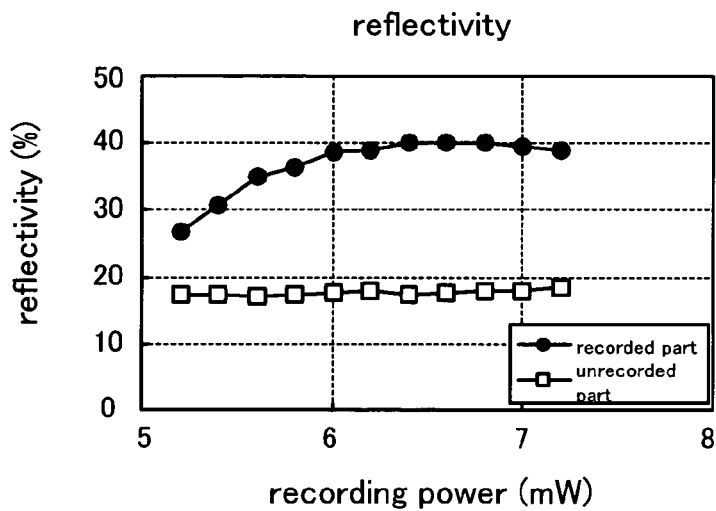
Figure 14C:
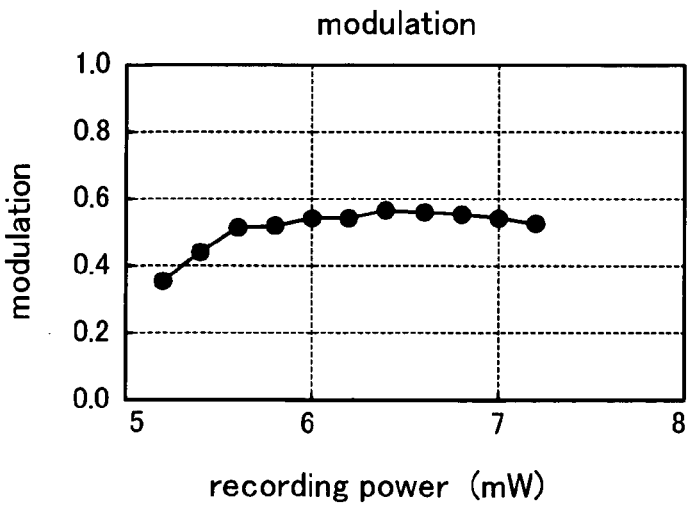
Figure 15A:
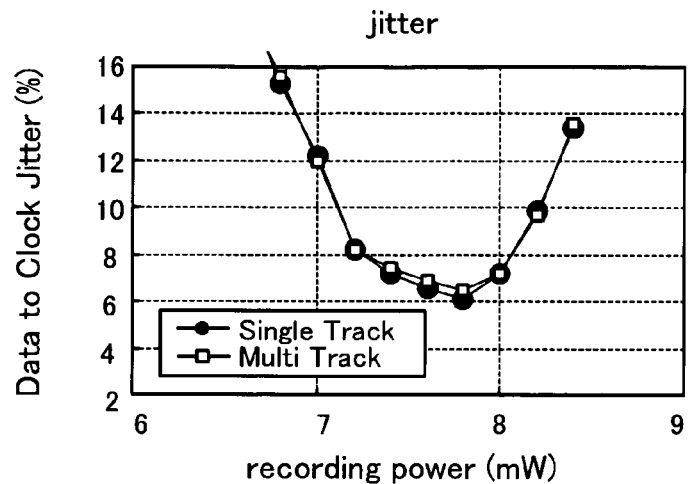
FIG. 15 are graphs showing recording characteristics at the time of 2-times velocity recording of disk 2.
Figure 15B:
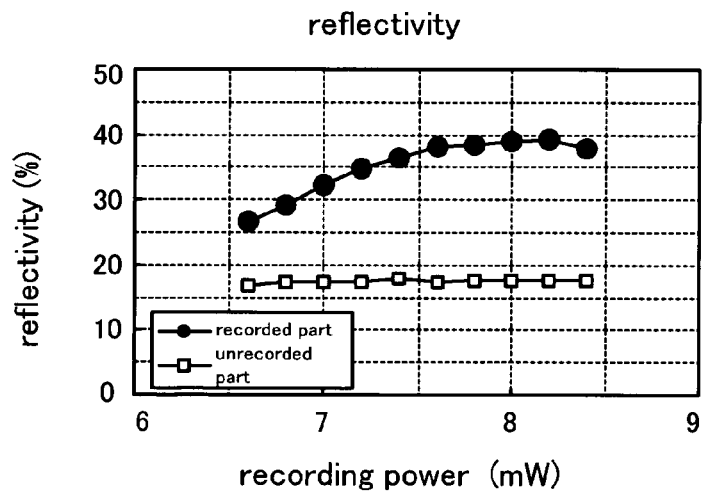
Figure 15C:
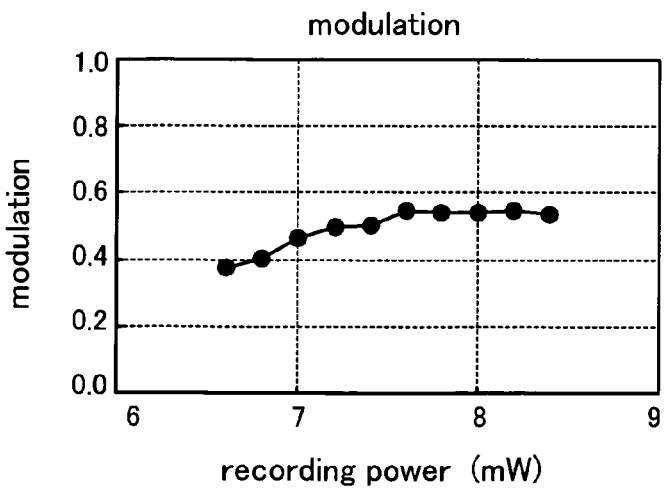

FIG. 14 are graphs showing the recording characteristics of the disk 2 at the time of 1-time velocity recording under recording condition 1. FIG. 15 are graphs showing the recording characteristics of the disk 2 at the time of 2-times velocity recording. FIGS. 14A and 15A, 14B and 15B, and 14C and 15C show recording power dependence of jitter, reflectivity and modulation in the recorded part and the unrecorded part, respectively. The parameters of the divided recording pulse used for recording are as shown in Table 3 at 1-time velocity, and are as shown in Table 4 at 2-times velocity. At 1-time velocity shown in Table 3, Pb1=0.3 mW and Pb2/Pw=0.35. At 2-times velocity shown in Table 4, Pb1=0.3 mW and Pb2/Pw=0.45. Note that, in both cases, Pr (reading light power)=0.35 mW.

TABLE 3

|  | dT to p | T to p | Tmp | dTe |
|---|---|---|---|---|
| 2 T | 5/16 T | 16/16 T | — | −9/16 T |
| 3 T | 6/16 T | 16/16 T | 10/16 T | −10/16 T |
| 4 T~9 T | 7/16 T | 16/16 T | 10/16 T | −10/16 T |

TABLE 4

|  | dT to p | T to p | Tmp | dTe |
|---|---|---|---|---|
| 2 T | 10/16 T | 22/16 T | — | −14/16 T |
| 3 T | 11/16 T | 22/16 T | 12/16 T | −16/16 T |
| 4 T~9 T | 12/16 T | 22/16 T | 12/16 T | −16/16 T |

FIGS. 14 and 15 show that good jitter and sufficient difference of reflectivity, that is, modulation in the unrecorded part and the recorded part can be obtained under the respective recording conditions of 1-time velocity recording and 2-times velocity recording. Particularly, there is a small difference between jitter in Single Track where recording is performed only in 1 track and jitter in Multi Track where recording is continuously performed for 5 tracks and the track in the center is measured. This means that crosstalk is very excellent.

Example 2

In the configuration of the disk 2 in example 1, the following points were changed.

Specifically, as the material of the recording layer, a carbostyryl dye (dye B) (note that Ph was a phenyl group.) having the following structure and an metal-azo dye (dye C) were mixed at a ratio of 70:30 wt. %. Thereafter, by use of this mixture as a main component dye, 0.6 wt. % was mixed in octafluoropentanol, and coating was performed. Thus, the disk 4 having the same configuration as that of the disk 2 in the other conditions was prepared. $d_G$ was about 30 nm and $d_L$ was approximately 0.

In the recording layer after the solvent was dried and vaporized, mixture of carbostyryl dye (dye B) and the metal-azo dye (dye C) is regarded as 100% except for a very minute amount of residual solvent.

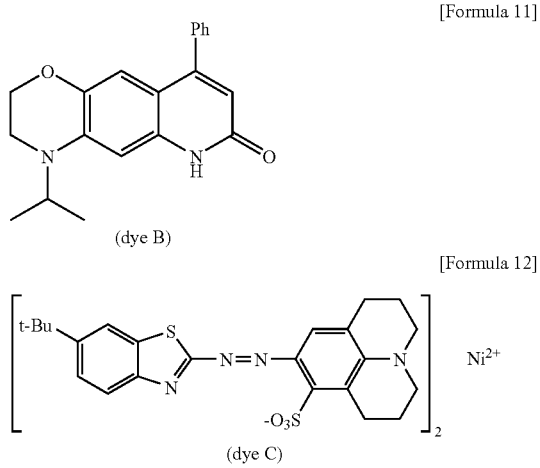

Figure 16:
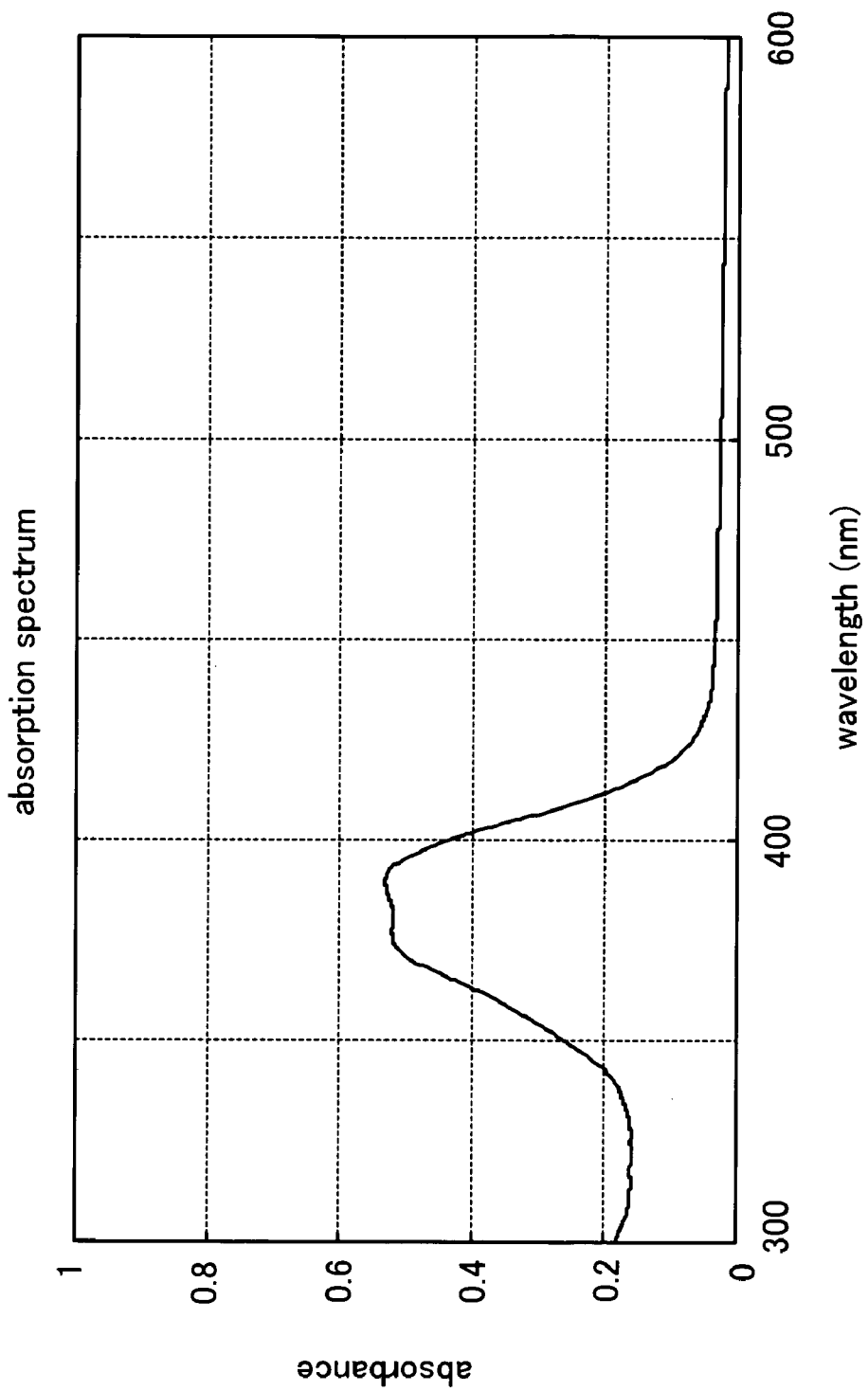
FIG. 16 shows an absorption spectrum in a state where only a carbostyryl dye (dye B) is applied.

FIG. 16 shows an absorption spectrum in a state where only the carbostyryl dye (dye B) was coated. The complex refractive index of the recording layer was $n_d$=2.18 and $k_d$=0.34. The main absorption band was in the wavelength range of 350 nm to 400 nm, and the peak was around 390 nm. In a state where only the metal-azo dye C was coated, the refractive index was $n_d$=1.50 and $k_d$=0.12, and the light absorption function was weak. The peak of the main absorption band was around 710 nm. Moreover, when only dye C was coated, recording sensitivity was poor and recording was hardly performed at 8 mW or less. By mainly utilizing absorption on the long wavelength side of the carbostyryl dye B in the recording layer, recording and reading were performed. Consequently, L to H recording with increased reflectivity in the recorded pit portion was performed. As in the case of example 1, when the groove depth was reduced, the signal amplitude was lowered. Moreover, the polarity of the push-pull signal was not changed. Thus, L to H recording by using the phase shift of $0<|\Phi a|<|\Phi b|<\pi$ and $\Delta\Phi>0$ was performed.

For the disk 4, recording characteristics were also evaluated by recording and reading of a random signal as in the case of example 1. As a result, the recording signal was L to H, and the push-pull signal was not inverted between before and after recording.

Figure 17A:
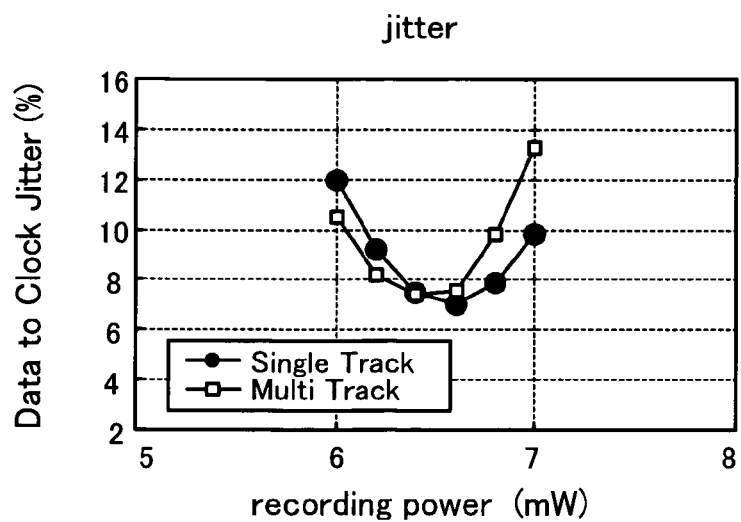
FIG. 17 are graphs showing recording power dependence of jitter, reflectivity in a recorded part and an unrecorded part and modulation at the time of 1-time velocity recording of disk 4 under recording condition 1.
Figure 17B:
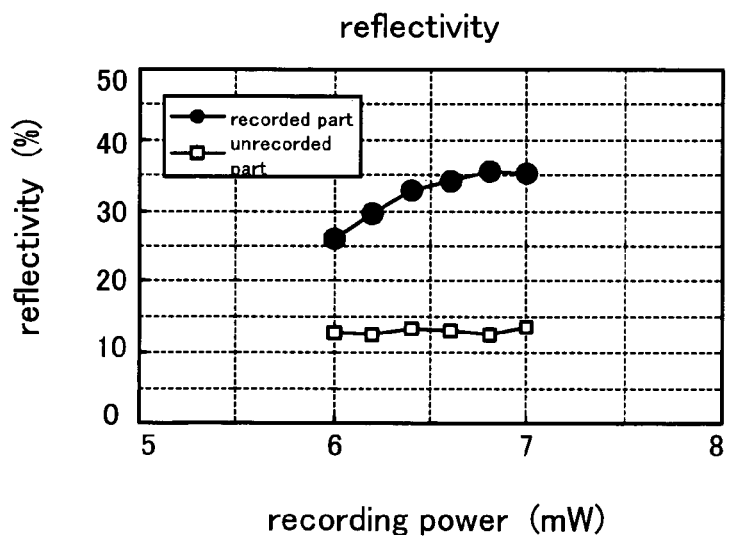
Figure 17C:
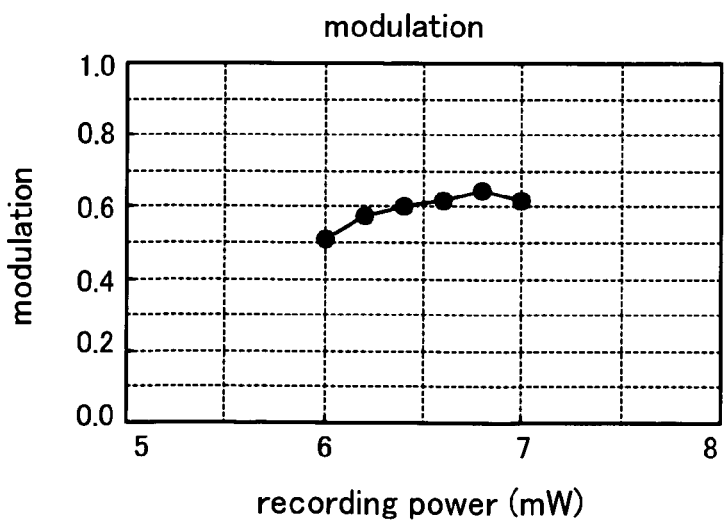

FIG. 17 are graphs showing recording power dependence of jitter (FIG. 17A), reflectivity in the recorded part and the unrecorded part (FIG. 17B) and modulation (FIG. 17C) at the time of 1-time velocity recording of disk 4 under recording condition 1. The parameters of the divided recording pulse used for recording are as shown in Table 5. Pb1=0.3 mW, Pb2/Pw=0.48 and Pr=0.35 mW.

TABLE 5

|  | dT to p | T to p | Tmp | dTe |
|---|---|---|---|---|
| 2 T | 10/16 T | 22/16 T | — | −14/16 T |
| 3 T | 11/16 T | 22/16 T | 12/16 T | −16/16 T |
| 4 T~9 T | 12/16 T | 22/16 T | 12/16 T | −16/16 T |

As in the case of example 1, excellent recording characteristics were obtained. Note that, even when only dye B was used, uniform L to H recording could be performed regardless of the mark length. However, jitter was worse than that when the mixture film was used. Consequently, it is considered that the dye B having the main absorption band on the short wavelength side of the recording/reading light wavelength λ=405 nm has the absorption function, and dye C has a function of improving jitter.

Example 3

Disk 5 was prepared from disk 2 in example 1. The disk 5 had the same configuration as that of disk 2 except that the thickness of the reflective layer was changed to about 15 nm. The disk 5 was prepared so as to become semi-transparent and to obtain transmittance of about 50% by setting the thickness of the reflective layer to 15 nm. Rg was about 7%. Also in this case, the main reflective surface is on any one of the interfaces of the reflective layer. Such a semi-transparent configuration can be applied to a multilayer recording medium. When the same examination as that in example 1 was performed, the signal amplitude was lowered. Moreover, the polarity of the push-pull signal was not changed. Thus, L to H recording by using the phase shift of $0<|\Phi a|<|\Phi b|<\pi$ and $\Delta\Phi>0$ was performed.

Figure 18A:
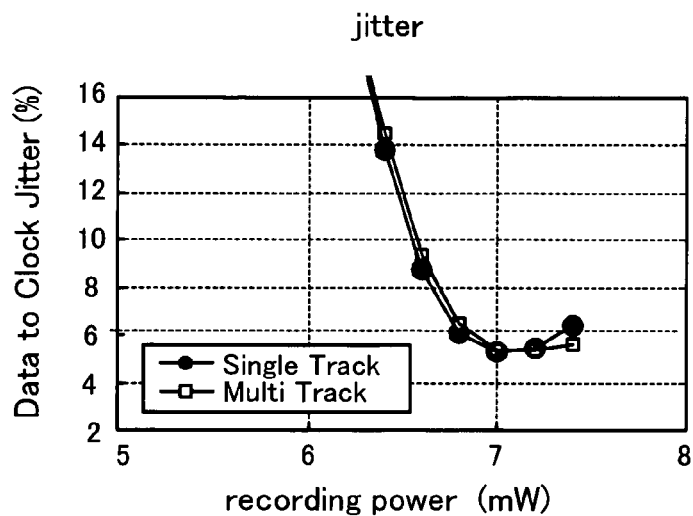
FIG. 18 are graphs showing recording power dependence of jitter, reflectivity in a recorded part and an unrecorded part, and modulation at the time of 1-time velocity recording of disk 5 under recording condition 1.
Figure 18B:
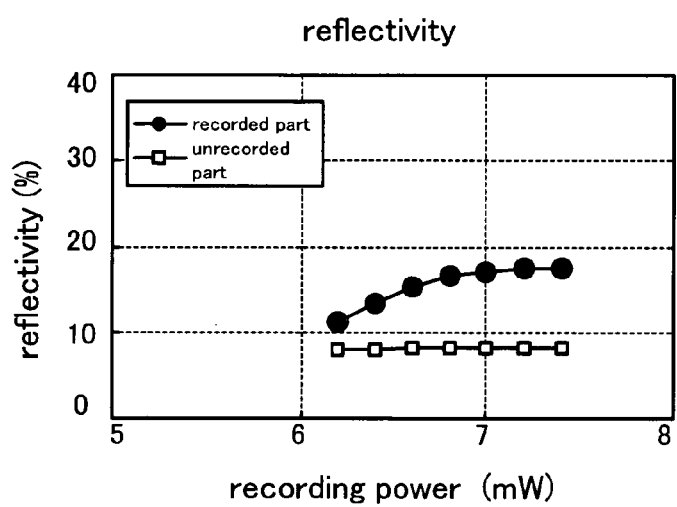
Figure 18C:
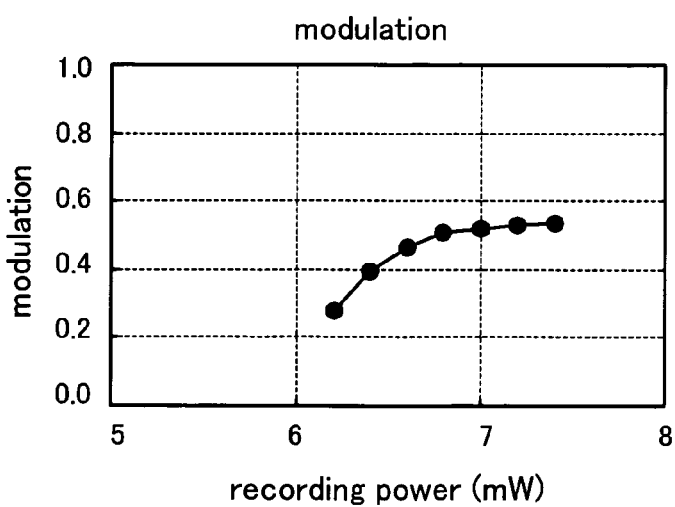

For the disk 5, recording characteristics were also evaluated by recording and reading of a random signal as in the case of example 1. FIG. 18 are graphs showing recording power dependence of jitter (FIG. 18A), reflectivity in the recorded part and the unrecorded part (FIG. 18B) and modulation (FIG. 18C) at the time of 1-time velocity recording of the disk 5 under recording condition 1. The parameters of the divided recording pulse used for recording are as shown in Table 6. Pb1=0.3 mW, Pb2/Pw=0.44 and Pr=0.7 mW.

TABLE 6

|  | dT to p | T to p | Tmp | dTe |
|---|---|---|---|---|
| 2 T | 5/16 T | 16/16 T | — | −9/16 T |
| 3 T | 6/16 T | 16/16 T | 10/16 T | −10/16 T |
| 4 T~9 T | 7/16 T | 16/16 T | 10/16 T | −10/16 T |

Except that the reflectivity is smaller than those in examples 1 and 2, excellent characteristics are obtained as in the cases of examples 1 and 2. Concerning the reflectivity, the value thereof is smaller than those in examples 1 and 2, but is nonetheless sufficient for recording and reading.

Example 4

By use of 20 kinds of azo dyes (dyes A2 to A21) among dyes shown in Tables 7 to 9, in addition to the auriferous azo dye (dye A) used as the recording layer dye in example 1, disks were prepared with the same multilayer structure as that in example 1. Note that Tables 7 to 9 show refractive indices, thermal characteristics and the like for dyes A and C, which are the azo dyes described above, and dyes A2 to A21. Moreover, Tables 7 to 9 also show recording characteristics of the respective dyes under recording condition 2. $\lambda_{max}$ in a film state is a peak wavelength in the main absorption band. In all cases, $\lambda_{max}$ is in the range of from 300 nm to 600 nm. Thus, recording and reading are performed with any of the wavelengths of the main absorption band.

Note that $\lambda_{max}$ in the chloroform solution and $\lambda_{max}$ in the film state normally coincide with each other within a range of about ±10 nm.

As to the groove geometry, the groove width was set to about 180 nm (0.18 μm), the groove depth was set to about 50 nm and the track pitch was set to 0.32 μm. When coating was performed under the same coating conditions by setting the concentration of the dye solution to 0.6 wt. %, in the all cases, about 30 nm was obtained as $d_G$ value. Under the coating conditions described above, $d_L$ was as small as substantially 0.

[Formula 13]

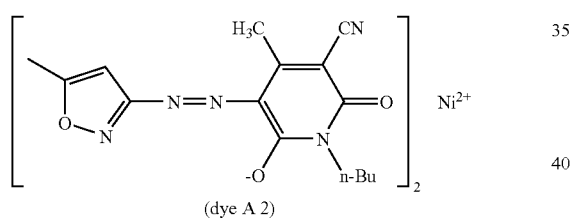

(dye A 2)

[Formula 14]

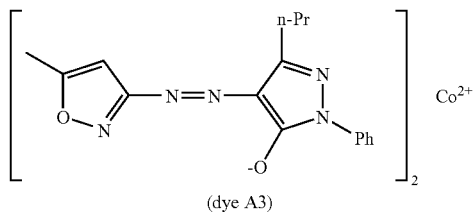

(dye A3)

[Formula 15]

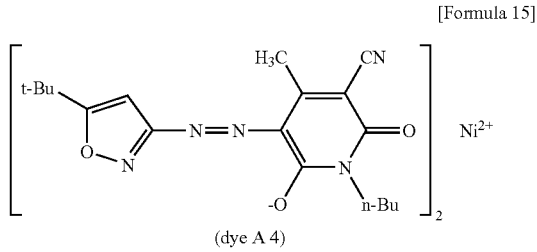

(dye A 4)

[Formula 16]

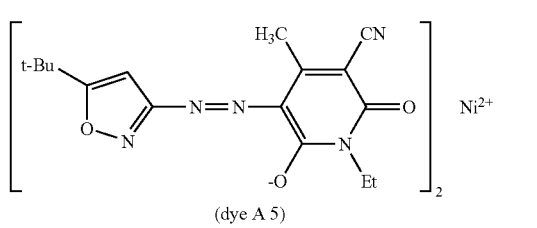

(dye A 5)

[Formula 17]

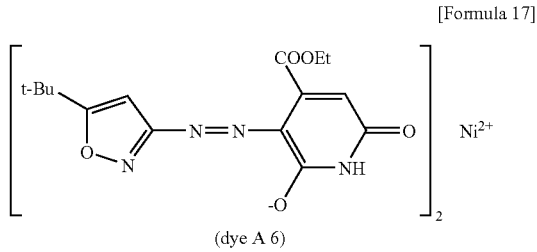

(dye A 6)

TABLE 7

| | Structural Formula | Molecular Weight | OD | ε | λ max in film state | Weight Reduction Start Temperature (° C.) | Refractive Index | |
|---|---|---|---|---|---|---|---|---|
| | | | | | | | n | k |
| dye A | 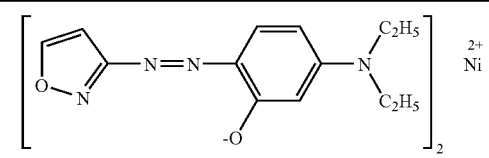 | 577.26 | 132 | 76000 | 511.5 | 238.9 | 1.38 | 0.15 |
| dye C | 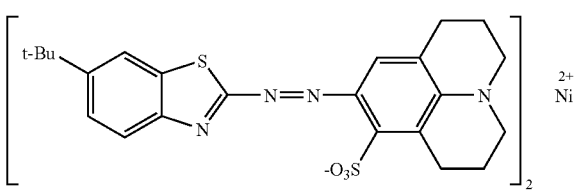 | 997.9 | 121.5 | 122000 | 716 | 284.5 | 1.50 | 0.12 |

TABLE 7-continued

| dye | Structure | | | | | | |
|---|---|---|---|---|---|---|---|
| dye A2 | [5-methyl-isoxazole-N=N-pyridone with H3C, CN, =O, -O, n-Bu substituents]₂ Ni²⁺ | 687.33 | 80 | 55000 | 436 | 230.8 | 1.37 | 0.48 |
| dye A3 | [5-methyl-isoxazole-N=N-pyrazole with n-Pr, Ph, -O substituents]₂ Co²⁺ | 679.59 | 50.4 | 34000 | 360 | 222.6 | 1.80 | 0.28 |
| dye A4 | [t-Bu-isoxazole-N=N-pyridone with H3C, CN, =O, -O, n-Bu substituents]₂ Ni²⁺ | 771.49 | 95.7 | 74000 | 441 | 230.1 | 1.34 | 0.44 |
| dye A5 | [t-Bu-isoxazole-N=N-pyridone with H3C, CN, =O, -O, Et substituents]₂ Ni²⁺ | 715.39 | 75.3 | 54000 | 438.5 | 257.1 | 1.48 | 0.33 |
| dye A6 | [t-Bu-isoxazole-N=N-pyridone with COOEt, =O, -O, NH substituents]₂ Ni²⁺ | 725.33 | 54.6 | 40000 | 436.5 | 264.6 | 1.46 | 0.45 |

| | 1-time Velocity | | | | 2-times Velocity | | | |
|---|---|---|---|---|---|---|---|---|
| | Optimum Recording Power (mW) | Minimum Jitter Value (%) | Unrecorded Reflectivity (%) | Reflectivity After Recording (%) | Optimum Recording Power (mW) | Minimum Jitter Value (%) | Unrecorded Reflectivity (%) | Reflectivity After Recording (%) |
| dye A | 6.4 | 6.7 | 14.4 | 35.6 | 8.2 | 8.4 | 14.4 | 36.0 |
| dye C | 8.0 | 7.1 | 12.9 | 32.5 | 10.5 | 9.6 | 12.4 | 30.9 |
| dye A2 | 6.0 | 6.0 | 17.0 | 43.1 | 7.0 | 6.7 | 16.3 | 38.7 |
| dye A3 | 6.2 | 5.5 | 11.4 | 37.0 | 7.6 | 7.3 | 11.0 | 37.1 |
| dye A4 | 6.2 | 5.9 | 15.1 | 37.9 | 7.4 | 7.6 | 15.0 | 37.9 |
| dye A5 | 6.0 | 6.0 | 12.6 | 33.8 | 7.8 | 6.9 | 12.6 | 30.3 |
| dye A6 | 6.6 | 5.5 | 15.4 | 37.6 | 8.0 | 6.6 | 15.0 | 38.8 |

TABLE 8
| | Structural Formula | Molecular Weight | OD | ε | λ max in film state | Weight Reduction Start Temperature (°C.) | Refractive Index | |
|---|---|---|---|---|---|---|---|---|
| | | | | | | | n | k |
| dye A7 | 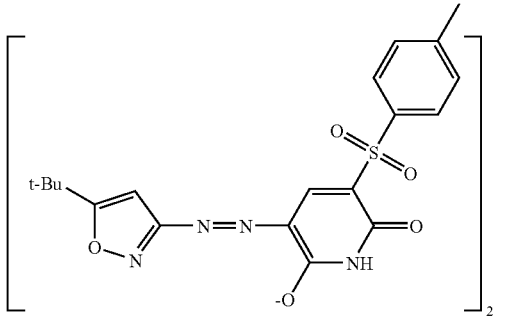 | 889.67 | 52.1 | 46000 | 435 | 289.8 | 1.47 | 0.48 |
| dye A8 | 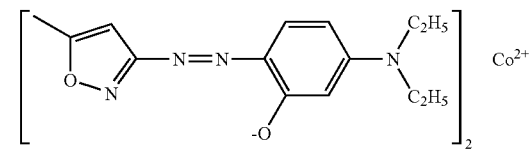 | 605.55 | 53.4 | 32000 | 530 | 172.4 | 1.58 | 0.05 |
| dye A9 | 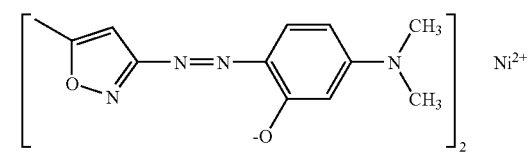 | 549.2 | 123.6 | 68000 | 514.5 | 231.9 | 1.24 | 0.24 |
| dye A10 | 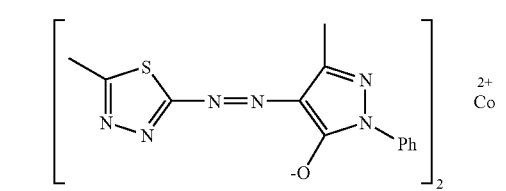 | 657.6 | 55 | 36000 | 419 | 296.2 | 1.63 | 0.46 |
| dye A11 | 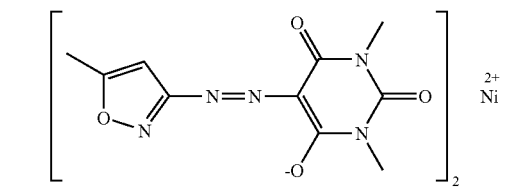 | 587.13 | 58.7 | 34000 | 409 | 177.1 | 1.71 | 0.41 |
| dye A12 | 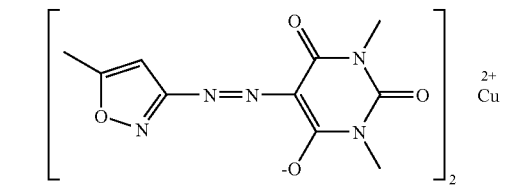 | 591.98 | 53.8 | 32000 | 368.5 | 221.8 | 1.88 | 0.14 |
| dye A13 | 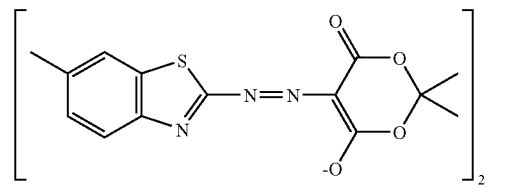 | 695.59 | 61 | 42000 | 443 | 180.5 | 1.50 | 0.39 |

TABLE 8-continued

| dye A14 | [structure: thiazole-N=N-dimedone-dioxy with Ni²⁺]₂ | 567.18 | 69 | 39000 | 423.5 | 134.1 | 1.48 | 0.53 |

| | | 1-time Velocity | | | | 2-times Velocity | | | |
|---|---|---|---|---|---|---|---|---|---|
| | | Optimum Recording Power (mW) | Minimum Jitter Value (%) | Unrecorded Reflectivity (%) | Reflectivity After Recording (%) | Optimum Recording Power (mW) | Minimum Jitter Value (%) | Unrecorded Reflectivity (%) | Reflectivity After Recording (%) |
| | dye A7 | 6.8 | 6.5 | 20.2 | 40.2 | 8.4 | 8.3 | 20.1 | 39.7 |
| | dye A8 | 7.8 | 5.3 | 11.9 | 31.8 | 9.0 | 6.8 | 11.4 | 31.0 |
| | dye A9 | 6.6 | 7.8 | 14.7 | 30.8 | 8.0 | 11.8 | 14.5 | 31.2 |
| | dye A10 | 6.4 | 5.4 | 10.5 | 28.5 | 7.6 | 7.6 | 10.4 | 27.4 |
| | dye A11 | 6.8 | 6.1 | 13.0 | 34.3 | 8.2 | 7.5 | 12.9 | 33.8 |
| | dye A12 | 7.2 | 6.3 | 12.1 | 34.2 | 8.4 | 8.7 | 12.2 | 33.6 |
| | dye A13 | 6.8 | 6.1 | 16.0 | 34.9 | 8.0 | 7.0 | 15.7 | 34.7 |
| | dye A14 | 6.6 | 6.2 | 16.7 | 39.2 | 7.8 | 7.6 | 16.4 | 39.0 |

TABLE 9

| | Structural Formula | Molecular Weight | OD | $\epsilon$ | $\lambda$ max in film state | Weight Reduction Start Temperature (° C.) | Refractive Index | |
|---|---|---|---|---|---|---|---|---|
| | | | | | | | n | k |
| dye A15 | [methylbenzothiazole-N=N-dimedone-dioxy with Ni²⁺]₂ | 695.35 | 74.9 | 51000 | 445 | 182.2 | 1.40 | 0.39 |
| dye A16 | [methylbenzothiazole-N=N-dimedone with Ni²⁺]₂ | 687.46 | 65 | 45000 | 488 | 309.7 | 1.43 | 0.26 |
| dye A17 | [methylpyrazole-N=N-dimedone-dioxy with Ni²⁺]₂ | 561.19 | 59.6 | 33000 | 379 | 211 | 1.83 | 0.30 |

TABLE 9-continued

| dye | structure | | | | | | |
|---|---|---|---|---|---|---|---|
| dye A18 | [H₃COOC-triazole-N=N-pyrimidine(=O,=S,-O⁻) with N-ethyl groups]₂ Ni²⁺ | 763.39 | 96.4 | 74000 | 430.5 | 243.9 | 1.30 0.63 |
| dye A19 | [F₃C-triazole(n-Pr)-N=N-pyrimidine(=O,=S,-O⁻) with N-ethyl groups]₂ Ni²⁺ | 867.48 | 96.1 | 83000 | 413.5 | 338.2 | 1.39 0.79 |
| dye A20 | [F₃C-triazole(n-Pr)-N=N-pyrimidine(=O,=S,-O⁻) with N-ethyl groups]₂ Co²⁺ | 867.72 | 76.2 | 66000 | 414 | 328.2 | 1.52 0.70 |
| dye A21 | [NC,NC-imidazole(CH₃)-N=N-tetrahydroquinoline(N-CH₃), F₃CO₂S-N]₂ Ni²⁺ | 961.51 | 142 | 137000 | 598 | 347.8 | 1.38 0.21 |

|  | 1-time Velocity | | | | 2-times Velocity | | | |
|---|---|---|---|---|---|---|---|---|
|  | Optimum Recording Power (mW) | Minimum Jitter Value (%) | Unrecorded Reflectivity (%) | Reflectivity After Recording (%) | Optimum Recording Power (mW) | Minimum Jitter Value (%) | Unrecorded Reflectivity (%) | Reflectivity After Recording (%) |
| dye A15 | 6.6 | 6.3 | 16.6 | 35.8 | 7.6 | 7.6 | 16.3 | 33.2 |
| dye A16 | 6.6 | 7.2 | 22.0 | 40.6 | 7.6 | 9.8 | 21.7 | 40.2 |
| dye A17 | 7.2 | 5.0 | 9.0 | 29.9 | 8.4 | 5.6 | 9.0 | 30.0 |
| dye A18 | 7.4 | 5.8 | 12.1 | 31.9 | 8.4 | 6.3 | 11.8 | 31.3 |
| dye A19 | 5.6 | 8.9 | 10.6 | 26.5 | 6.6 | 13.0 | 10.2 | 21.5 |
| dye A20 | 6.2 | 7.5 | 10.2 | 29.4 | 7.2 | 11.0 | 10.0 | 27.7 |
| dye A21 | 7.4 | 6.5 | 15.1 | 31.3 | 9.9 | 9.8 | 14.9 | 31.7 |

In all the cases, as the reflectivity R0 in the unrecorded state in the disk mirror surface part, 70% or more of the reflectivity of the mirror surface part in the case where the thickness of the recording layer was set to 0 was obtained. Moreover, in the case of the shallow groove with the depth of about 25 nm, the reflectivity before recording (the space part reflectivity) was increased, and the signal amplitude and the modulation were lowered. Consequently, it was confirmed that L to H recording mainly by contribution of the phase shift $\Delta\Phi$ was performed.

For the respective dyes and at 1-time velocity and 2-times velocity, the recording pulse was used by appropriately optimizing the recording pulse parameters in FIG. 11 so as to obtain a good jitter value. Optimum recording power was power at which jitter in Multi Track was minimized. The recording linear velocity was that of recording condition 2. A difference in jitter between Single Track and Multi Track was about 0.5% or less in the all cases. Thus, excellent recording with very small crosstalk was performed.

Moreover, when the groove depth was about 55 nm and the groove width was about 0.15 μm, in the all cases, the normalized push-pull signal intensity in the unrecorded state was from 0.7 to 0.8. Moreover, the normalized push-pull signal intensity after recording at the optimum recording power in Multi Track recording was set to from 0.4 to 0.5.

The results in Tables 7 to 9 show that, particularly, at 2-times velocity, there are clear influences of $k_d$ and the weight reduction start temperature $T_d$. Specifically, if $k_d$ is 0.2 or more and $T_d$ is 280° C. or less, the recording sensitivity evaluated by the optimum recording power at 2-times velocity is set to approximately 8.5 mW or less, which is preferable. As to the recording sensitivity, $k_d$ is particularly important. It can be seen that, if $k_d$ is 0.25 or more, in this example, the recording sensitivity is set to 8.5 mW or less regardless of $T_d$. Moreover, it can be seen that, if $k_d$ is 0.3 or more and $T_d$ is 300° C. or less, the jitter value at 2-times velocity can be set to 8.5% or less, and, if $T_d$ is 280° C. or less, the jitter value can be set to 8% or less. In the dye having $k_d$ of 0.3 or more, $\lambda_{max}$ was from 370 nm to 450 nm. Those showing good recording characteristics at 2-times velocity can be also applied to recording at a higher velocity. For example, when 4-times velocity recording was tried by applying a so-called 2T recording strategy (also called a n/2 strategy in patent document 42) to the dye A17, jitter of 7.2% was obtained.

Other than the above, also in the case where $k_d$ is from 0.1 to 0.3 and the weight reduction start temperature was 200° C. or less, jitter of less than 8% is obtained at 2-times velocity. Thus, it can be seen that the above case is preferable.

Note that, although the dye A9 had $k_d$ of less than 0.3, $n_d$ as small as less than 1.3 may adversely affect jitter. Specifically, since $\delta n_d$ is reduced and $\Phi n$ is reduced, the modulation is relatively lowered compared with the other examples. Thus, the lowered modulation may slightly deteriorate jitter at 2-times velocity. From this perspective, it can be seen that $n_d$ is preferably 1.3 or more.

Even if the dye recording layer has relatively inferior 2-times velocity recording characteristics, the recording characteristics can be improved by adding an additive which leads to cavity formation, that is, the deformation of $d_{bmp}<0$ by decomposition at a low temperature of 300° C. or less or by adding an additive which can increase $k_d$. In order to improve the recording characteristics, storage stability and the like in a single dye, addition of such an additive in the recording layer is also possible in the present invention. Moreover, if $k_d$ of the single dye is as large as 0.5 or more and significantly reduced by recording, the effect of the increase in the reflected light intensity due to reduction in $k_d$ is supplementarily used in addition to the phase shift. Thus, the recording characteristics may be improved. Furthermore, the optimum recording power can be reduced by slightly increasing the thickness of the recording layer.

Figure 25:
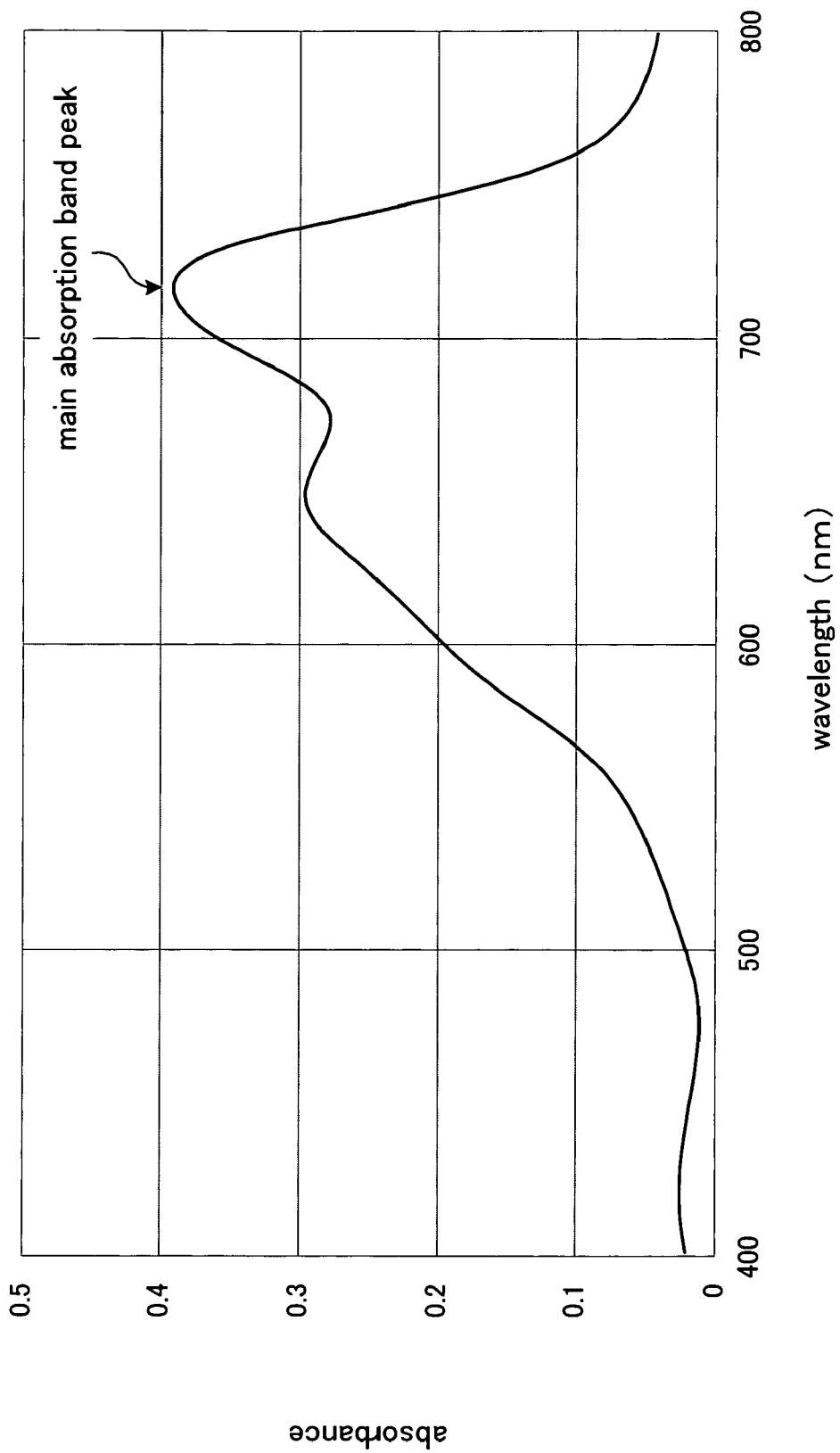
FIG. 25 is a graph showing an absorption spectrum in a thin film state of dye C.
Figure 26:
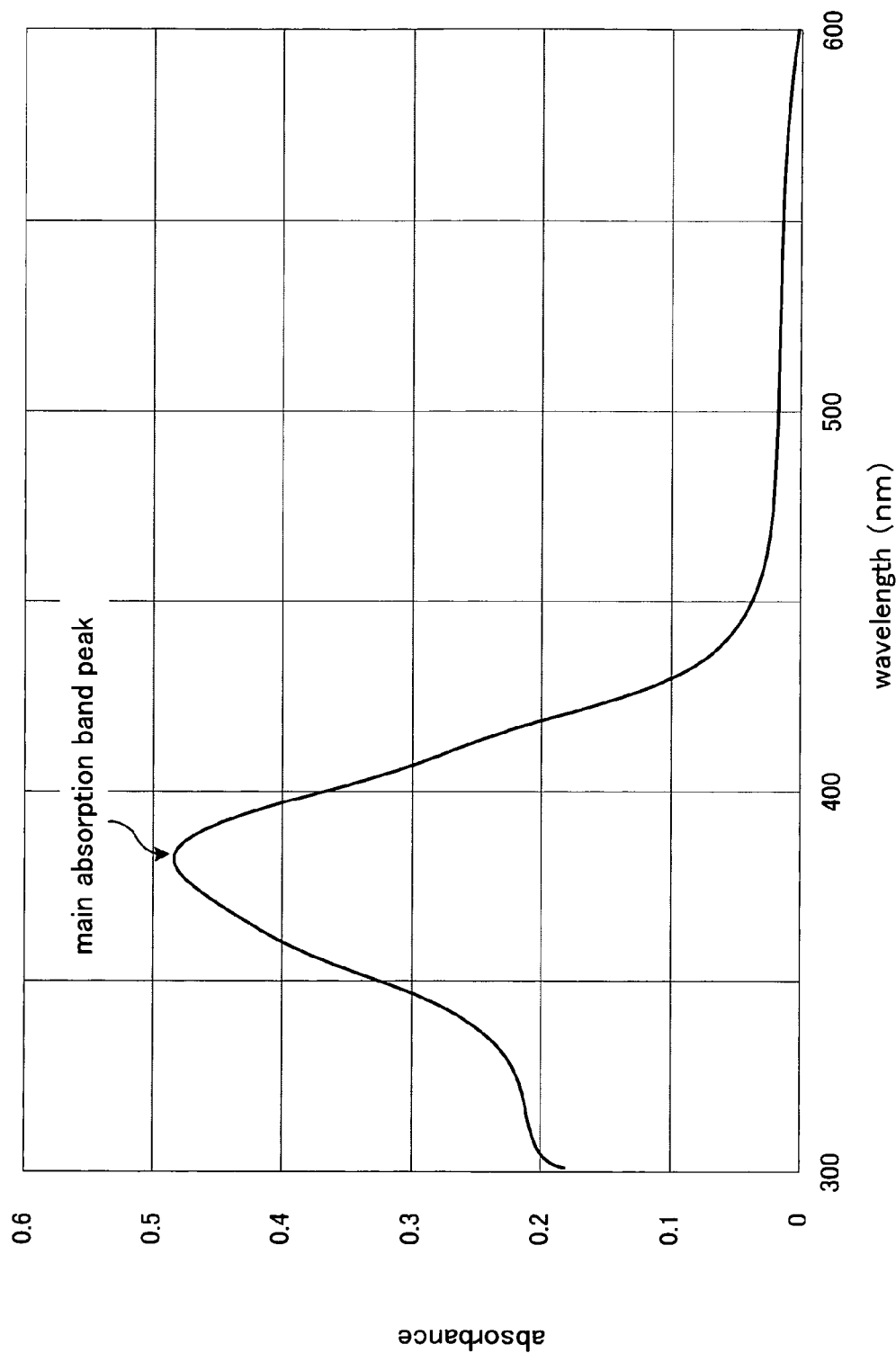
FIG. 26 is a graph showing an absorption spectrum in a thin film state of dye A17.
Figure 27:
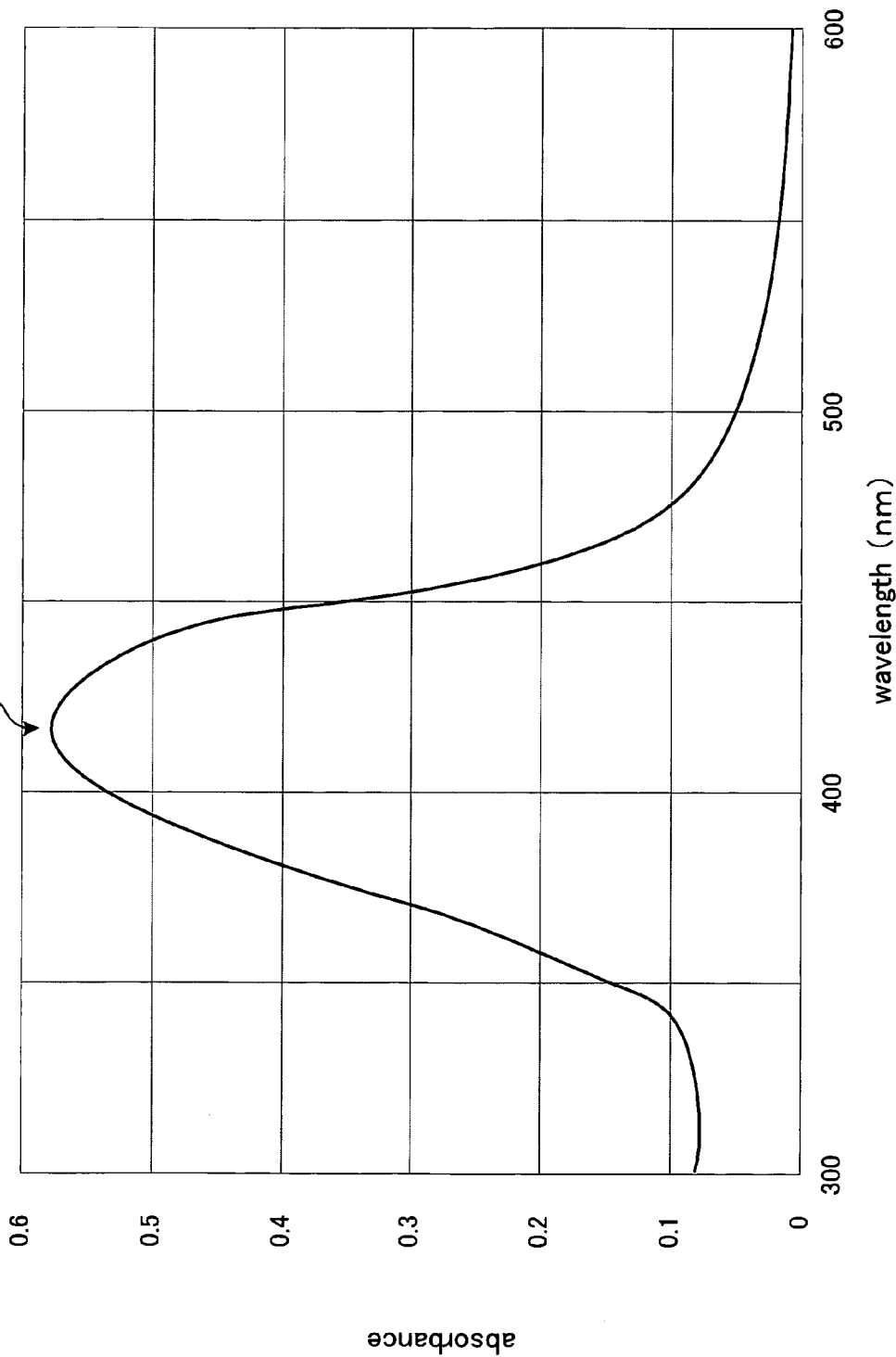
FIG. 27 is a graph showing an absorption spectrum in a thin film state of dye A20.
Figure 28:
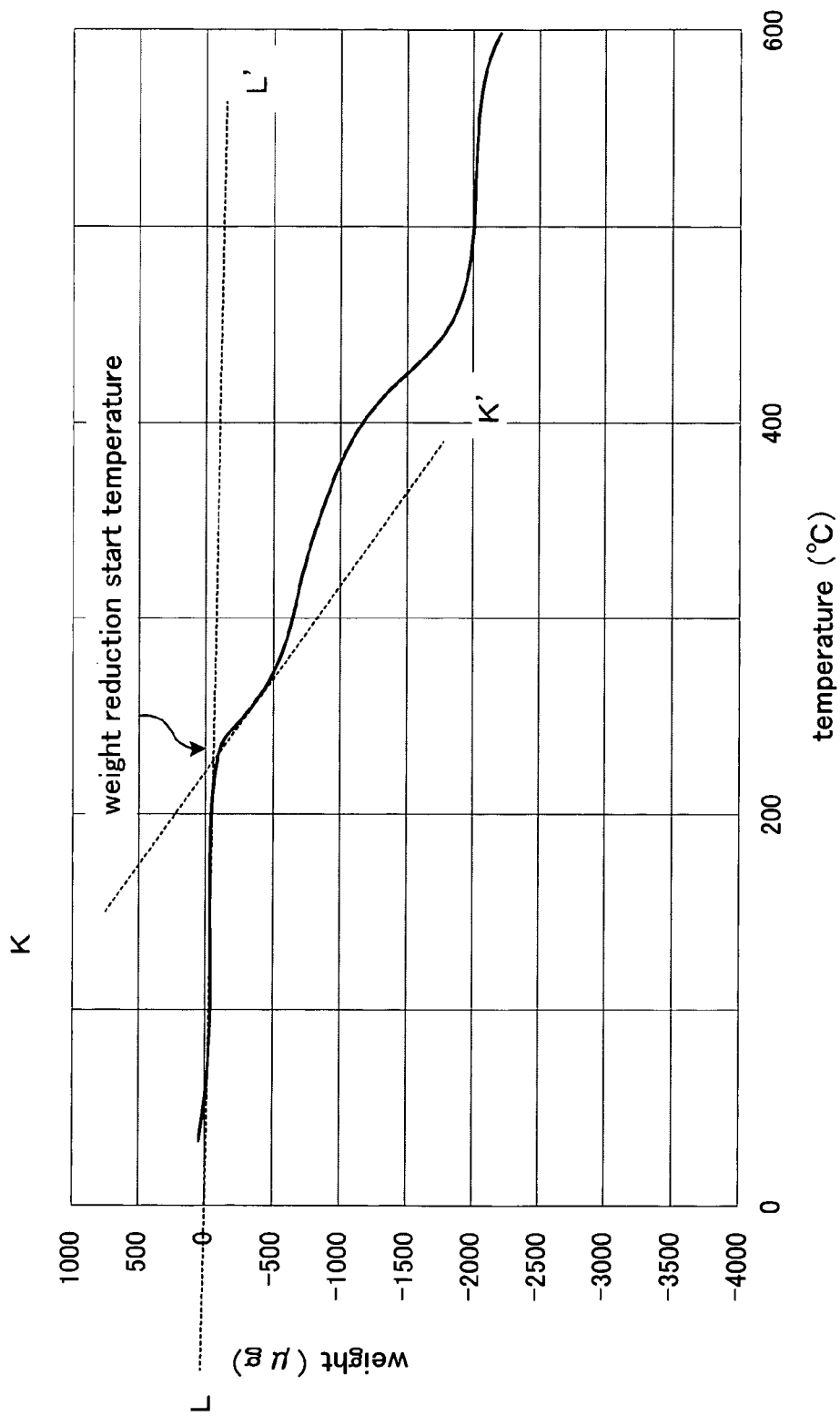
FIG. 28 is a graph showing a weight reduction spectrum in a TG-DTA spectrum of dye A2.
Figure 29:
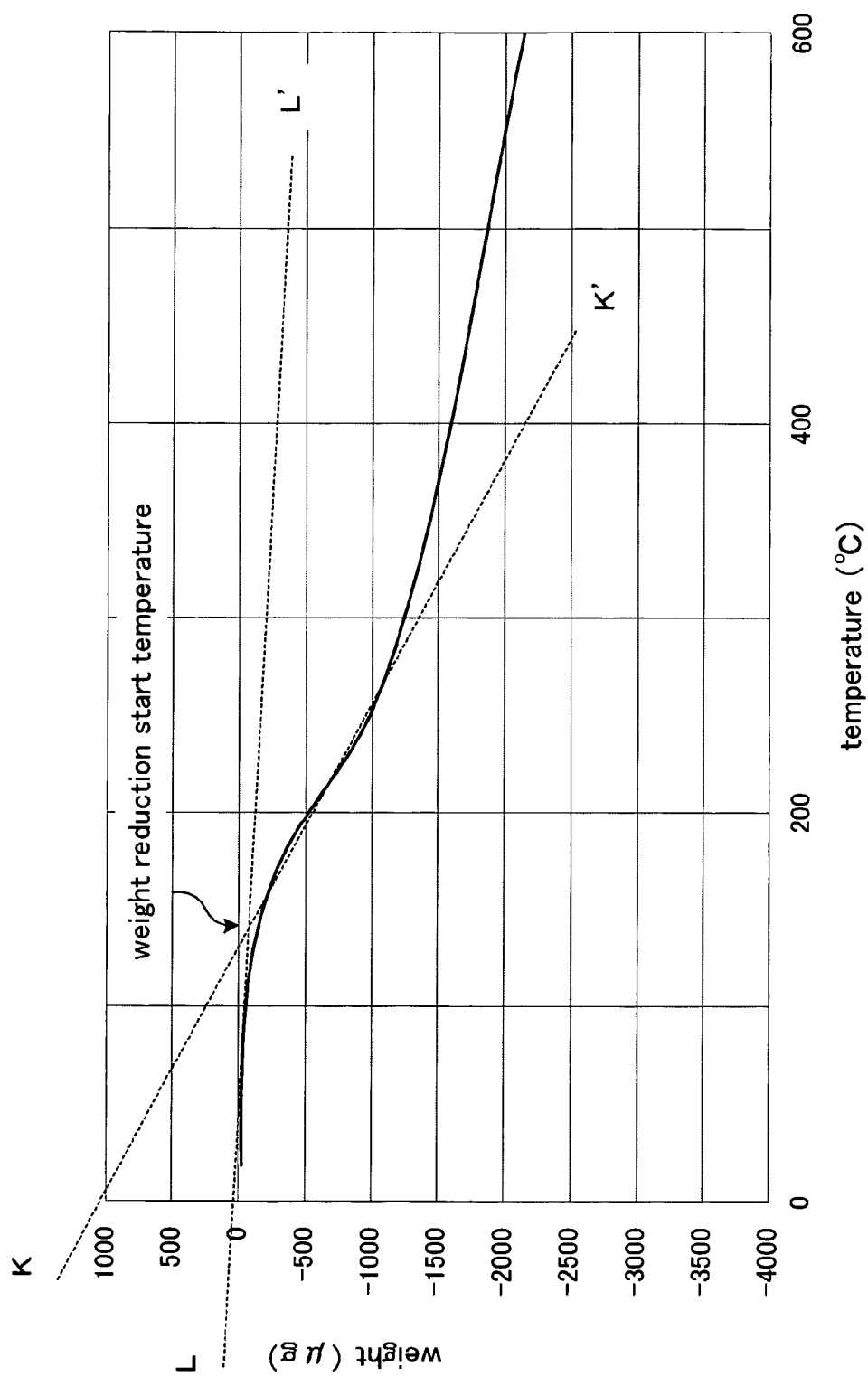
FIG. 29 is a graph showing a weight reduction spectrum in a TG-DTA spectrum of dye A8.
Figure 30:
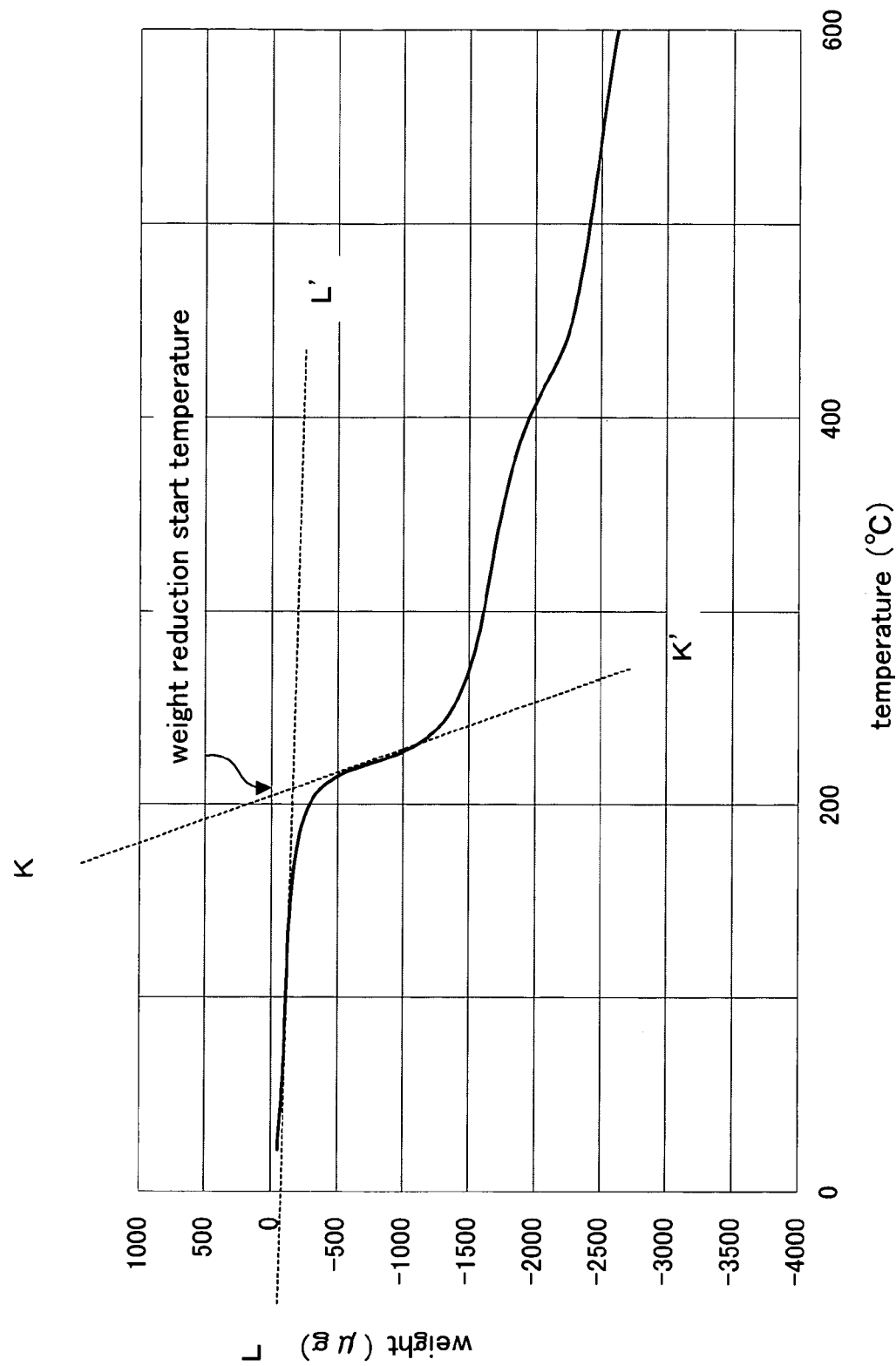
FIG. 30 is a graph showing a weight reduction spectrum in a TG-DTA spectrum of dye A17.
Figure 31:
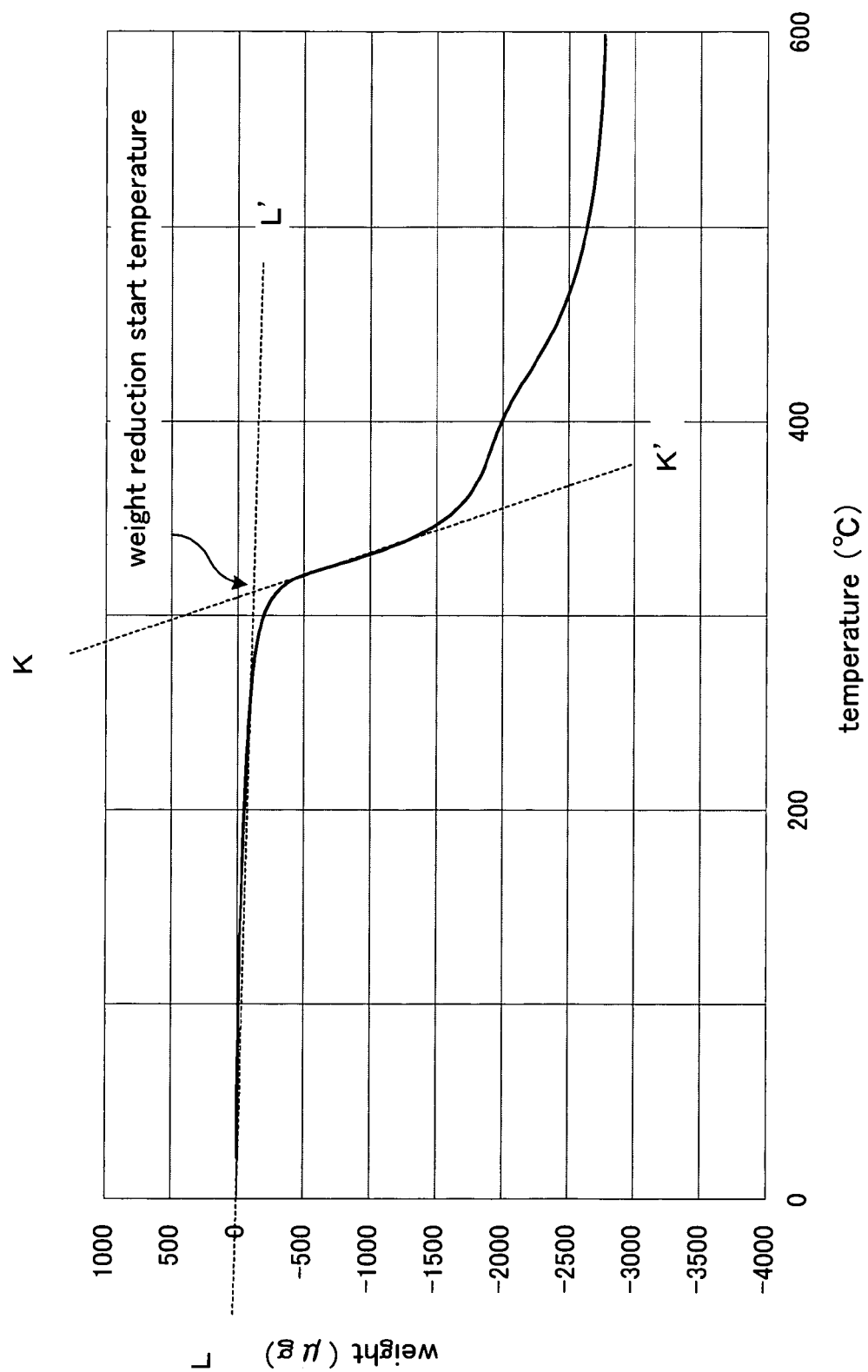
FIG. 31 is a graph showing a weight reduction spectrum in a TG-DTA spectrum of dye A20.

Note that FIGS. 25 to 27 show absorption spectra of the following dyes in the thin film state among the dyes shown in Tables 7 to 9, including: the dye C as an example that the main absorption band peak is on the wavelength longer than 600 nm; the dye A17 as an example that the main absorption band peak is on the wavelength shorter than the recording/reading light wavelength; and the dye A20 as an example that the main absorption band peak is close to the recording/reading light wavelength. The peak position of the main absorption band is indicated by "→". In the all cases, it is understood that a clear absorption band is in a visible wide range.

Furthermore, FIGS. 28 to 31 show (weight reduction spectra of) TG-DTA spectra of dyes A2, A8, A17 and A20 as representative examples among the dyes shown in Tables 7 to 9. The temperature indicated by "→" in the graphs is the weight reduction start temperature. The intersection of the line L-L' in the background with the tangent line K-K' of a weight reduction part of 500 μg or more, which is steep in the beginning, is set to the weight reduction start temperature. The spectra are those in the nitrogen atmosphere. Even if measurement is conducted in the atmosphere, the values of the weight reduction start temperature correspond within a range of about ±5° C.

Example 5

By replacing the recording layer dye in example 1 with non-azo dyes B1 and D1 to D6, disks were prepared with the same multilayer structure. Moreover, a disk including a recording layer formed by using any of those dyes as a main component and adding 30 wt. % of the dye C was also prepared. Table 10 shows refractive indices, thermal characteristics, recording characteristics and the like for the dyes B, B1 and D1 to D6 which are the non-azo dyes. $\lambda_{max}$ in the film state is a peak wavelength in the main absorption band. In all cases, $\lambda_{max}$ is in the range of from 300 nm to 600 nm, and recording and reading are performed with any of the wavelengths of the main absorption band. The dyes B and B1 are carbostyryl dyes, and the dyes D1 to D6 are pyrone dyes.

TABLE 10

| | Structural Formula | Molecular Weight | OD | ε | λ max in film state | Weight Reduction Start Temperature (° C.) | Refractive Index | |
|---|---|---|---|---|---|---|---|---|
| | | | | | | | n | k |
| dye B | Ph | 320.39 | 72.4 | 23000 | 389.5 | 341.3 | 2.18 | 0.34 |

TABLE 10-continued

| dye | structure | | | | | | |
|---|---|---|---|---|---|---|---|
| dye B1 | | 270.37 | 96.9 | 26000 | 378.5 | 290 | 2.07 0.25 |
| dye D1 | | 315.41 | 124.9 | 39000 | 379.5 | 221.8 | 2.03 0.34 |
| dye D2 | | 365.43 | 133.3 | 49000 | 388 | 223.9 | 2.09 0.46 |
| dye D3 | | 359.42 | 127.9 | 46000 | 376.5 | 246.2 | 1.93 0.12 |
| dye D4 | | 334.5 | 210.9 | 70000 | 478 | 308.1 | 1.33 0.27 |
| dye D5 | | 286.37 | 150.2 | 43000 | 376 | 290.1 | 1.81 0.29 |
| dye D6 | | 260.33 | 168.7 | 44000 | 374 | 304.2 | 1.66 0.16 |

| | 1-time Velocity | | | | 2-times Velocity | | | | |
|---|---|---|---|---|---|---|---|---|---|
| | Optimum Recording Power (mW) | Minimum Jitter Value (%) | Unrecorded Reflectivity (%) | Reflectivity After Recording (%) | Optimum Recording Power (mW) | Minimum Jitter Value (%) | Unrecorded Reflectivity (%) | Reflectivity After Recording (%) | Presence of Mixture |
| dye B | 6.4 | 7.4 | 13.2 | 33.0 | | | | | 30 w % of dye C mixed |
| dye B1 | 7.4 | 6.9 | 14.6 | 36.6 | | | | | 30 w % of dye C mixed |
| dye D1 | 6.2 | 8.4 | 7.2 | 25.8 | | | | | 30 w % of dye C |

TABLE 10-continued

| dye | | | | | | | | | |
|---|---|---|---|---|---|---|---|---|---|
| dye D2 | 6.8 | 6.5 | 9.8 | 28.3 | | | | | mixed Not Present |
| | | | | | | | | | 30 w % of dye C mixed |
| dye D3 | 6.6 | 11.5 | 11.6 | 31.4 | | | | | Not Present |
| | 6.8 | 7.3 | 10.3 | 30.0 | | | | | 30 w % of dye C mixed |
| dye D4 | 6.8 | 5.5 | 17.1 | 40.5 | | | | | Not Present |
| | 6.8 | 5.1 | 16.5 | 39.6 | 8.6 | 7.9 | 16.6 | 39.9 | 30 w % of dye C mixed |
| dye D5 | 6.8 | 7.9 | 9.8 | 25.8 | | | | | 30 w % of dye C mixed |
| dye D6 | 6.8 | 8.2 | 8.8 | 24.0 | | | | | 30 w % of dye C mixed |

As to the groove geometry, the groove width was set to about 200 nm (0.2 μm), the groove depth was set to about 50 nm and the track pitch was set to 0.32 μm. When coating was performed under the same coating conditions by setting the concentration of the dye solution to 0.6 wt. %, in the all cases, $d_G$ was set to about 30 nm. Under the coating conditions described above, $d_L$ was as small as substantially 0.

In all the cases, as the reflectivity R0 in the unrecorded state in the disk mirror surface part, 70% or more of the reflectivity of the mirror surface part in the case where the thickness of the recording layer was set to 0 was obtained. Moreover, in the case of the shallow groove with depth of about 25 nm, the reflectivity before recording (the space part reflectivity) was increased, and the signal amplitude and the modulation were lowered, compared with the case of the groove depth of 50 nm. Consequently, it was confirmed that L to H recording mainly by contribution of the phase shift ΔΦ was performed.

Many of the non-azo dyes were inferior in jitter to the azo dye. Thus, somewhat less strict recording condition 1 was applied.

For the respective dyes and at 1-time velocity and 2-times velocity, the recording pulse was used by appropriately optimizing the recording pulse strategy parameters in FIG. 11 so as to obtain a good jitter value. Optimum recording power was power at which jitter in Multi Track was minimized. As to the dye B ($n_d$=2.18), the dye B1 ($n_d$=2.07), the dye D1 ($n_d$=2.03) and the dye D2 ($n_d$=2.09), when any of those dyes forms the recording layer by itself, no clear L to H recording signal was obtained. It is conceivable that, probably, $n_d'$ is not sufficiently lowered to $n_c$ or less since $n_d$ is 2 or more. The dye D3 having $n_d$ of 1.93 had relatively poor jitter of about 11%. However, the L to H polarity signal was obtained.

However, when mixed with the dye C ($n_d$=1.50), a difference in jitter between Single Track and Multi Track was about 0.5% or less in the all cases. Thus, excellent recording with very small crosstalk was performed.

The dye D4 achieved excellent recording characteristics even when used by itself. Thus, evaluation thereof under recording condition 2 was also conducted. In both cases, even by use of a single dye, jitter of 9% or less was obtained at 1-time velocity. However, jitter was increased to 10% or more at 2-times velocity under recording condition 2. This is considered to be related to the weight reduction start temperature higher than 250° C.

Figure 32:
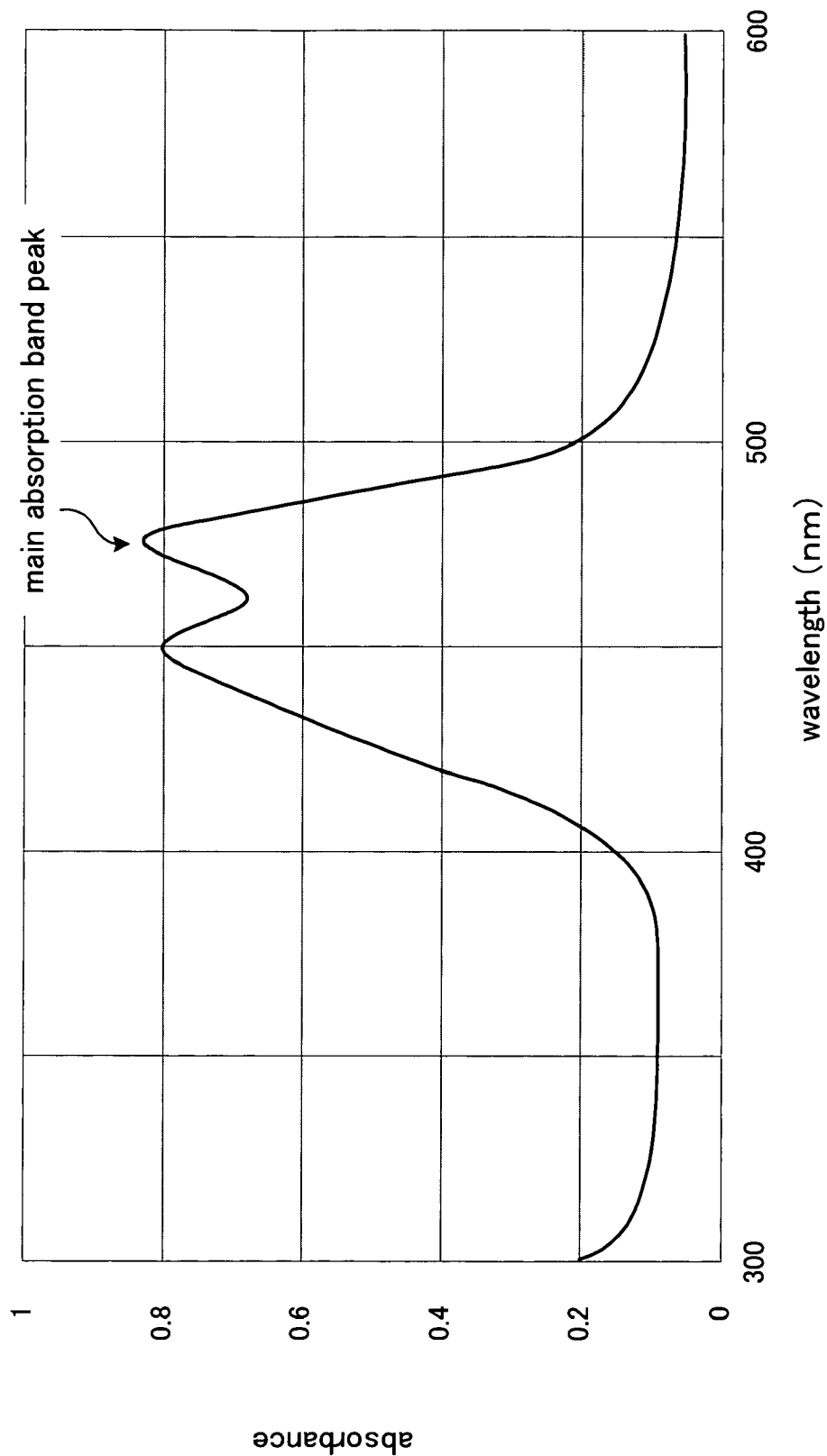
FIG. 32 is a graph showing an absorption spectrum in a thin film state of dye D4 in example 5.
Figure 33:
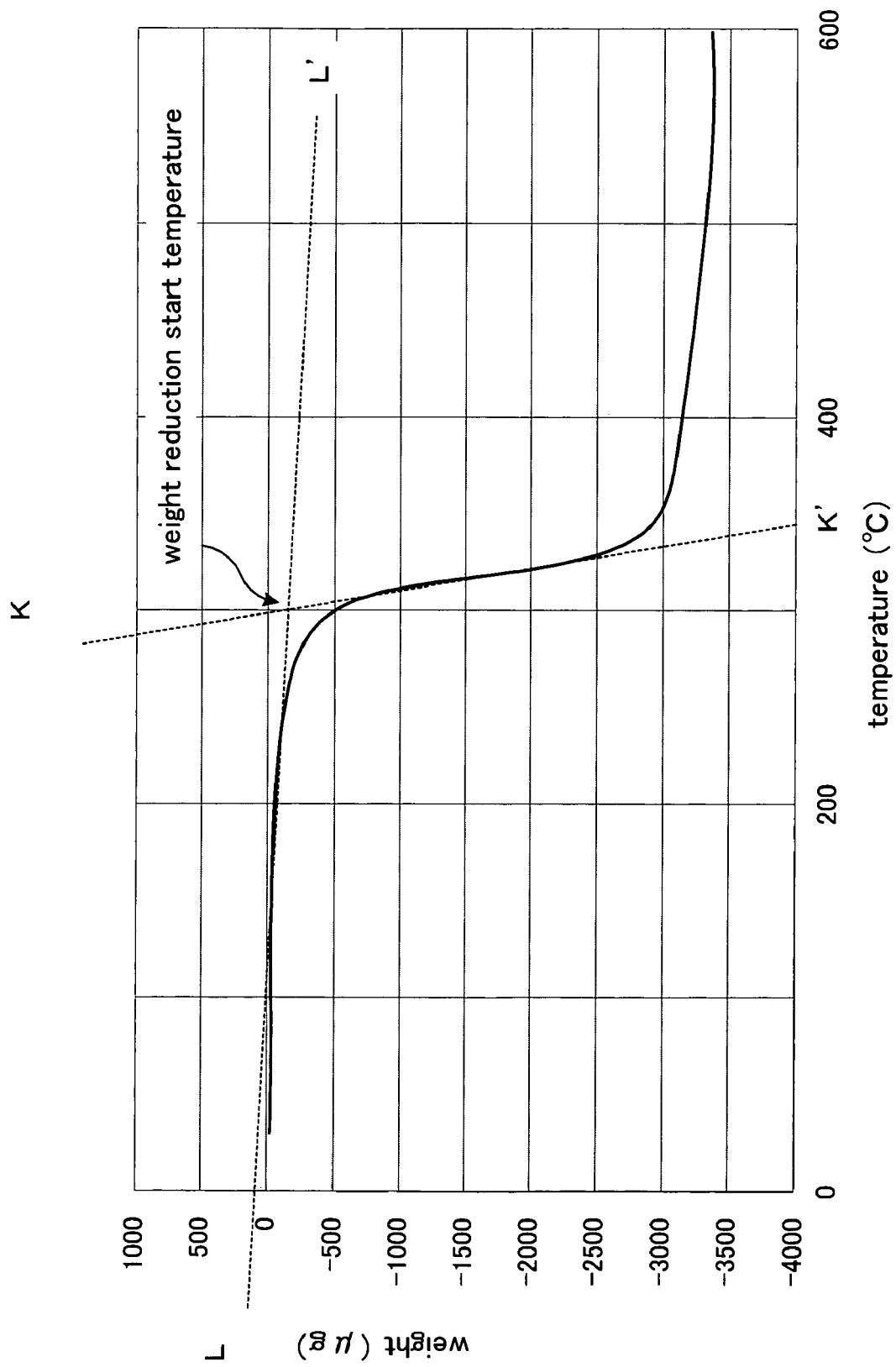
FIG. 33 is a graph showing a weight reduction spectrum of dye D4 in example 5.

Note that FIG. 32 shows an absorption spectrum of the dye D4 which can obtain a good jitter value even when used by itself among those dyes in example 5. Even in the case of a double-absorption-peaks spectrum as the dye D4, respective peaks are close to each other and one continuous absorption band is formed. In this case, the peak having larger absorbance is set to be the peak of the main absorption band. Furthermore, FIG. 33 shows a weight reduction spectrum of the dye D4.

Note that dyes D5 and D6 showed tendency to be crystallized when each of the dyes was used by itself. Thus, without evaluating the recording characteristics when each of the dyes formed the recording layer by itself, evaluation of the recording characteristics was performed by mixing the dye C with any of those dyes to form the recording layer.

Example 6

A substrate including a ROM signal was prepared. Specifically, the same (1, 7)RLL-NRZI mark length modulation data as that in examples 1 to 4 was recorded as a concave pit array in the ROM signal. The pit and the substrate groove part depth were about 50 nm. The shape of the substrate groove part was the same as that in example 4. On the substrate, a recording medium having the same multilayer structure as that of the medium including the dye A17 in example 4 was formed. A region in which a recording pit array exists is called a ROM part, and a region in which the recording groove part exists is called a recordable region.

Figure 34:
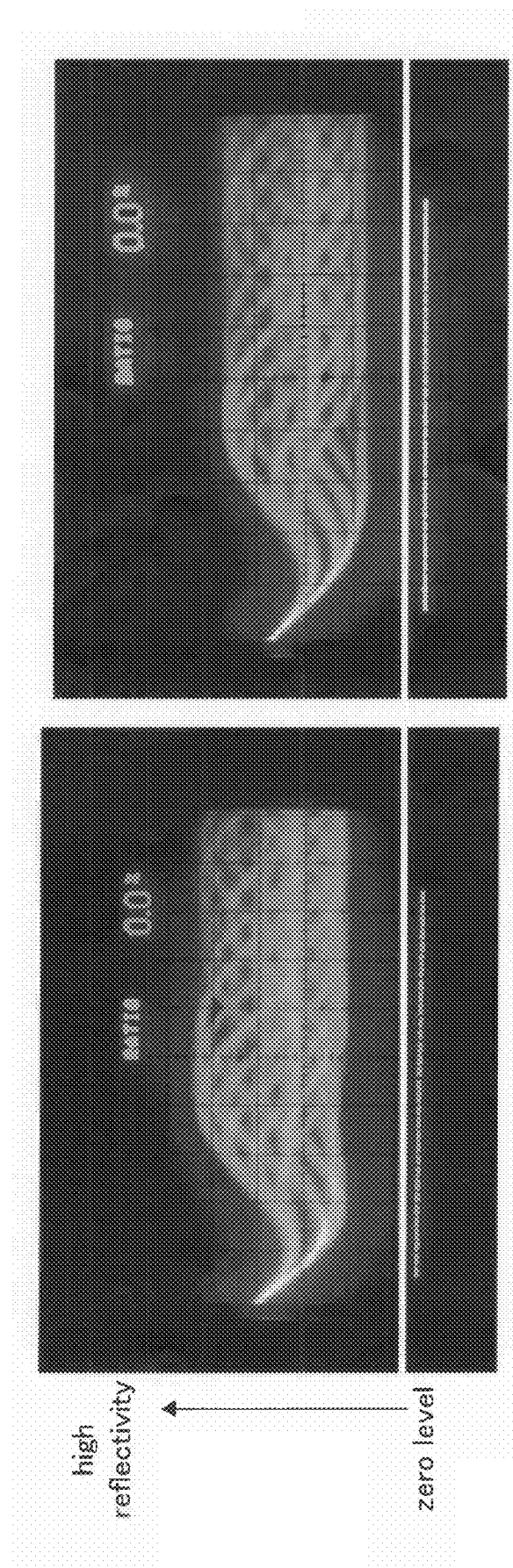
FIG. 34 are views showing reading signal waveforms in a ROM region of a partial ROM and in a recorded recordable region.

FIG. 34 are views showing reading signal waveforms in a ROM region of a partial ROM and in a recorded recordable region. Each of FIG. 34 shows a reading signal waveform (Isum signal, so-called eye patterns) in the ROM region and the recorded recordable region. Recording in the recordable region was performed as in the case of example 4.

In FIG. 34A, $R_H$ in the ROM region was about 40%, modulation was about 65% and jitter was 7.2%. It looked like the jitter value was slightly high and asymmetry was slightly shifted. However, this was originally a problem in manufacturing of a stamper and was not caused by providing the recording layer. By improving a stamper manufacturing process, jitter can be lowered to less than 7%. Moreover, in FIG. 34B, $R_H$ in the recordable region was about 35%, modulation was about 69% and a jitter value was about 5.5%. The signals in the two regions were very similar and could be read without distinction. Furthermore, by optimizing pit formation conditions and the like in manufacturing of the stamper, a more uniform reading signal can be obtained.

Figure 35:
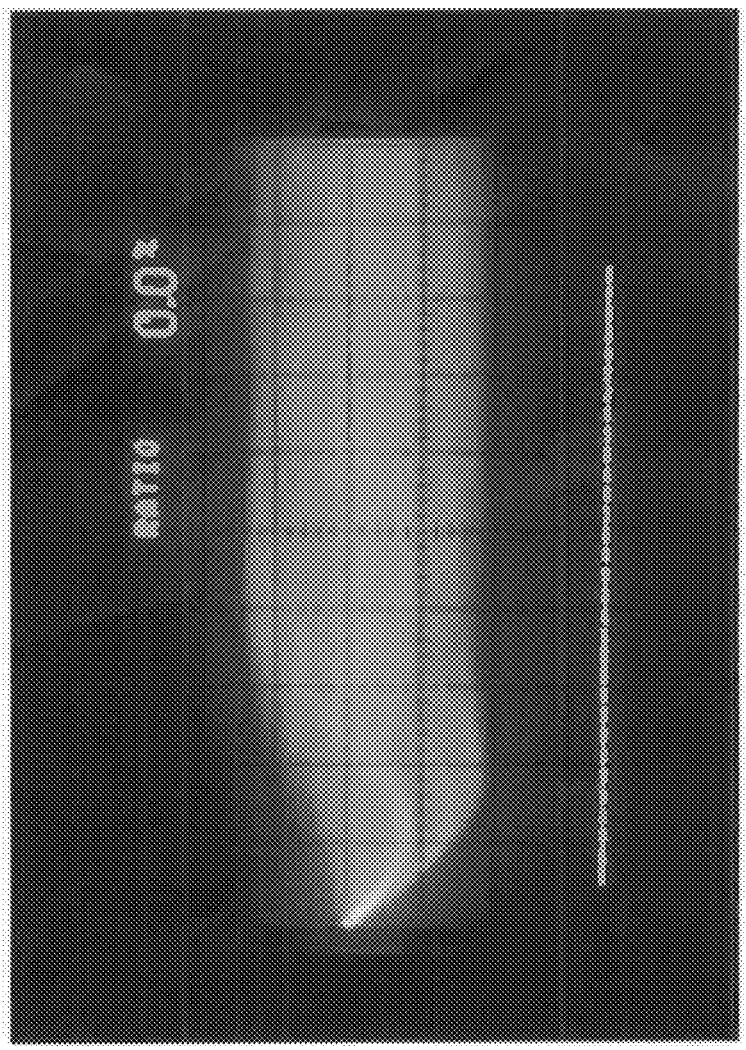
FIG. 35 is a view showing a reading signal waveform in the case where the ROM region is overwritten by use of a recording method of the present invention.
Figure 36B:
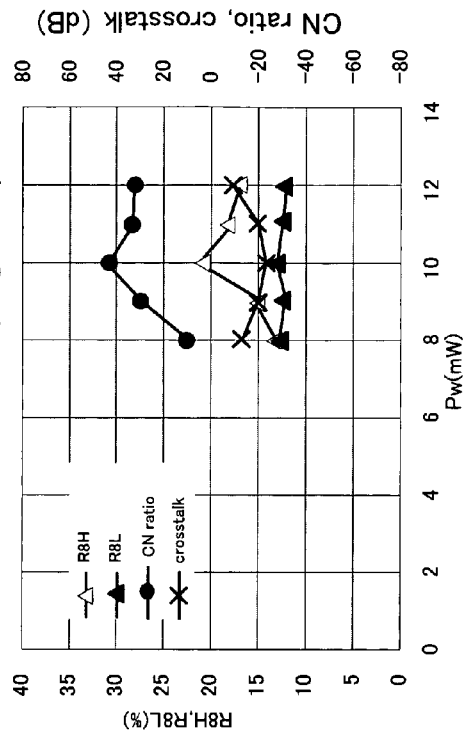
FIG. 36 are graphs showing recording power dependence of a CN ratio of a recording signal, crosstalk, reflectivity on an upper end of the recording signal and reflectivity on a lower end thereof in the case where, in reference example 1, recording is performed by alternately generating 8T mark length and space length at a recording linear velocity of 5.3 m/s.
Figure 36D:
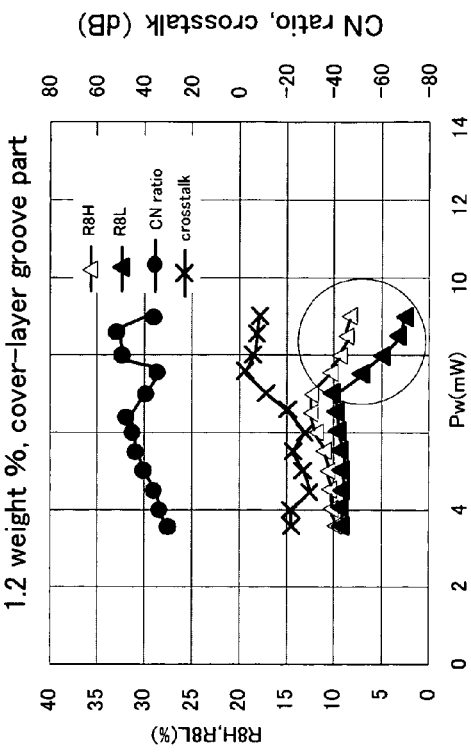
Figure 36A:
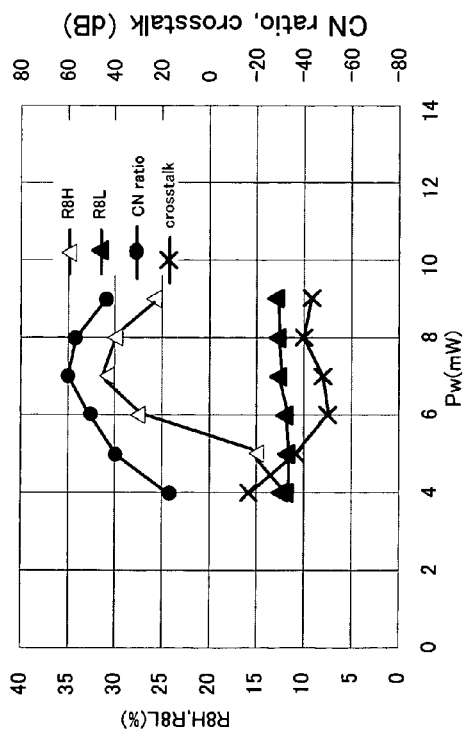
Figure 36C:
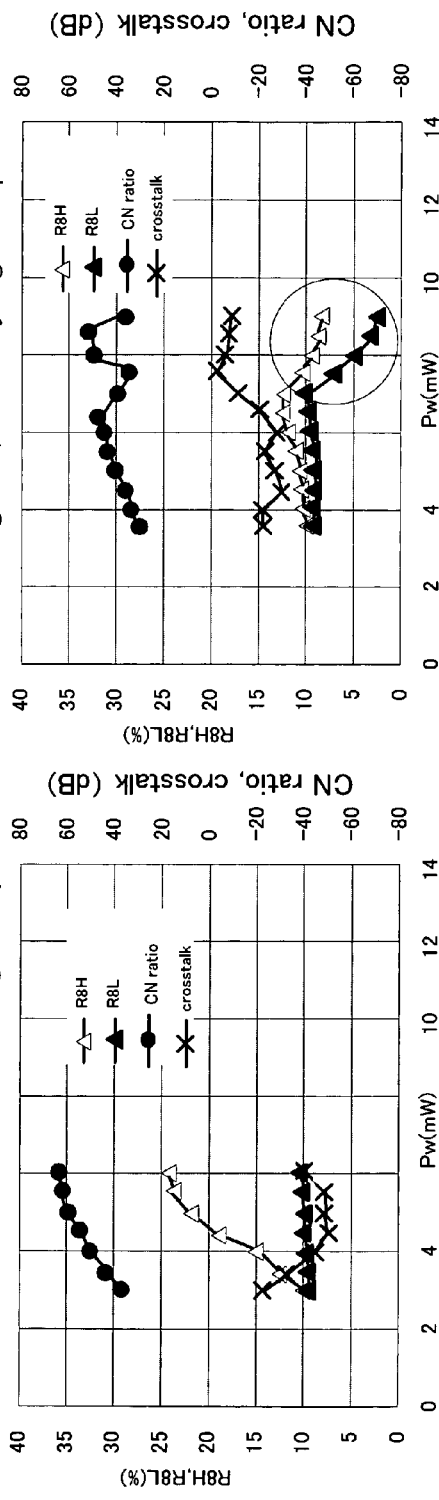

FIG. 35 is a view showing a reading signal waveform in the case where the ROM region was overwritten by use of the recording method of the present invention. Specifically, FIG. 35 shows a signal waveform in the case where the same recording signal as that in example 4 was recorded in the recording layer of the ROM part shown in FIG. 34A. Since the reflectivity in the recording part of the dye recording layer was increased, particularly, a signal in the pit part of the ROM signal was disturbed. Thus, the ROM signal could no longer be read. As described above, by application of the recording medium of the present invention, it is possible to realize prevention of copy of ROM part data and use of method for intentionally and selectively making a part of ROM data unretrievable from the perspective of security.

In this case, the position of the recorded pit (mark) position is not synchronous with the pit array formed as a concave part on the substrate. Thus, completely random overwrite was performed. The space part of the concave part pit is the substrate surface. If this space part is overwritten, since there is no contribution of the phase difference, the reflectivity change is small. As a matter of course, if none of the pit part and the space part is overwritten, there is no change in the reflectivity. If the concave part is not overwritten, the reflectivity is kept low. Meanwhile, the bottom of the pit concave part is approximately as deep as the depth of the substrate groove part. If the bottom part is overwritten, as in the case of normal recording in the groove part, the reflectivity is increased by contribution of the phase difference $\Delta\Phi$>0. Principally, the recording/reading waveform is greatly disturbed by overwrite in the pit part. Consequently, the waveform as shown in FIG. 35 is obtained.

Reference Example 1

Hereinafter, in order to clarify that, in the present invention, L to H recording mainly by the phase shift in the cover-layer inter-groove part was better than recording in the cover-layer groove part, the following experiment was conducted.

By changing only the thickness of the recording layer in the disk of the dye A2 in example 4, recording was performed in the cover-layer inter-groove part and the cover-layer groove part, respectively. It was known that the thickness of the recording layer was proportional to the dye concentration in the solution used for coating within a range used in this experiment. Thus, disks having the solution concentration of 0.6 wt. % ($d_G$≈30 nm) and of 1.2 wt. % ($d_G$≈60 nm), respectively, were prepared.

FIG. 36 are graphs showing recording power dependence of a CN ratio (carrier to noise ratio) of a recording signal, crosstalk, reflectivity (R8H) on an upper level of the recording signal and reflectivity (R8L) on a lower level thereof in the case where, recording is performed by alternately generating 8T mark length and space length at a recording linear velocity of 5.3 m/s (recording condition 1) using the same evaluator as that in other examples.

For measurement of CN and crosstalk, as a recording strategy, a repeating signal of a 8T mark and a space was recorded by using dTtop=(10/16)T, Ttop=16/16T, Tmp=10/16T, dTe=0T, Pb1=Pb2=0.3 mW and Pr=0.35 mW in FIG. 11. Moreover, a reading signal (Isum signal) was measured by using spectrumanalyzer TR4171 made by ADVANTEST Corp., resolution band width=30 kHz and video band width=100 Hz.

Here, in the case where recording was performed in the cover-layer inter-groove part, crosstalk was obtained by measuring, in the adjacent cover-layer groove part in unrecorded state, a leak signal intensity from the recorded cover-layer inter-groove part (average value of carrier level values measured on both sides) and by subtracting a carrier level value of the recording signal in the cover-layer inter-groove part. On the other hand, in the case where recording was performed in the cover-layer groove part, crosstalk was obtained by measuring, in the adjacent cover-layer inter-groove part in unrecorded state, a leak signal intensity from the recorded cover-layer on-groove part (average value of carrier level values measured on both sides) and by subtracting a carrier level value of the recording signal in the cover-layer groove part. The crosstalk normally takes a negative value. The larger the absolute value is, the smaller the crosstalk is.

First, attention is focused on the case of the dye concentration of 0.6 wt. % ($d_G$≈30 nm). In the case where recording was performed in the cover-layer inter-groove part (FIG. 36A), which corresponded to the aspect of the present invention, R8L was fixed to about 13%, which was the same as the reflectivity in the unrecorded state. However, the L to H polarity signal was recorded from about 5 mW, and R8H level was increased together with the recording power. Accordingly, the CN ratio took the maximum value of 60 dB at about 7 mW. The crosstalk was constantly −40 dB or less.

On the other hand, in the case where recording was tried in the cover-layer groove part (FIG. 36B), $d_L$≈0 was established from the start. Thus, absolutely no recording signal was observed at less than 10 mW. A very small distorted recording signal (about 45 dB or less) was observed at 10 mW or more. However, this is considered to be because of the following. Since the recording power was very high, microstructural deformation might be caused in any interface of the reflective layer in the cover-layer groove part. Moreover, heat was transmitted to the cover-layer inter-groove part on both sides, and slight alteration of the recording layer was caused also in the cover-layer inter-groove part. Specifically, recording in the cover-layer groove part is substantially difficult. The crosstalk value was set as large as −20 dB. It is conceivable that observed is a weak signal recorded in a part of the cover-layer inter-groove part (a groove side-wall closer to the cover-layer groove part, and the like) rather than a leak signal of the recording signal in the cover-layer groove part.

Subsequently, attention is focused on the case of the dye concentration of 1.2 wt. % ($d_G$≈60 nm). It was found out that $d_L$ was as small as 30 nm or less from cross-sectional observation. In the case where recording was performed in the cover-layer inter-groove part (FIG. 36C), R8L was fixed to about 9%, which was the same as the reflectivity in the unrecorded state and was lower than that in the case of FIG. 36A. The L to H polarity signal was recorded from about 3 mW, and R8H level was increased together with the recording power to reach about 24%. The reason why the reflectivity was low as a whole was because the light was absorbed by the recording layer due to increased thickness of the recording layer. On the other hand, the recording sensitivity was improved. The CN ratio took the maximum value of about 60 dB at about 6 mW. The crosstalk was −40 dB or less at 6 mW or less. At the power higher than about 6 mW, the crosstalk tended to be increased. However, at 6 mW or more, the push-pull signal became very small and the normalized push-pull signal was set to less than 0.1. Thus, during recording or immediately after recording, the tracking servo could not be maintained and measurement could not be conducted. As described above, when $d_G$ exceeds $d_{GL}$ (≈$d_{GLS}$), the tracking servo may become unstable if the recording power is high (probably, in the case where deformation $d_{bmp}<0$ in the recording pit is large).

On the other hand, in the case where recording was tried in the cover-layer groove part (FIG. 36D), a very subtle distorted signal was observed at 7 mW or less. However, this is considered to be because of recording in a part of the adjacent cover-layer inter-groove part. At 7 mW or more (the region surrounded by the circle in FIG. 36D), R8L was lowered. That was because the H to L polarity signal was recorded in the cover-layer groove part. Specifically, in FIG. 36D, the reflectivity in the unrecorded state is fixed to about 9%. However, the reflectivity corresponds to R8L at 7 mW or less and corresponds to R8H at 7 mW or more. It is conceivable that, at 7 mW or more, a cavity is formed and deformation of the recording layer bulging toward the cover layer occurs in the cover-layer groove part. This corresponds to the case where the phase shift $\Delta\Phi>0$ is caused in the equation (12). In H to L recording at 7 mW or more, the CN ratio did not reach 60 dB, and the crosstalk value was increased to −5 dB because of the H to L signal leaking into the adjacent cover-layer inter-groove part.

Furthermore, evaluation was conducted for recording power dependence of the jitter value in the case where 2-times velocity recording was performed under recording condition 2 in the cover-layer inter-groove part by using the disks with 0.6 wt. % and 1.2 wt. %. As to the recording strategy, the recording strategies in FIG. 11 are optimized, respectively and used. In the case of 1.2 wt. %, the recording power at which the jitter value is minimized is about 5.5 mW, which is lower than about 8 mW in the case of 0.6 wt. %. However, the minimum jitter value is lowered to about 6.6% in the disk with 0.6 wt. % compared to that of about 9% in the case of 1.2 wt. %. When the recording layer is thick, the recording sensitivity is improved. However, it is conceivable that, probably, thermal interference between adjacent recording pits is increased in the direction along the recording groove part, and it tends to be difficult to obtain a low jitter value. Thus, it is understood that the thickness of the recording layer is preferably smaller than the groove depth.

Subsequently, reading light durability was examined by iterative reading, at 1-time velocity, the region recorded at the optimum recording power at 1-time velocity under recording condition 2. When the same portion was repeatedly read at the reading light power of 0.35 mW (high-frequency superposition was present), in the disk with 0.6 wt. %, the initial jitter value was 5.2% and there was absolutely no increase found in the jitter value at least up to a million times. In the disk with 1.2 wt. %, the initial jitter value was 6.4% and there was a significant increase found in the jitter value after several tens of thousands of times.

Reference Example 2

The same examination as that of reference example 2 was conducted by use of a very shallow substrate having a groove depth of about 20 nm. FIG. 37 show recording power dependence of a CN ratio (carrier to noise ratio) of a recording signal, crosstalk, reflectivity (R8H) on an upper end of the recording signal and reflectivity (R8L) on a lower end thereof, in the case where a 8T mark/space signal was recorded at 5.3 m/s (recording condition 1).

If the dye concentration was 0.6 wt. % ($d_G \approx 30$ nm), in the case where recording was performed in the cover-layer inter-groove part (FIG. 37A), R8L was fixed to about 32%, which was the same as the reflectivity in the unrecorded state. The L to H polarity signal was recorded from about 5 mW. Since R8L was high, the phase shift $\Delta\Phi>0$ was small and the signal amplitude was very small. At 6.5 mW or more, the tracking servo was unstable and measurement could not be conducted. This is considered to be because the normalized push-pull signal becomes very small or the polarity thereof is inverted since the deformation $d_{bmp}<0$ in the recording pit becomes very large beyond the shallow $d_{GL}$.

On the other hand, in the case where recording was tried in the cover-layer groove part (FIG. 37B), since the groove was shallow, a dye layer having a thickness of 20 nm or less was formed also in the cover-layer groove part. However, at less than 8 mW, recording was hardly performed. At 8 mW or more, the tracking servo became unstable.

Subsequently, attention is focused on the case where the dye concentration was 1.2 wt. % ($d_G \approx 60$ nm and $d_L \approx 30$ nm). The dye recording layer was observed to be as if it were continuous without intermittence in the groove transverse direction. Specifically, a dye layer was also formed in the cover-layer groove part (substrate inter-groove (land) part).

Figure 37A:
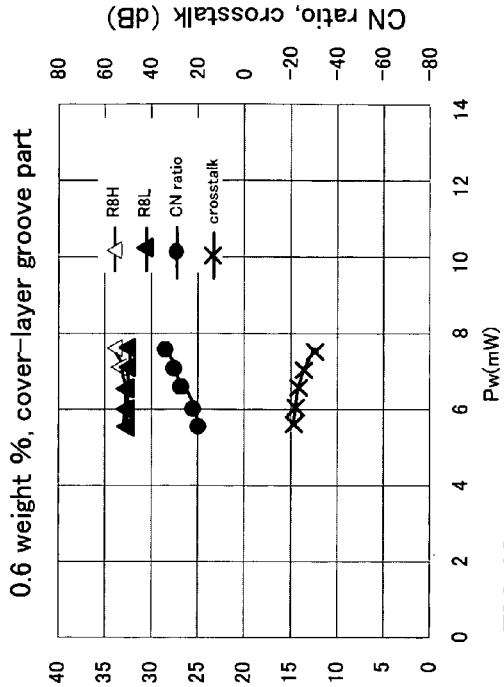
FIG. 37 are graphs showing recording power dependence of a CN ratio of a recording signal, crosstalk, reflectivity on an upper end of the recording signal and reflectivity on a lower end thereof in the case where, in reference example 2, a 8T mark/space signal is recorded at 5.3 m/s.
Figure 37B:
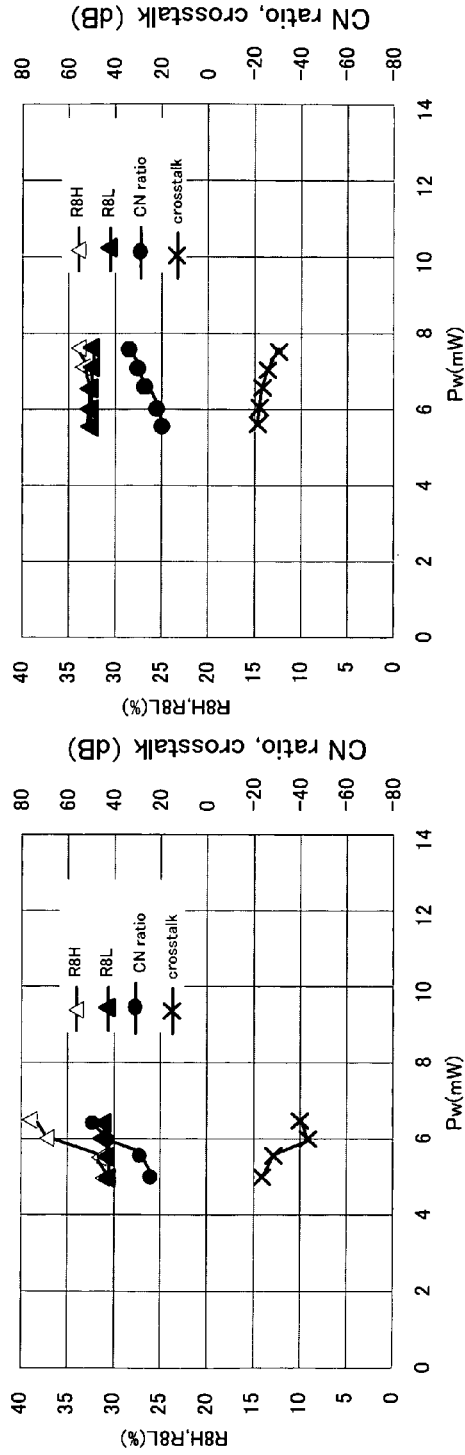
Figure 37C:
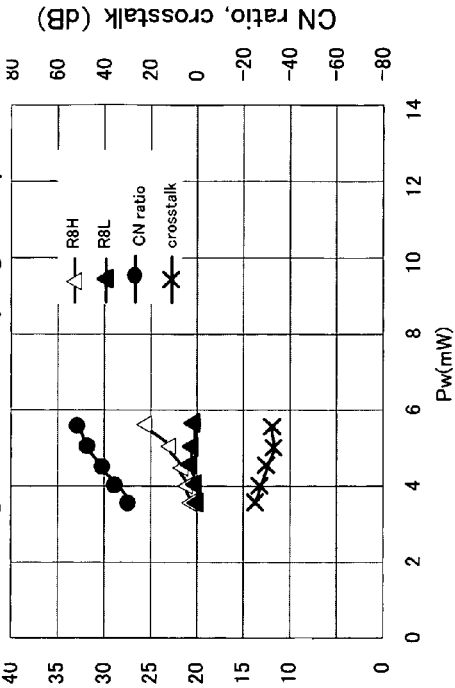
Figure 37D:
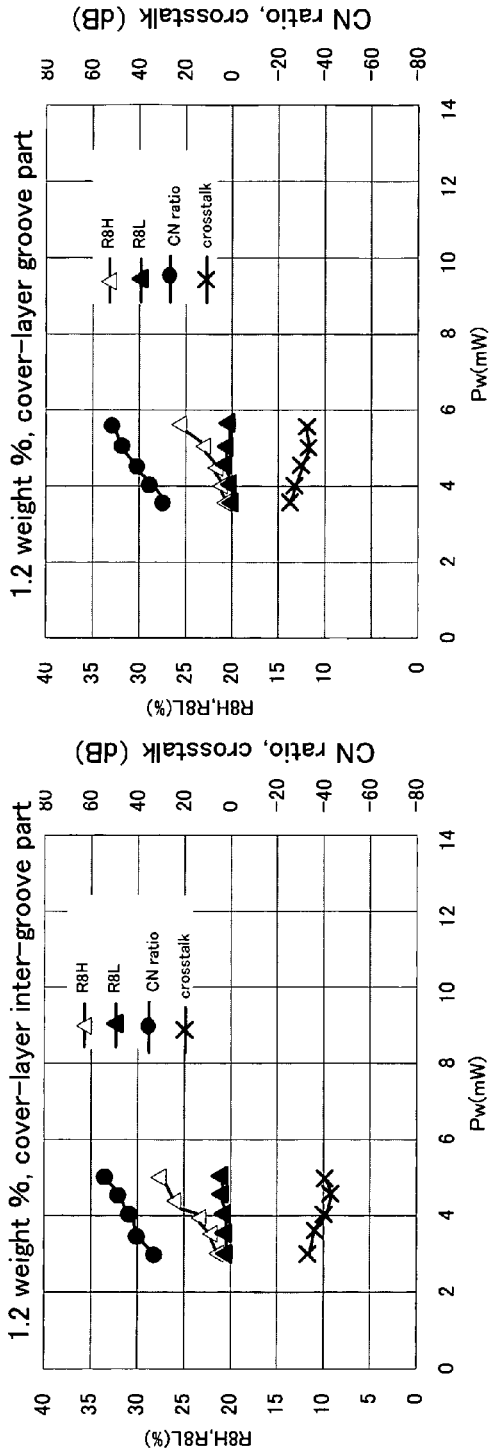

In the case where recording was performed in the cover-layer inter-groove part (FIG. 37C), R8L was fixed to about 21%, which was the same as the reflectivity in the unrecorded state and was lower than that in the case of FIG. 37A. The L to H polarity signal was recorded from about 3 mW, and R8H level was increased together with the recording power to reach about 28%. At 5 mW or more, the push-pull signal became very small. Thus, during recording or immediately after recording, the tracking servo could not be maintained and measurement could not be conducted. In the case where recording was tried in the cover-layer groove part (FIG. 37D), a very small L to H signal was observed, in which alteration was considered to be caused in a part of the adjacent cover-layer inter-groove part at less than 6 mW. It was expected that H to L recording was performed at about 6 mW or more. However, during recording or immediately after recording, the tracking servo could not be maintained and measurement could not be conducted.

In the case of the shallow groove in reference example 2, L to H recording itself is possible in the cover-layer inter-groove part. However, from the perspective of the signal amplitude and the tracking servo, it is understood that good characteristics are hardly obtained. Also in this case, the characteristics are improved, as in the case of reference example 1, by setting the groove depth to the "intermediate groove" depth, which is preferable in the present invention.

Reference Example 3

In the case of using the dye A2 in example 4, examination was conducted by variously changing the material of the cover layer. Specifically, various kinds of UV cure resin shown in Table 11 were used for 10 μm, which came into contact with the interface layer, among the cover layer thickness of 100 μm, and UV cure resin F1 was used for the remaining 90 μm.

TABLE 11

| | Recording Layer Side Cover Layer Material | Glass Transition Temperature | Cover Layer Structure A |
|---|---|---|---|
| Example 4-A2 | Pressure Sensitive Adhesive F0 | −21 | Pressure Sensitive Adhesive (25 μm)/Polycarbonate Sheet (75 μm) |
| Reference Example F1 | Resin F1 (Urethane Acrylate UV Cure Resin Made by Mitsubishi Rayon Co., Ltd) | 56 | Resin F1 100 μm |
| Reference Example F2 | Resin F2 (Acrylic UV Cure Resin, Product Name SD318 made by DAINIPPON INK | 139 | Resin F2 10 μm Resin F1 90 μm |

TABLE 11-continued

| | Recording Layer Side Cover Layer Material | Glass Transition Temperature | Cover Layer Structure A |
|---|---|---|---|
| | AND CHEMICALS, INCORPORATED) | | |
| Reference Example F3 | Resin F3 (Acrylic UV Cure Resin, Product Name MD450 made by Nippon Kayaku Co., Ltd.) | 131 | Resin F3 10 μm Resin F1 90 μm |
| Reference Example F4 | Resin F4 (Acrylic UV Cure Resin, made by Nippon Kayaku Co., Ltd) | −5 | Resin F4 10 μm Resin F1 90 μm |
| Reference Example F5 | Resin F5 (Acrylic UV Cure Resin, made by Nippon Kayaku Co., Ltd) | −18 | Resin F5 10 μm Resin F1 90 μm |
| Reference Example F6 | Resin F6 (Acrylic UV Cure Resin, made by Nippon Kayaku Co., Ltd) | −31 | Resin F6 10 μm Resin F1 90 μm |

In reference example F1, resin F1 was used for all 100 μm. The resins described above were all formed by spin-coating. Thereafter, the resins were completely cured by irradiation of ultraviolet ray (ultra-high pressure mercury lamp TOSCURE 751 made by Harrison Toshiba Lighting Co., Ltd.) in the process of rotation coating or immediately after rotation coating was finished. For curing of the resin F1, ultraviolet irradiation of about 800 mJ/cm$^2$ was used. Moreover, for curing of the resins F2 to F6, ultraviolet irradiation of about from 1500 to 2000 mJ/cm$^2$ was used. The resins F4 to F6 had viscosity even after cured, and a glass transition temperature was room temperature or lower. After the resin F1 was completely cured, a measured value of pencil hardness according to JIS K5600-5-4 (by use of Scratching intensity tester HEIDON-18 made by Heidon Corp., loading of 750 g, a scanning rate of 120 mm/min., a scanning distance of 7 mm and use of a Mitsubishi pencil) on the disk was 2B. The resins F2 and F3 are materials having hardness higher than that of the resin F1.

Figure 38:
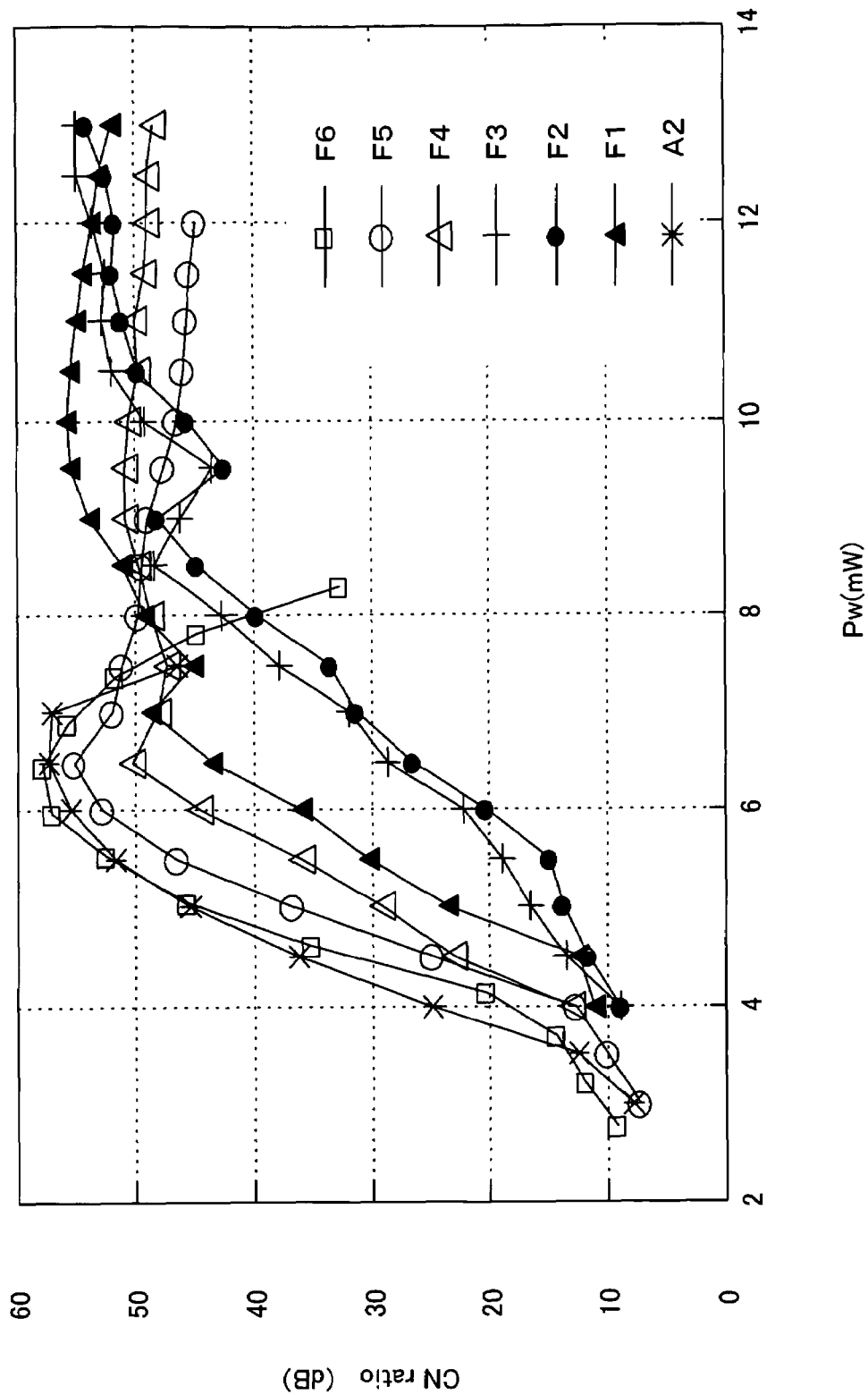
FIG. 38 is a graph showing recording power dependence of a CN ratio of a recording signal in the case where, in reference example 3, recording is performed by alternately generating 8T mark length and space length at a recording linear velocity of 5.3 m/s.

FIG. 38 shows recording power dependence of a CN ratio (carrier to noise ratio) of a recording signal in the case where recording was performed by alternately generating 8T mark length and space length at a recording linear velocity of 5.3 m/s by use of the same evaluations devices as those used in the other examples. For comparison, the same evaluation was conducted by use of the disk of the dye A2 in example 4 (this is described as example 4-A2). Specifically, a cover layer was formed of a pressure-sensitive adhesive F0 which had a glass transition temperature of −21° C. and a thickness of 25 μm and a sheet of polycarbonate resin having a thickness of 75 μm. Ultraviolet irradiation was not required for attachment of this sheet cover layer. However, as a precautionary measure, it was confirmed that there was no change in characteristics even if ultraviolet irradiation was performed as in the case of formation of the cover layer F1. In the present invention, this means an advantage of using a dye having flat absorption characteristics as shown in FIG. 19 and having almost no absorption in the ultraviolet range on the process. In other words, the UV cure resin can be used as the cover layer without special protection measures.

FIG. 38 shows that, in media using deformation facilitating layers made of the dye A2 in example 4 and the resins F4 to F6, respectively, a high CN ratio is obtained, the CN ratio exceeds 40 dB at low recording power, and good characteristics are obtained in terms of recording sensitivity.

In reference examples F1 to F3, even though slight distortion was observed in a waveform, L to H recording was performed over the entire mark length at least at the point where the CN ratio exceeded 50 dB. In the dye A2, cavity formation and bulging deformation of $d_{bmp}<0$ toward the cover layer from the recording layer side contributed to the signal amplitude. In the cover layer having high hardness (at least on the recording layer side), it is considered that deformation is suppressed and recording sensitivity is deteriorated.

In the cases of example A2 and the resins F4, F5, and F6, jitter of 10% or less was obtained when mark length modulation recording was performed at 1-time velocity under recording condition 1 or 2. In F4 to F6, low jitter was obtained when Tg was low. In F6, jitter as low as 5.4% was obtained even under recording condition 2. It is considered that differences between the measurement results of jitter are mainly caused by how good 2T mark formation is. In the case where the bulging deformation of $d_{bmp}<0$ is actively utilized in the present invention, a deformation facilitating layer as soft as a pressure-sensitive adhesive having a glass transition temperature of room temperature (25° C.) or lower is preferably formed at least on the recording layer side.

In the present invention, the thickness of the recording layer is set to $d_G \leq d_{GL}$ and the dye recording layer is kept in the recording groove part. Thus, recording with very small crosstalk can be performed even if deformation $d_{bmp}<0$ is actively utilized.

Note that, in the dye A2, particularly, since $n_d$ is 1.38, which is considered to be small in the examples of the present invention, $\delta n_d$ is also considered to be relatively small. Therefore, there is considered to be a substantial need for active utilization of deformation $d_{bmp}<0$. Here, if the dye recording layer is changed to one having larger $\delta n_d$, for example, $n_d$ is set to from 1.8 to 1.9, recording signal characteristics can be improved even if the deformation amount $|d_{bmp}|$ is small. Moreover, even if the glass transition temperature $T_g$ is higher than about 0° C., the recording signal characteristics can be improved by use of a material having a small storage elastic modulus at $T_g$ or higher.

Note that the present application is based on Japanese Patent Application (No. 2004-210817) applied on Jul. 16, 2004 and Japanese Patent Application (No. 2005-175803) applied on Jun. 15, 2005 and entire thereof are incorporated herein by reference.

The invention claimed is:

1. An optical recording medium comprising:
   a substrate having a guide groove formed therein;
   a layer having at least a light reflection function on the substrate;
   a recording layer containing, as a main component, a dye having a light absorption function with respect to a recording/reading light wavelength in an unrecorded state; and
   a cover layer which makes the recording/reading light incident on the recording layer, in this order,
   wherein, when a guide groove part on a far side from a plane of incidence of a recording/reading light beam, which is obtained by focusing the recording/reading light, on the cover layer is set as a recording groove part, reflected light intensity in a recorded pit portion formed in the recording groove part is set higher than reflected light intensity in an unrecorded recording groove part, and a recording layer thickness $d_G$ in the unrecorded recording groove part is not less than 5 nm and less than 50 nm.

2. The optical recording medium according to claim 1, wherein the reflected light intensity in the recorded pit portion is increased by a phase shift of the reflected light in the recorded pit portion.

3. The optical recording medium according to claim 2, wherein
an interface of the layer having the light reflection function on the recording layer side is set as a reflection reference plane,
a phase difference Φb caused by a difference between a both-way optical path length to the reflection reference plane in the recording groove part and a both-way optical path length to the reflection reference plane in an inter-recording-groove part of the guide groove part in which the recorded pit portion is not formed is 0<b<π,
a phase difference Φa in the case where the recorded pit portion exists in the recording groove part is 0<Φa<π, and
|ΦbΦ>Φa| is established.

4. The optical recording medium according to claim 3, wherein a relationship among
a step $d_{GL}$ between the recording groove part and the inter-recording-groove part, which is specified by the reflection reference plane,
a refractive index $n_d$ of the unrecorded recording layer at a recording/reading light wavelength λ,
a refractive index $n_c$ of the cover layer at the recording/reading light wavelength λ,
a recording layer thickness $d_G$ in the unrecorded recording groove part, and
a recording layer thickness $d_L$ in the unrecorded inter-recording-groove part
is $(\lambda/8) \leq |(n_d - n_c) \cdot (d_G - d_L) + n_c \cdot d_{GL}| \leq (15/64) \cdot \lambda$.

5. The optical recording medium according to claim 2, wherein the phase shift in the recorded pit portion is caused by formation of a portion having a refractive index lower than a refractive index n on an incident light side of the light reflective layer.

6. The optical recording medium according to claim 2, wherein the phase shift in the recorded pit portion is caused by reduction in a refractive index of the recording layer at the recording/reading light wavelength compared with that in the unrecorded state.

7. The optical recording medium according to claim 6, wherein a reduced refractive index $n_d'$ after recording is smaller than a cover layer refractive index $n_c$.

8. The optical recording medium according to claim 2, wherein the phase shift in the recorded pit portion is caused by formation of a cavity in the recording layer or in an interface layer adjacent to the recording layer.

9. The optical recording medium according to claim 2, wherein the recording layer accompanies a shape change of bulging toward the cover layer.

10. The optical recording medium according to claim 2, wherein a refractive index $n_d$ of the recording layer in the unrecorded state is equal to or less than a refractive index $n_c$ of the cover layer.

11. The optical recording medium according to claim 2, wherein neither deformation nor mixing is caused in any of the interfaces between the reflective layer and the recording layer and between the reflective layer and the substrate in the recorded pit portion.

12. The optical recording medium according to any one of claims 1 and 2, wherein the recording/reading light wavelength λ is from 350 nm to 450 nm.

13. The optical recording medium according to claim 12, wherein a recording layer thickness $d_G$ of the unrecorded recording groove part is not less than 5 nm and less than 40 nm.

14. The optical recording medium according to claim 12, wherein an interface of the layer having the light reflection function on the recording layer side is set as a reflection reference plane, and
a step $d_{GL}$ between the recording groove part and the inter-recording-groove part, which is specified by the reflection reference plane, is from 30 nm to 70 nm.

15. The optical recording medium according to claim 1, wherein a recording layer thickness $d_G$ of the unrecorded recording groove part, when an interface of the layer having the light reflection function on the recording layer side is set as a reflection reference plane, a step $d_{GL}$ between the recording groove part and the inter-recording-groove part, which is specified by the reflection reference plane, and
a recording layer thickness $d_L$ of the unrecorded inter-recording-groove part,
is in a relationship of $d_L/d_G \leq 0.5$.

16. The optical recording medium according to claim 1, wherein a recording layer thickness $d_L$ in the unrecorded inter-recording-groove part is from 0 nm to 10 nm.

17. The optical recording medium according to claim 1, wherein an interface layer for preventing mixing of a material of the recording layer with a material of the cover layer is further provided between the recording layer and the cover layer.

18. The optical recording medium according to claim 1, wherein an interface layer for preventing mixing of a material of the recording layer with a material of the cover layer is further provided between the recording layer and the cover layer, and a thickness of the interface layer is from 1 nm to 50 nm.

19. The optical recording medium according to claim 1, wherein reflectivity in the case where the unrecorded recording groove part is irradiated with the recording/reading light beam is from 3% to 30%.

20. The optical recording medium according to claim 1, wherein a refractive index n of the cover layer at the recording/reading light wavelength λ is from 1.4 to 1.6, and a refractive index $n_d$ of the unrecorded recording layer at the recording/reading light wavelength λ is from 1 to 2.

21. The optical recording medium according to claim 1, wherein a refractive index $n_d$ of the recording layer is from 1.2 to 1.9.

22. The optical recording medium according to claim 20, wherein an extinction coefficient of the recording layer at the recording/reading light wavelength λ in the unrecorded state is from 0.1 to 1.

23. The optical recording medium according to claim 20, wherein an extinction coefficient of the recording layer in the recording/reading light wavelength λ in the unrecorded state is not less than 0.3.

24. The optical recording medium according to claim 1, wherein, as the recording layer, a dye having a weight reduction start temperature of not more than 300° C. and an extinction coefficient $k_d$ of not less than 0.3 in the unrecorded state is used.

25. The optical recording medium according to claim 21, wherein the refractive index $n_d$ is not more than 1.6.

26. The optical recording medium according to claim 1, wherein reflectivity in a mirror surface part of the optical recording medium at a recording/reading light wavelength λ is not less than 50% of reflectivity in the mirror surface part if a recording layer thickness is set to 0.

27. The optical recording medium according to claim 1, wherein an extinction coefficient of the recording layer at a recording/reading light wavelength λ after recording is reduced compared with that before recording.

28. The optical recording medium according to claim 1, wherein a molar absorption coefficient in a chloroform solution at a peak of a main absorption band of the dye to be a main component of the recording layer is from 20000 to 100000.

29. The optical recording medium according to claim 1, wherein a dye to be a main component of the recording layer is one having $n_d$=from 1.3 to 1.9, $k_d$=from 0.3 to 1 and a weight reduction start temperature of from 150 to 300° C., which is measured by thermogravimetry.

30. The optical recording medium according to claim 1, wherein a normalized push-pull signal intensity in the unrecorded state in the recording groove part is 0.5 or more and 0.8 or less.

31. The optical recording medium according to claim 1, wherein a normalized push-pull signal intensity after recording in the recording groove part is 0.2 or more and 0.5 or less.

32. The optical recording medium according to claim 1, wherein the recording layer is one formed by applying a solution having the dye dissolved therein onto the substrate having the guide groove.

33. The optical recording medium according to claim 1, wherein a deformation facilitating layer is provided on an interface of the cover layer on the recording layer side.

34. The optical recording medium according to claim 33, wherein the deformation facilitating layer is an adhesive layer having a glass transition temperature of not more than 0° C.

35. The optical recording medium according to claim 1, wherein a weight reduction start temperature of the dye to be a main component of the recording layer, the temperature being measured by thermogravimetry, is from 150° C. to 250° C.

36. The optical recording medium according to claim 1, wherein a read-only data region formed of a pit array having the same depth of that of the recording groove part is provided at least in a part on the substrate.

37. An optical recording method for an optical recording medium, by which recording and reading are performed by receiving a recording/reading light from a cover layer side, the optical recording medium having a structure in which at least a layer having a light reflection function, a recording layer containing, as a main component, a dye having a light absorption function with respect to the recording/reading light wavelength in an unrecorded state, and a cover layer are sequentially formed on a substrate having a guide groove formed therein, wherein
when a guide groove part on a far side from a plane of incidence of a recording/reading light beam, which is obtained by focusing the recording/reading light, on the cover layer is set as a recording groove part, reflected light intensity of a recorded pit portion formed in the recording groove part is set higher than reflected light intensity in an unrecorded recording groove part, and a recording layer thickness $d_G$ in the unrecorded recording groove part is not less than 5 nm and less than 50 nm.

38. The optical recording method for an optical recording medium, according to claim 37, wherein the reflected light intensity of the recorded pit portion is increased by a phase shift of the reflected light in the recorded pit portion.

39. The optical recording method for an optical recording medium, according to claim 38,
an interface of the layer having the light reflection function on the recording layer side is set as a reflection reference plane,
a phase difference Φb caused by a difference between a both-way optical path length to the reflection reference plane in the recording groove part and a both-way optical path length to the reflection reference plane in an inter-recording-groove part of the guide groove in which the recorded pit portion is not formed, is 0<|Φb|<π,
a phase difference Φa in the case where the recorded pit portion exists in the recording groove part is 0<|Φa|<π, and
|Φb|>|Φa| is established.

40. The optical recording method for an optical recording medium, according to claim 38, wherein the phase shift in the recorded pit portion is caused by formation of a portion having a refractive index lower than a refractive index $n_d$ at a recording/reading light wavelength λ in unrecorded recording layer on an incident light side of the light reflective layer.

41. The optical recording method for an optical recording medium, according to claim 38, wherein the phase shift in the recorded pit portion is caused by reduction in a refractive index of the recording layer at the recording/reading light wavelength compared with that in the unrecorded state.

42. The optical recording method for an optical recording medium, according to claim 38, wherein the phase shift in the recorded pit portion is caused by formation of a cavity in the recording layer or in an interface adjacent to the recording layer.

43. The optical recording method for an optical recording medium, according to claim 38, wherein the recording layer accompanies a shape change of bulging toward the cover layer.

44. An optical recording device for an optical recording medium, which performs recording and reading by receiving a recording/reading light from a cover layer side, the optical recording medium having a structure in which at least a layer having a light reflection function, a recording layer containing, as a main component, a dye having a light absorption function with respect to the recording/reading light wavelength in an unrecorded state, and a cover layer are sequentially formed on a substrate having a guide groove formed therein, wherein
a recording groove part that is a guide groove part on a far side from a plane of incidence on the cover layer is irradiated with a recording/reading light beam obtained by focusing the recording/reading light, and a recorded pit portion is formed in the recording groove part, the recorded pit portion having reflected light intensity increased compared with that in the unrecorded state, and a recording layer thickness $d_G$ in an unrecorded recording groove part of the optical recording medium is not less than 5 nm and less than 50 nm.

* * * * *